United States Patent
Wu et al.

(10) Patent No.: US 12,096,282 B2
(45) Date of Patent: *Sep. 17, 2024

(54) QOS FLOW CONTROL METHOD AND APPARATUS

(71) Applicant: Huawei Technologies Co., Ltd., Shenzhen (CN)

(72) Inventors: Yizhuang Wu, Beijing (CN); Chunshan Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,373

(22) Filed: Dec. 28, 2022

(65) Prior Publication Data
US 2023/0144570 A1    May 11, 2023

Related U.S. Application Data

(63) Continuation of application No. 16/929,782, filed on Jul. 15, 2020, now Pat. No. 11,576,083, which is a
(Continued)

(30) Foreign Application Priority Data

Jan. 16, 2018    (CN) .......................... 201810041613.8

(51) Int. Cl.
*H04W 28/24*    (2009.01)
(52) U.S. Cl.
CPC .................. *H04W 28/24* (2013.01)
(58) Field of Classification Search
CPC .... H04W 28/0268; H04W 28/24; H04L 29/06
See application file for complete search history.

(56) References Cited

U.S. PATENT DOCUMENTS

| | | | |
|---|---|---|---|
| 2012/0198081 | A1 | 8/2012 | Zhao et al. |
| 2017/0359749 | A1 | 12/2017 | Dao |

(Continued)

FOREIGN PATENT DOCUMENTS

| | | |
|---|---|---|
| CN | 101119581 A | 2/2008 |
| CN | 101370263 A | 2/2009 |

(Continued)

OTHER PUBLICATIONS

3GPP TS 23.501 V1.3.0 (Sep. 2017); 3rd Generation Partnership Project; Technical Specification Group Services and System Aspects; System Architecture for the 5G System; Stage 2 (Release 15); 174 pages.

(Continued)

*Primary Examiner* — Syed Ali
(74) *Attorney, Agent, or Firm* — Slater Matsil, LLP

(57) ABSTRACT

This application provides a QoS flow control method and an apparatus. An SMF network element receives first indication information sent by an access network apparatus, where the first indication information is used to indicate that a first QoS target of a QoS flow cannot be met; and the SMF network element does not process the QoS flow if the SMF network element receives second indication information in a first preset time; or the SMF network element deletes or modifies the QoS flow if the SMF network element does not receive second indication information in a first preset time, where the second indication information is used to indicate that the first QoS target can be met.

21 Claims, 26 Drawing Sheets

Related U.S. Application Data continuation of application No. PCT/CN2019/071834, filed on Jan. 15, 2019.

(56) References Cited

U.S. PATENT DOCUMENTS

| | | |
|---|---|---|
| 2018/0192455 A1 | 7/2018 | Wu |
| 2019/0028920 A1 | 1/2019 | Pan |
| 2019/0029057 A1* | 1/2019 | Pan ..................... H04W 76/10 |
| 2019/0394830 A1 | 12/2019 | Mildh et al. |
| 2020/0037197 A1 | 1/2020 | Cho et al. |
| 2020/0267593 A1 | 8/2020 | Liu |
| 2021/0218679 A1* | 7/2021 | Chong .............. H04W 28/0967 |
| 2021/0243641 A1* | 8/2021 | Gangakhedkar .... H04L 12/1407 |
| 2021/0258853 A1* | 8/2021 | Wang .................. H04W 36/22 |
| 2021/0289402 A1* | 9/2021 | Ke ....................... H04W 40/36 |
| 2021/0314820 A1* | 10/2021 | Schliwa-Bertling .... H04L 47/74 |
| 2021/0377781 A1* | 12/2021 | Katsumata .............. H04L 45/30 |
| 2021/0377810 A1* | 12/2021 | Condoluci ............ H04W 28/12 |
| 2022/0078857 A1* | 3/2022 | Kim ...................... H04W 76/10 |
| 2022/0150749 A1* | 5/2022 | Ke ........................ H04W 76/12 |
| 2022/0303824 A1* | 9/2022 | Li ......................... H04W 36/26 |
| 2023/0086421 A1* | 3/2023 | Gan .................. H04W 28/0268 370/328 |

FOREIGN PATENT DOCUMENTS

| | | |
|---|---|---|
| CN | 102036316 A | 4/2011 |
| CN | 103404096 A | 11/2013 |
| CN | 107040942 A | 8/2017 |
| CN | 107295575 A | 10/2017 |
| WO | 2015028924 A2 | 3/2015 |
| WO | 2017211289 A1 | 12/2017 |

OTHER PUBLICATIONS

3GPP TS 23.501 V15.0.0 (Dec. 2017); 3rd Generation Partnership Project; Technical Specification Group Services and System Aspects; System Architecture for the 5G System; Stage 2 (Release 15); 181 pages.

3GPP TS 23.502 V15.0.0 (Dec. 2017); 3rd Generation Partnership Project; Technical Specification Group Services and System Aspects; Procedures for the 5G System;Stage 2 (Release 15); 257 pages.

3GPP TS 23.503 V15.0.0 (Dec. 2017); 3rd Generation Partnership Project; Technical Specification Group Services and System Aspects; Policy and Charging Control Framework for the 5G System; Stage 2 (Release 15); 56 pages.

3GPP TS 38.413 V0.5.0 (Dec. 2017), 3rd Generation Partnership Project; Technical Specification Group Radio Access Network; NG Radio Access Network (NG-RAN); NG Application Protocol (NGAP) (Release 15), 89 pages.

Catt, "Discussion on Notification Control", 3GPP TSG-RAN WG3 #97, R3-172897, Berlin, Germany, Aug. 21-25, 2017, 2 pages.

Catt, "23.501: The usage of notification control", SA WG2 Meeting #122, S2-174267, San Jose Del Cabo, Mexico, Jun. 26-30, 2017, 3 pages.

Catt, "23.501: The usage of notification control", SA WG2 Meeting #122bis, S2-175838, Aug. 21-25, 2017, Sophia Antipolis, France, 4 pages.

Nokia et al,"23.502: 5G QoS: Notification Control", SA WG2 Meeting #124, S2-178674, Nov. 27-Dec. 1, 2017, Reno, Nevada, USA, 4 pages.

* cited by examiner

QOS FLOW CONTROL METHOD AND APPARATUS

CROSS-REFERENCE TO RELATED APPLICATIONS

This application is a continuation of U.S. patent application Ser. No. 16/929,782, filed on Jul. 15, 2020, which is a continuation of International Application No. PCT/CN2019/071834, filed on Jan. 15, 2019, which claims priority to Chinese Patent Application No. 201810041613.8, filed on Jan. 16, 2018. All of the disclosures of the aforementioned applications are hereby incorporated by reference in their entireties.

TECHNICAL FIELD

This application relates to communications technologies, and in particular, to a quality of service (QoS) flow control method and an apparatus.

BACKGROUND

In a 5th generation (5G) mobile communications system, a 5G QoS model based on a QoS flow is proposed, to ensure end-to-end quality of service of a service. The 5G QoS model includes a guaranteed bit rate QoS flow (GBR QoS flow) and a non-guaranteed bit rate QoS flow (Non-GBR QoS flow). Same transmission processing (such as scheduling or an admission threshold) is performed on data packets included in a same QoS flow.

User equipment (UE) may establish one or more packet data unit (PDU) sessions with a 5G system. One or more QoS flows may be established in each PDU session. Each QoS flow is identified by one QoS flow identifier (QFI), and the QFI uniquely identifies a QoS flow in a session. GBR QoS flows include a GBR QoS flow that uses notification control and a GBR QoS flow that does not use notification control. Notification control is used to indicate whether notifications are requested from an access network (AN)/a radio access network (RAN) when a guaranteed flow bit rate (GFBR) can no longer be guaranteed for a QoS flow during the lifetime of the QoS flow. In an existing GBR QoS flow that uses notification control, after the GBR QoS flow is established, when detecting, at any moment, that a QoS target of a corresponding GBR QoS flow cannot be met, the (R)AN sends indication information to a session management function (SMF) network element. Further, the SMF network element determines to initiate a QoS flow modification or deletion procedure.

However, a resource shortage of the (R)AN may be temporary. Therefore, some services cannot be served or a service with reduced quality is provided if the SMF network element immediately deletes the QoS flow or modifies the QoS flow to lower the QoS target when receiving the indication information indicating that the QoS target cannot be met.

SUMMARY

This application provides a QoS flow control method and an apparatus, to resolve a problem that a QoS flow cannot be served or quality of service of a service is reduced because an SMF network element immediately deletes or modifies the QoS flow when resources of an access network apparatus are temporarily short.

A first aspect of this application provides a QoS flow control method, including: receiving, by a session management function SMF network element, first indication information sent by an access network apparatus, where the first indication information is used to indicate that a first QoS target of a QoS flow cannot be met, the first QoS target includes a first guaranteed flow bit rate GFBR, and the QoS flow is a flow on which same QoS processing is performed; and skipping, by the SMF network element, processing the QoS flow if the SMF network element receives, in a first preset time, second indication information sent by the access network apparatus, where the second indication information is used to indicate that the first QoS target can be met; or deleting or modifying, by the SMF network element, the QoS flow if the SMF network element does not receive, in the first preset time, the second indication information sent by the access network apparatus.

In the method, when a QoS target of the QoS flow cannot be met, the SMF network element does not immediately delete or modify the QoS flow. Instead, the SMF network element deletes or modifies the QoS flow only when the QoS target of the QoS flow still cannot be met within a delay of the first preset time, to avoid a problem that a QoS flow service cannot be served or quality of service of a service is reduced because the SMF network element immediately deletes or modifies the QoS flow when resources of the access network apparatus are temporarily short.

In a possible implementation, the SMF network element deletes or modifies the QoS flow if the SMF network element receives, in the first preset time, third indication information sent by the access network apparatus, where the third indication information is used to indicate that the first QoS target cannot be met.

In a possible implementation, the method further includes: determining, by the SMF network element based on the first indication information, an operation to be performed on the QoS flow, where the operation is the deleting or modifying the QoS flow, and a state of the operation is a to-be-performed state. Because determining the operation to be performed on the QoS flow and detecting whether the second indication information is received may be performed concurrently, this implementation can shorten a time of a QoS flow modification procedure and reduce impact on a service compared with determining, after the first preset time, to perform the modification operation on the QoS flow.

In a possible implementation, the modifying, by the SMF network element, the QoS flow includes: determining, by the SMF network element, a second QoS target of the QoS flow based on QoS policy information, where the second QoS target includes a second GFBR, and the QoS policy information includes at least first QoS control information and second QoS control information; and sending, by the SMF network element, the second QoS target to the access network apparatus.

Because at least two pieces of QoS control information included in the QoS policy information can meet a QoS requirement of the QoS flow, the second QoS target determined based on the QoS control information can meet the QoS requirement of the QoS flow. Different from the prior art, in the solution in this application, a QoS target of the QoS flow is modified from the first QoS target to the second QoS target, and QoS quality of the QoS flow is not reduced.

In a possible implementation, the QoS policy information further includes at least priority information of the first QoS control information and priority information of the second QoS control information; and the determining, by the SMF network element, a second QoS target of the QoS flow based on QoS policy information includes: determining, by the SMF network element, the second QoS target of the QoS flow based on the priority information of the first QoS control information and the priority information of the second QoS control information that are included in the QoS policy information.

In a possible implementation, the determining, by the SMF network element, a second QoS target of the QoS flow based on QoS policy information includes: determining, by the SMF network element, the second QoS target of the QoS flow based on guaranteed bit flow GBR information of the first QoS control information and GBR information of the second QoS control information that are included in the QoS policy information.

In a possible implementation, the determining, by the SMF network element, a second QoS target of the QoS flow based on QoS policy information includes: determining, by the SMF network element, at least one third QoS target based on the first QoS control information and the second QoS control information that are included in the QoS policy information; sending, by the SMF network element, the third QoS target to the access network apparatus; receiving, by the SMF network element, a fourth QoS target sent by the access network apparatus, where the fourth QoS target is determined by the access network apparatus based on the third QoS target, and the fourth QoS target is a QoS target that can be met by the access network apparatus; and determining, by the SMF network element, the second QoS target based on the fourth QoS target.

The SMF network element and the access network apparatus determine the second QoS target through negotiation, so that it can be ensured that the second QoS target determined for the QoS flow matches a resource of the access network apparatus, and the resource of the access network apparatus can be used to a maximum extent.

In a possible implementation, the method further includes: sending, by the SMF network element, at least two QoS targets of the QoS flow to the access network apparatus based on the QoS policy information; and receiving, by the SMF network element, a fifth QoS target sent by the access network apparatus, where the fifth QoS target is a QoS target that can be met by the access network apparatus, and the fifth QoS target is determined by the access network apparatus based on the at least two QoS targets when the first QoS target of the QoS flow cannot be met; and the determining, by the SMF network element, a second QoS target of the QoS flow based on QoS policy information includes: determining, by the SMF network element, the second QoS target based on the fifth QoS target.

The SMF network element and the access network apparatus determine the second QoS target through negotiation, so that it can be ensured that the second QoS target determined for the QoS flow matches a resource of the access network apparatus, and the resource of the access network apparatus can be used to a maximum extent.

In a possible implementation, the method further includes: receiving, by the SMF network element, the QoS policy information sent by a policy control function PCF network element, where the QoS policy information is generated by the PCF network element based on at least two QoS requirements sent by an application function AF network element.

A second aspect of this application provides a QoS flow control method, including: sending, by an access network apparatus, first indication information to a session management function SMF network element, where the first indication information is used to indicate that a first QoS target of a QoS flow of user equipment UE cannot be met, the first QoS target comprises a first guaranteed flow bit rate GFBR, and the first QoS flow is a flow on which same QoS processing is performed; and if the first QoS target can be met in a second preset time, sending, by the access network apparatus, second indication information to the SMF network element, where the second indication information is used to indicate that the first QoS target can be met.

After sending the first indication information, the access network apparatus detects, in the second preset time, whether the first QoS target can be met, and notifies the SMF network element, so that when a QoS target of the QoS flow cannot be met, the SMF network element does not immediately delete or modify the QoS flow. Instead, the SMF network element deletes or modifies the QoS flow only when the QoS target of the QoS flow still cannot be met within a delay of the first preset time, to avoid a problem that a QoS flow service cannot be served or quality of service of a service is reduced because the SMF network element immediately deletes or modifies the QoS flow when resources of the access network apparatus are temporarily short.

In a possible implementation, the method further includes: if the first QoS target cannot be met in the second preset time, sending, by the access network apparatus, third indication information to the SMF network element, where the third indication information is used to indicate that the first QoS target cannot be met.

In a possible implementation, the method further includes: if the access network apparatus does not receive a modification procedure or deletion procedure that is for the QoS flow and that is sent by the SMF network element, sending, by the access network apparatus, a deletion request for the QoS flow to the SMF network element.

In a possible implementation, the method further includes: calculating, by a timer, the second preset time; and deleting, by the access network apparatus, the timer if the access network apparatus receives, in the second preset time, a deletion or modification request that is for the QoS flow and that is sent by the SMF network element.

In a possible implementation, the method further includes: receiving, by the access network apparatus, a second QoS target sent by the SMF network element, where the second QoS target includes a second GFBR; and modifying, by the access network apparatus, the QoS flow based on the second QoS target.

In a possible implementation, before the receiving, by the access network apparatus, a second QoS target sent by the SMF network element, the method further includes: receiving, by the access network apparatus, at least one third QoS target sent by the SMF network element; determining, by the access network apparatus, a fourth QoS target based on the third QoS target, where the fourth QoS target is a QoS target that can be met by the access network apparatus; and sending, by the access network apparatus, the fourth QoS target to the SMF network element.

In a possible implementation, before the sending, by an access network apparatus, first indication information to a session management function SMF network element, the method further includes: receiving, by the access network apparatus, at least two QoS targets of the QoS flow that are sent by the SMF network element; when the first QoS target of the QoS flow cannot be met, selecting, by the access network apparatus, a fifth QoS target from the at least two QoS targets, where the fifth QoS target is a QoS target that can be met by the access network apparatus; and sending, by the access network apparatus, the fifth QoS target to the SMF network element, so that the SMF network element determines the second QoS target based on the fifth QoS target.

A third aspect of this application provides a quality of service QoS flow control method, including: receiving, by a policy control function PCF network element, first indication information sent by a session management function SMF network element, where the first indication information is used to indicate that a first QoS target of a service cannot be met, and the first QoS target includes a first guaranteed bit rate GBR; and skipping, by the PCF network element, processing a QoS policy rule of the service if the PCF network element receives, in a first preset time, second indication information sent by the SMF network element, where the second indication information is used to indicate that the first QoS target can be met; or deleting or modifying, by the PCF network element, a QoS policy rule of the service if the PCF network element does not receive, in the first preset time, the second indication information sent by the SMF network element.

In the method, when a QoS target of a QoS flow cannot be met, the PCF network element does not immediately delete or modify the QoS policy rule that is of the service and that corresponds to the QoS flow. Instead, the PCF network element deletes or modifies the QoS policy rule of the service only when the QoS target of the QoS flow still cannot be met within a delay of the first preset time, to avoid a problem that a QoS flow service cannot be served or quality of service of a service is reduced because the PCF network element immediately deletes or modifies the QoS flow when resources of the access network apparatus are temporarily short.

In a possible implementation, the PCF network element deletes or modifies the QoS policy rule of the service if the PCF network element receives, in the first preset time, third indication information sent by the SMF network element, where the third indication information is used to indicate that the first QoS target cannot be met.

In a possible implementation, the method further includes: determining, by the PCF network element based on the first indication information, an operation to be performed on the service, where the operation is the deleting or modifying a QoS policy rule of the service, and a state of the operation is a to-be-performed state. Because determining the operation to be performed on the QoS policy rule and detecting whether the second indication information is received may be performed concurrently, this implementation can shorten a time for modifying the QoS policy rule and reduce impact on the service compared with determining, after the first preset time, to perform the modification operation on the QoS policy rule.

In a possible implementation, the modifying, by the PCF network element, a QoS policy rule of the service includes: determining, by the PCF network element, a second QoS target of the service based on QoS policy information, where the second QoS target includes a second GBR, and the QoS policy information includes at least first QoS control information and second QoS control information; and sending, by the PCF network element, the second QoS target to the SMF network element.

Because at least two pieces of QoS control information included in the QoS policy information can meet a QoS requirement of the service, the second QoS target that is of the service and that is determined by the PCF network element based on the QoS control information can meet the QoS requirement of the service. Different from the prior art, in the solution in this application, a QoS target of the service is modified from the first QoS target to the second QoS target, and QoS quality of the service is not reduced.

In a possible implementation, the QoS policy information further includes priority information of the first QoS control information and priority information of the second QoS control information; and the determining, by the PCF network element, a second QoS target of the service based on QoS policy information includes: determining, by the PCF network element, the second QoS target of the service based on the priority information of the first QoS control information and the priority information of the second QoS control information that are included in the QoS policy information.

In a possible implementation, the determining, by the PCF network element, a second QoS target of the service based on QoS policy information includes: determining, by the PCF network element, the second QoS target of the service based on guaranteed bit flow GBR information of the first QoS control information and GBR information of the second QoS control information that are included in the QoS policy information.

In a possible implementation, the determining, by the PCF network element, a second QoS target of the QoS flow based on QoS policy information includes: determining, by the PCF network element, at least one third QoS target based on the first QoS control information and the second QoS control information that are included in the QoS policy information; sending, by the PCF network element, the third QoS target to the SMF network element; receiving, by the PCF network element, a fourth QoS target sent by the SMF network element, where the fourth QoS target is determined by the SMF network element based on a QoS target that can be met by an access network apparatus; and determining, by the PCF network element, the second QoS target based on the fourth QoS target.

The PCF network element and the access network apparatus determine the second QoS target of the service through negotiation, so that it can be ensured that the second QoS target determined for the service matches a resource of the access network apparatus, and the resource of the access network apparatus can be used to a maximum extent.

In a possible implementation, the method further includes: receiving, by the PCF network element, a fifth QoS target sent by the SMF network element, where the fifth QoS target is determined by the SMF network element based on a QoS target that can be met by an access network apparatus; and the determining, by the PCF network element, a second QoS target of the service based on QoS policy information includes: determining, by the PCF network element, the second QoS target based on the fifth QoS target.

The PCF network element and the access network apparatus determine the second QoS target of the service through negotiation, so that it can be ensured that the second QoS target determined for the service matches a resource of the access network apparatus, and the resource of the access network apparatus can be used to a maximum extent.

In a possible implementation, the method further includes: receiving, by the PCF network element, at least two QoS requirements sent by an application function AF network element; and generating, by the PCF network element, the QoS policy information based on the at least two QoS requirements.

A fourth aspect of this application provides a QoS flow control method, including: receiving, by an application function AF network element, first indication information sent by a policy control function PCF network element, where the first indication information is used to indicate that a first QoS target of a service cannot be met, and the first QoS target includes a first guaranteed bit rate GBR; and skipping, by the AF network element, processing a QoS requirement of the service if the AF network element receives, in a first preset time, second indication information sent by the PCF network element, where the second indication information is used to indicate that the first QoS target can be met; or deleting or modifying, by the AF network element, a QoS requirement of the service if the AF network element does not receive, in the first preset time, the second indication information sent by the PCF network element.

In the method, when a QoS target of a QoS flow cannot be met, the AF network element does not immediately delete or modify the QoS requirement that is of the service and that corresponds to the QoS flow. Instead, the AF network element deletes or modifies the QoS requirement of the service only when the QoS target of the QoS flow still cannot be met within a delay of the first preset time, to avoid a problem that a QoS flow service cannot be served or quality of service of a service is reduced because the AF network element immediately deletes or modifies the QoS flow when resources of the access network apparatus are temporarily short.

In a possible implementation, the AF network element deletes or modifies the QoS requirement of the service if the AF network element receives, in the first preset time, third indication information sent by the PCF network element, where the third indication information is used to indicate that the first QoS target cannot be met.

In a possible implementation, the method further includes: determining, by the AF network element based on the first indication information, an operation to be performed on the service, where the operation is the deleting or modifying a QoS requirement of the service, and a state of the operation is a to-be-performed state. Because determining the modification operation to be performed on the QoS requirement and detecting whether the second indication information is received may be performed concurrently, this implementation can shorten a time for modifying the QoS requirement and reduce impact on the service compared with determining, after the first preset time, to perform the modification operation on the QoS requirement.

In a possible implementation, the modifying, by the AF network element, a QoS requirement of the service includes: determining, by the AF network element, a second QoS target of the service based on QoS policy information, where the second QoS target includes a second GBR, and the QoS policy information includes at least first QoS requirement information and second QoS requirement information; and sending, by the AF network element, the second QoS target to the PCF network element.

Because the at least two pieces of QoS requirement information included in the QoS policy information can meet the QoS requirement of the service, the second QoS target that is of the service and that is determined by the AF network element based on QoS control information can meet the QoS requirement of the service. Different from the prior art, in the solution in this embodiment, a QoS target of the service is modified from the first QoS target to the second QoS target, and QoS quality of the service is not reduced.

In a possible implementation, the QoS policy information further includes priority information of the first QoS requirement information and priority information of the second QoS requirement information; and the determining, by the AF network element, a second QoS target of the service based on QoS policy information includes: determining, by the AF network element, the second QoS target of the service based on the priority information of the first QoS requirement information and the priority information of the second QoS requirement information that are included in the QoS policy information.

In a possible implementation, the determining, by the AF network element, a second QoS target of the service based on QoS policy information includes: determining, by the AF network element, the second QoS target of the service based on guaranteed bit rate GBR information of the first QoS requirement information and GBR information of the second QoS requirement information that are included in the QoS policy information.

In a possible implementation, the determining, by the AF network element, a second QoS target of the QoS flow based on QoS policy information includes: determining, by the AF network element, at least one third QoS target based on the first QoS requirement information and the second QoS requirement information that are included in the QoS policy information; sending, by the AF network element, the third QoS target to the PCF network element; receiving, by the AF network element, a fourth QoS target sent by the PCF network element, where the fourth QoS target is determined by the PCF network element based on a QoS target that can be met by an access network apparatus; and determining, by the AF network element, the second QoS target based on the fourth QoS target.

The AF network element and the access network apparatus determine the second QoS target of the service through negotiation, so that it can be ensured that the second QoS target determined for the service matches a resource of the access network apparatus, and the resource of the access network apparatus can be used to a maximum extent.

In a possible implementation, the method further includes: receiving, by the AF network element, a fifth QoS target sent by the PCF network element, where the fifth QoS target is determined by the PCF network element based on a QoS target that can be met by an access network apparatus; and the determining, by the AF network element, a second QoS target of the service based on QoS policy information includes: determining, by the AF network element, the second QoS target based on the fifth QoS target.

The AF network element and the access network apparatus determine the second QoS target of the service through negotiation, so that it can be ensured that the second QoS target determined for the service matches a resource of the access network apparatus, and the resource of the access network apparatus can be used to a maximum extent.

A fifth aspect of this application provides a QoS flow control method, including: receiving, by an SMF network element, first indication information sent by an access network apparatus, where the first indication information is used to indicate that a first QoS target of a QoS flow cannot be met, the first QoS target includes a first GFBR, and the QoS flow is a flow on which same QoS processing is performed; determining, by the SMF network element, a second QoS target of the QoS flow based on QoS policy information, where the second QoS target includes a second GFBR, and the QoS policy information includes at least first QoS control information and second QoS control information; and sending, by the SMF network element, the second QoS target to the access network apparatus.

In a possible implementation, the QoS policy information further includes at least priority information of the first QoS control information and priority information of the second QoS control information; and the determining, by the SMF network element, a second QoS target of the QoS flow based on QoS policy information includes: determining, by the SMF network element, the second QoS target of the QoS flow based on the priority information of the first QoS control information and the priority information of the second QoS control information that are included in the QoS policy information.

In a possible implementation, the determining, by the SMF network element, a second QoS target of the QoS flow based on QoS policy information includes: determining, by the SMF network element, the second QoS target of the QoS flow based on guaranteed bit flow GBR information of the first QoS control information and GBR information of the second QoS control information that are included in the QoS policy information.

In a possible implementation, the determining, by the SMF network element, a second QoS target of the QoS flow based on QoS policy information includes: determining, by the SMF network element, at least one third QoS target based on the first QoS control information and the second QoS control information that are included in the QoS policy information; sending, by the SMF network element, the third QoS target to the access network apparatus; receiving, by the SMF network element, a fourth QoS target sent by the access network apparatus, where the fourth QoS target is determined by the access network apparatus based on the third QoS target, and the fourth QoS target is a QoS target that can be met by the access network apparatus; and determining, by the SMF network element, the second QoS target based on the fourth QoS target.

In a possible implementation, the method further includes: sending, by the SMF network element, at least two QoS targets of the QoS flow to the access network apparatus based on the QoS policy information; and receiving, by the SMF network element, a fifth QoS target sent by the access network apparatus, where the fifth QoS target is a QoS target that can be met by the access network apparatus, and the fifth QoS target is determined by the access network apparatus based on the at least two QoS targets when the first QoS target of the QoS flow cannot be met; and the determining, by the SMF network element, a second QoS target of the QoS flow based on QoS policy information includes: determining, by the SMF network element, the second QoS target based on the fifth QoS target.

In a possible implementation, the method further includes: receiving, by the SMF network element, the QoS policy information sent by a policy control function PCF network element, where the QoS policy information is generated by the PCF network element based on at least two QoS requirements sent by an application function AF network element.

A sixth aspect of this application provides a QoS flow control method, including: receiving, by a policy control function PCF network element, first indication information sent by a session management function SMF network element, where the first indication information is used to indicate that a first QoS target of a service cannot be met, and the first QoS target includes a first guaranteed bit rate GBR; determining, by the PCF network element, a second QoS target of the service based on QoS policy information, where the second QoS target includes a second GBR, and the QoS policy information includes at least first QoS control information and second QoS control information; and sending, by the PCF network element, the second QoS target to the SMF network element.

In a possible implementation, the QoS policy information further includes priority information of the first QoS control information and priority information of the second QoS control information; and the determining, by the PCF network element, a second QoS target of the service based on QoS policy information includes: determining, by the PCF network element, the second QoS target of the service based on the priority information of the first QoS control information and the priority information of the second QoS control information that are included in the QoS policy information.

In a possible implementation, the determining, by the PCF network element, a second QoS target of the service based on QoS policy information includes: determining, by the PCF network element, the second QoS target of the service based on guaranteed bit flow GBR information of the first QoS control information and GBR information of the second QoS control information that are included in the QoS policy information.

In a possible implementation, the determining, by the PCF network element, a second QoS target of the QoS flow based on QoS policy information includes: determining, by the PCF network element, at least one third QoS target based on the first QoS control information and the second QoS control information that are included in the QoS policy information; sending, by the PCF network element, the third QoS target to the SMF network element; receiving, by the PCF network element, a fourth QoS target sent by the SMF network element, where the fourth QoS target is determined by the SMF network element based on a QoS target that can be met by an access network apparatus; and determining, by the PCF network element, the second QoS target based on the fourth QoS target.

In a possible implementation, the method further includes: receiving, by the PCF network element, a fifth QoS target sent by the SMF network element, where the fifth QoS target is determined by the SMF network element based on a QoS target that can be met by an access network apparatus; and the determining, by the PCF network element, a second QoS target of the service based on QoS policy information includes: determining, by the PCF network element, the second QoS target based on the fifth QoS target.

In a possible implementation, the method further includes: receiving, by the PCF network element, at least two QoS requirements sent by an application function AF network element; and generating, by the PCF network element, the QoS policy information based on the at least two QoS requirements.

A seventh aspect of this application provides a QoS flow control method, including: receiving, by an application function AF network element, first indication information sent by a policy control function PCF network element, where the first indication information is used to indicate that a first QoS target of a service cannot be met, and the first QoS target includes a first guaranteed bit rate GBR; determining, by the AF network element, a second QoS target of the service based on QoS policy information, where the second QoS target includes a second GBR, and the QoS policy information includes at least first QoS requirement information and second QoS requirement information; and sending, by the AF network element, the second QoS target to the PCF network element.

In a possible implementation, the QoS policy information further includes priority information of the first QoS requirement information and priority information of the second QoS requirement information; and the determining, by the AF network element, a second QoS target of the service based on QoS policy information includes: determining, by the AF network element, the second QoS target of the service based on the priority information of the first QoS requirement information and the priority information of the second QoS requirement information that are included in the QoS policy information.

In a possible implementation, the determining, by the AF network element, a second QoS target of the service based on QoS policy information includes: determining, by the AF network element, the second QoS target of the service based on guaranteed bit rate GBR information of the first QoS requirement information and GBR information of the second QoS requirement information that are included in the QoS policy information.

In a possible implementation, the determining, by the AF network element, a second QoS target of the QoS flow based on QoS policy information includes: determining, by the AF network element, at least one third QoS target based on the first QoS requirement information and the second QoS requirement information that are included in the QoS policy information; sending, by the AF network element, the third QoS target to the PCF network element; receiving, by the AF network element, a fourth QoS target sent by the PCF network element, where the fourth QoS target is determined by the PCF network element based on a QoS target that can be met by an access network apparatus; and determining, by the AF network element, the second QoS target based on the fourth QoS target.

In a possible implementation, the method further includes: receiving, by the AF network element, a fifth QoS target sent by the PCF network element, where the fifth QoS target is determined by the PCF network element based on a QoS target that can be met by an access network apparatus; and the determining, by the AF network element, a second QoS target of the service based on QoS policy information includes: determining, by the AF network element, the second QoS target based on the fifth QoS target.

An eighth aspect of this application provides a session management function SMF network element, including: a receiving module, configured to receive first indication information sent by an access network apparatus, where the first indication information is used to indicate that a first QoS target of a QoS flow cannot be met, the first QoS target includes a first guaranteed flow bit rate GFBR, and the QoS flow is a flow on which same QoS processing is performed; and a processing module, configured to: skip processing the QoS flow if the receiving module receives, in a first preset time, second indication information sent by the access network apparatus, where the second indication information is used to indicate that the first QoS target can be met; or delete or modify the QoS flow if the receiving module does not receive, in the first preset time, the second indication information sent by the access network apparatus.

In a possible implementation, the processing module is further configured to delete or modify the QoS flow if the receiving module receives, in the first preset time, third indication information sent by the access network apparatus, where the third indication information is used to indicate that the first QoS target cannot be met.

In a possible implementation, the processing module is further configured to determine, based on the first indication information, an operation to be performed on the QoS flow, where the operation is the deleting or modifying the QoS flow, and a state of the operation is a to-be-performed state.

In a possible implementation, the SMF network element further includes a sending module.

The processing module is specifically configured to determine a second QoS target of the QoS flow based on QoS policy information, where the second QoS target includes a second GFBR, and the QoS policy information includes at least first QoS control information and second QoS control information.

The sending module is configured to send the second QoS target to the access network apparatus.

In a possible implementation, the QoS policy information further includes at least priority information of the first QoS control information and priority information of the second QoS control information; and that the processing module determines a second QoS target of the QoS flow based on QoS policy information includes: determining the second QoS target of the QoS flow based on the priority information of the first QoS control information and the priority information of the second QoS control information that are included in the QoS policy information.

In a possible implementation, that the processing module determines a second QoS target of the QoS flow based on QoS policy information includes: determining the second QoS target of the QoS flow based on guaranteed bit flow GBR information of the first QoS control information and GBR information of the second QoS control information that are included in the QoS policy information.

In a possible implementation, that the processing module determines a second QoS target of the QoS flow based on QoS policy information includes: determining at least one third QoS target based on the first QoS control information and the second QoS control information that are included in the QoS policy information, where the sending module is further configured to send the third QoS target to the access network apparatus; and the receiving module is further configured to receive a fourth QoS target sent by the access network apparatus, where the fourth QoS target is determined by the access network apparatus based on the third QoS target, and the fourth QoS target is a QoS target that can be met by the access network apparatus; and determining the second QoS target based on the fourth QoS target.

In a possible implementation, the sending module is further configured to send at least two QoS targets of the QoS flow to the access network apparatus based on the QoS policy information.

The receiving module is further configured to receive a fifth QoS target sent by the access network apparatus, where the fifth QoS target is a QoS target that can be met by the access network apparatus, and the fifth QoS target is determined by the access network apparatus based on the at least two QoS targets when the first QoS target of the QoS flow cannot be met.

That the processing module determines a second QoS target of the QoS flow based on QoS policy information includes: determining the second QoS target based on the fifth QoS target.

In a possible implementation, the receiving module is further configured to: receive the QoS policy information sent by a policy control function PCF network element, where the QoS policy information is generated by the PCF network element based on at least two QoS requirements sent by an application function AF network element.

A ninth aspect of this application provides an access network apparatus, including: a sending module, configured to send first indication information to a session management function SMF network element, where the first indication information is used to indicate that a first QoS target of a QoS flow of user equipment UE cannot be met, the first QoS target includes a first guaranteed flow bit rate GFBR, and the first QoS flow is a flow on which same QoS processing is performed.

The sending module is further configured to: if the first QoS target can be met in a second preset time, send second indication information to the SMF network element, where the second indication information is used to indicate that the first QoS target can be met.

In a possible implementation, the sending module is further configured to: if the first QoS target cannot be met in the second preset time, send third indication information to the SMF network element, where the third indication information is used to indicate that the first QoS target cannot be met.

In a possible implementation, the sending module is further configured to: if the access network apparatus does not receive a modification procedure or deletion procedure that is for the QoS flow and that is sent by the SMF network element, send a deletion request for the QoS flow to the SMF network element.

In a possible implementation, a timer calculates the second preset time. The access network apparatus further includes: a processing module, configured to delete the timer if the access network apparatus receives, in the second preset time, a deletion or modification request that is for the QoS flow and that is sent by the SMF network element.

In a possible implementation, the access network apparatus further includes: a receiving module, configured to receive a second QoS target sent by the SMF network element, where the second QoS target includes a second GFBR; and a processing module, configured to modify the QoS flow based on the second QoS target.

In a possible implementation, before receiving the second QoS target sent by the SMF network element, the receiving module is further configured to receive at least one third QoS target sent by the SMF network element.

The access network apparatus further includes: a processing module, configured to determine a fourth QoS target based on the third QoS target, where the fourth QoS target is a QoS target that can be met by the access network apparatus.

The sending module is further configured to send the fourth QoS target to the SMF network element.

In a possible implementation, the access network apparatus further includes: a receiving module, configured to receive at least two QoS targets of the QoS flow that are sent by the SMF network element; and a processing module, configured to: when the first QoS target of the QoS flow cannot be met, select a fifth QoS target from the at least two QoS targets, where the fifth QoS target is a QoS target that can be met by the access network apparatus.

The sending module is further configured to send the fifth QoS target to the SMF network element, so that the SMF network element determines the second QoS target based on the fifth QoS target.

A tenth aspect of this application provides a policy control function PCF network element, including: a receiving module, configured to receive first indication information sent by a session management function SMF network element, where the first indication information is used to indicate that a first QoS target of a service cannot be met, and the first QoS target includes a first guaranteed bit rate GBR; and a processing module, configured to: skip processing a QoS policy rule of the service if the receiving module receives, in a first preset time, second indication information sent by the SMF network element, where the second indication information is used to indicate that the first QoS target can be met; or delete or modify a QoS policy rule of the service if the receiving module does not receive, in the first preset time, the second indication information sent by the SMF network element.

In a possible implementation, the processing module is further configured to: delete or modify the QoS policy rule of the service if the receiving module receives, in the first preset time, third indication information sent by the SMF network element, where the third indication information is used to indicate that the first QoS target cannot be met.

In a possible implementation, the processing module is further configured to: determine, based on the first indication information, an operation to be performed on the service, where the operation is the deleting or modifying a QoS policy rule of the service, and a state of the operation is a to-be-performed state.

In a possible implementation, that the processing module modifies a QoS policy rule of the service includes: determining a second QoS target of the service based on QoS policy information, where the second QoS target includes a second GBR, and the QoS policy information includes at least first QoS control information and second QoS control information.

The PCF network element further includes: a sending module, configured to send the second QoS target to the SMF network element.

In a possible implementation, the QoS policy information further includes priority information of the first QoS control information and priority information of the second QoS control information; and that the processing module determines a second QoS target of the service based on QoS policy information includes: determining the second QoS target of the service based on the priority information of the first QoS control information and the priority information of the second QoS control information that are included in the QoS policy information.

In a possible implementation, that the processing module determines a second QoS target of the service based on QoS policy information includes: determining the second QoS target of the service based on guaranteed bit flow GBR information of the first QoS control information and GBR information of the second QoS control information that are included in the QoS policy information.

In a possible implementation, that the processing module determines a second QoS target of the QoS flow based on QoS policy information includes: determining at least one third QoS target based on the first QoS control information and the second QoS control information that are included in the QoS policy information, where the sending module is further configured to send the third QoS target to the SMF network element; and the receiving module is further configured to receive a fourth QoS target sent by the SMF network element, where the fourth QoS target is determined by the SMF network element based on a QoS target that can be met by an access network apparatus; and determining the second QoS target based on the fourth QoS target.

In a possible implementation, the receiving module is further configured to receive a fifth QoS target sent by the SMF network element, where the fifth QoS target is determined by the SMF network element based on a QoS target that can be met by an access network apparatus.

That the processing module determines a second QoS target of the service based on QoS policy information includes: determining the second QoS target based on the fifth QoS target.

In a possible implementation, the receiving module is further configured to receive at least two QoS requirements sent by an application function AF network element.

The processing module is further configured to generate the QoS policy information based on the at least two QoS requirements.

An eleventh aspect of this application provides an application function AF, including: a receiving module, configured to receive first indication information sent by a policy control function PCF network element, where the first indication information is used to indicate that a first QoS target of a service cannot be met, and the first QoS target includes a first guaranteed bit rate GBR; and a processing module, configured to: skip processing a QoS requirement of the service if the receiving module receives, in a first preset time, second indication information sent by the PCF network element, where the second indication information is used to indicate that the first QoS target can be met; or delete or modify a QoS requirement of the service if the receiving module does not receive, in the first preset time, the second indication information sent by the PCF network element.

In a possible implementation, the processing module is further configured to: delete or modify the QoS requirement of the service if the receiving module receives, in the first preset time, third indication information sent by the PCF network element, where the third indication information is used to indicate that the first QoS target cannot be met.

In a possible implementation, the processing module is further configured to: determine, based on the first indication information, an operation to be performed on the service, where the operation is the deleting or modifying a QoS requirement of the service, and a state of the operation is a to-be-performed state.

In a possible implementation, that the processing module modifies a QoS requirement of the service includes: determining a second QoS target of the service based on QoS policy information, where the second QoS target includes a second GBR, and the QoS policy information includes at least first QoS requirement information and second QoS requirement information.

The AF network element further includes: a sending module, configured to send the second QoS target to the PCF network element.

In a possible implementation, the QoS policy information further includes priority information of the first QoS requirement information and priority information of the second QoS requirement information; and that the processing module determines a second QoS target of the service based on QoS policy information includes: determining the second QoS target of the service based on the priority information of the first QoS requirement information and the priority information of the second QoS requirement information that are included in the QoS policy information.

In a possible implementation, that the processing module determines a second QoS target of the service based on QoS policy information includes: determining the second QoS target of the service based on guaranteed bit rate GBR information of the first QoS requirement information and GBR information of the second QoS requirement information that are included in the QoS policy information.

In a possible implementation, that the processing module determines a second QoS target of the QoS flow based on QoS policy information includes: determining at least one third QoS target based on the first QoS requirement information and the second QoS requirement information that are included in the QoS policy information, where the sending module is further configured to send the third QoS target to the PCF network element; and the receiving module is further configured to receive a fourth QoS target sent by the PCF network element, where the fourth QoS target is determined by the PCF network element based on a QoS target that can be met by an access network apparatus; and determining the second QoS target based on the fourth QoS target.

In a possible implementation, the receiving module is further configured to receive a fifth QoS target sent by the PCF network element, where the fifth QoS target is determined by the PCF network element based on a QoS target that can be met by an access network apparatus.

That the processing module determines a second QoS target of the service based on QoS policy information includes: determining the second QoS target based on the fifth QoS target.

A twelfth aspect of this application provides an SMF network element, including: a receiving module, configured to receive first indication information sent by an access network apparatus, where the first indication information is used to indicate that a first QoS target of a QoS flow cannot be met, the first QoS target includes a first GFBR, and the QoS flow is a flow on which same QoS processing is performed; a processing module, configured to determine a second QoS target of the QoS flow based on QoS policy information, where the second QoS target includes a second GFBR, and the QoS policy information includes at least first QoS control information and second QoS control information; and a sending module, configured to send the second QoS target to the access network apparatus.

In a possible implementation, the QoS policy information further includes at least priority information of the first QoS control information and priority information of the second QoS control information; and the processing module is specifically configured to: determine the second QoS target of the QoS flow based on the priority information of the first QoS control information and the priority information of the second QoS control information that are included in the QoS policy information.

In a possible implementation, the processing module is specifically configured to: determine the second QoS target of the QoS flow based on guaranteed bit flow GBR information of the first QoS control information and GBR information of the second QoS control information that are included in the QoS policy information.

In a possible implementation, the processing module is specifically configured to: determine at least one third QoS target based on the first QoS control information and the second QoS control information that are included in the QoS policy information, where the sending module is further configured to send the third QoS target to the access network apparatus; and the receiving module is further configured to receive a fourth QoS target sent by the access network apparatus, where the fourth QoS target is determined by the access network apparatus based on the third QoS target, and the fourth QoS target is a QoS target that can be met by the access network apparatus; and determine the second QoS target based on the fourth QoS target.

In a possible implementation, the sending module is further configured to send at least two QoS targets of the QoS flow to the access network apparatus based on the QoS policy information.

The receiving module is further configured to receive a fifth QoS target sent by the access network apparatus, where the fifth QoS target is a QoS target that can be met by the access network apparatus, and the fifth QoS target is determined by the access network apparatus based on the at least two QoS targets when the first QoS target of the QoS flow cannot be met.

The processing module is specifically configured to: determine the second QoS target based on the fifth QoS target.

In a possible implementation, the receiving module is further configured to: receive the QoS policy information sent by a policy control function PCF network element, where the QoS policy information is generated by the PCF network element based on at least two QoS requirements sent by an application function AF network element.

A thirteenth aspect of this application provides a policy control function PCF network element, including: a receiving module, configured to receive first indication information sent by a session management function SMF network element, where the first indication information is used to indicate that a first QoS target of a service cannot be met, and the first QoS target includes a first guaranteed bit rate GBR; a processing module, configured to determine a second QoS target of the service based on QoS policy information, where the second QoS target includes a second GBR, and the QoS policy information includes at least first QoS control information and second QoS control information; and a sending module, configured to send the second QoS target to the SMF network element.

In a possible implementation, the QoS policy information further includes priority information of the first QoS control information and priority information of the second QoS control information; and the processing module is specifically configured to: determine the second QoS target of the service based on the priority information of the first QoS control information and the priority information of the second QoS control information that are included in the QoS policy information.

In a possible implementation, the processing module is specifically configured to: determine the second QoS target of the service based on guaranteed bit flow GBR information of the first QoS control information and GBR information of the second QoS control information that are included in the QoS policy information.

In a possible implementation, the processing module is specifically configured to: determine at least one third QoS target based on the first QoS control information and the second QoS control information that are included in the QoS policy information, where the sending module is further configured to send the third QoS target to the SMF network element; and the receiving module is further configured to receive a fourth QoS target sent by the SMF network element, where the fourth QoS target is determined by the SMF network element based on a QoS target that can be met by an access network apparatus; and determine the second QoS target based on the fourth QoS target.

In a possible implementation, the receiving module is further configured to receive a fifth QoS target sent by the SMF network element, where the fifth QoS target is determined by the SMF network element based on a QoS target that can be met by an access network apparatus.

The processing module is specifically configured to: determine the second QoS target based on the fifth QoS target.

In a possible implementation, the receiving module is further configured to: receive at least two QoS requirements sent by an application function AF network element.

The processing module is further configured to generate the QoS policy information based on the at least two QoS requirements.

A fourteenth aspect of this application provides an application function AF network element, including: a receiving module, configured to receive first indication information sent by a policy control function PCF network element, where the first indication information is used to indicate that a first QoS target of a service cannot be met, and the first QoS target includes a first guaranteed bit rate GBR; a processing module, configured to determine a second QoS target of the service based on QoS policy information, where the second QoS target includes a second GBR, and the QoS policy information includes at least first QoS requirement information and second QoS requirement information; and a sending module, configured to send the second QoS target to the PCF network element.

In a possible implementation, the QoS policy information further includes priority information of the first QoS requirement information and priority information of the second QoS requirement information; and the processing module is specifically configured to: determine the second QoS target of the service based on the priority information of the first QoS requirement information and the priority information of the second QoS requirement information that are included in the QoS policy information.

In a possible implementation, the processing module is specifically configured to: determine the second QoS target of the service based on guaranteed bit rate GBR information of the first QoS requirement information and GBR information of the second QoS requirement information that are included in the QoS policy information.

In a possible implementation, the processing module is specifically configured to: determine at least one third QoS target based on the first QoS requirement information and the second QoS requirement information that are included in the QoS policy information, where the sending module is further configured to send the third QoS target to the PCF network element; and the receiving module is further configured to receive a fourth QoS target sent by the PCF network element, where the fourth QoS target is determined by the PCF network element based on a QoS target that can be met by an access network apparatus; and determine the second QoS target based on the fourth QoS target.

In a possible implementation, the receiving module is further configured to: receive a fifth QoS target sent by the PCF network element, where the fifth QoS target is determined by the PCF network element based on a QoS target that can be met by an access network apparatus.

The processing module is specifically configured to: determine the second QoS target based on the fifth QoS target.

A fifteenth aspect of this application provides a session management function SMF network element, including: a receiver, configured to receive first indication information sent by an access network apparatus, where the first indication information is used to indicate that a first QoS target of a QoS flow cannot be met, the first QoS target includes a first guaranteed flow bit rate GFBR, and the QoS flow is a flow on which same QoS processing is performed; and a processor, configured to: skip processing the QoS flow if the receiver receives, in a first preset time, second indication information sent by the access network apparatus, where the second indication information is used to indicate that the first QoS target can be met; or delete or modify the QoS flow if the receiver module does not receive, in the first preset time, the second indication information sent by the access network apparatus.

In a possible implementation, the processor is further configured to delete or modify the QoS flow if the receiver receives, in the first preset time, third indication information sent by the access network apparatus, where the third indication information is used to indicate that the first QoS target cannot be met.

In a possible implementation, the processor is further configured to determine, based on the first indication information, an operation to be performed on the QoS flow, where the operation is the deleting or modifying the QoS flow, and a state of the operation is a to-be-performed state.

In a possible implementation, the SMF network element further includes a transmitter.

The processor is specifically configured to determine a second QoS target of the QoS flow based on QoS policy information, where the second QoS target includes a second GFBR, and the QoS policy information includes at least first QoS control information and second QoS control information.

The transmitter is configured to send the second QoS target to the access network apparatus.

In a possible implementation, the QoS policy information further includes at least priority information of the first QoS control information and priority information of the second QoS control information; and that the processor determines a second QoS target of the QoS flow based on QoS policy information includes: determining the second QoS target of the QoS flow based on the priority information of the first QoS control information and the priority information of the second QoS control information that are included in the QoS policy information.

In a possible implementation, that the processor determines a second QoS target of the QoS flow based on QoS policy information includes: determining the second QoS target of the QoS flow based on guaranteed bit flow GBR information of the first QoS control information and GBR information of the second QoS control information that are included in the QoS policy information.

In a possible implementation, that the processor determines a second QoS target of the QoS flow based on QoS policy information includes: determining at least one third QoS target based on the first QoS control information and the second QoS control information that are included in the QoS policy information, where the transmitter is further configured to send the third QoS target to the access network apparatus; and the receiver is further configured to receive a fourth QoS target sent by the access network apparatus, where the fourth QoS target is determined by the access network apparatus based on the third QoS target, and the fourth QoS target is a QoS target that can be met by the access network apparatus; and determining the second QoS target based on the fourth QoS target.

In a possible implementation, the transmitter is further configured to send at least two QoS targets of the QoS flow to the access network apparatus based on the QoS policy information.

The receiver is further configured to receive a fifth QoS target sent by the access network apparatus, where the fifth QoS target is a QoS target that can be met by the access network apparatus, and the fifth QoS target is determined by the access network apparatus based on the at least two QoS targets when the first QoS target of the QoS flow cannot be met.

That the processor determines a second QoS target of the QoS flow based on QoS policy information includes: determining the second QoS target based on the fifth QoS target.

In a possible implementation, the receiver is further configured to: receive the QoS policy information sent by a policy control function PCF network element, where the QoS policy information is generated by the PCF network element based on at least two QoS requirements sent by an application function AF network element.

A sixteenth aspect of this application provides an access network apparatus, including: a transmitter, configured to send first indication information to a session management function SMF network element, where the first indication information is used to indicate that a first QoS target of a QoS flow of user equipment UE cannot be met, the first QoS target includes a first guaranteed flow bit rate GFBR, and the first QoS flow is a flow on which same QoS processing is performed.

The transmitter is further configured to: if the first QoS target can be met in a second preset time, send second indication information to the SMF network element, where the second indication information is used to indicate that the first QoS target can be met.

In a possible implementation, the transmitter is further configured to: if the first QoS target cannot be met in the second preset time, send third indication information to the SMF network element, where the third indication information is used to indicate that the first QoS target cannot be met.

In a possible implementation, the transmitter is further configured to: if the access network apparatus does not receive a modification procedure or deletion procedure that is for the QoS flow and that is sent by the SMF network element, send a deletion request for the QoS flow to the SMF network element.

In a possible implementation, the access network apparatus further includes: a processor, configured to delete the second preset time if the access network apparatus receives, in the second preset time, a deletion or modification request that is for the QoS flow and that is sent by the SMF network element.

In a possible implementation, the access network apparatus further includes: a receiver, configured to receive a second QoS target sent by the SMF network element, where the second QoS target includes a second GFBR; and a processor, configured to modify the QoS flow based on the second QoS target.

In a possible implementation, before receiving the second QoS target sent by the SMF network element, the receiver is further configured to receive at least one third QoS target sent by the SMF network element.

The access network apparatus further includes: a processor, configured to determine a fourth QoS target based on the third QoS target, where the fourth QoS target is a QoS target that can be met by the access network apparatus.

The transmitter is further configured to send the fourth QoS target to the SMF network element.

In a possible implementation, the access network apparatus further includes: a receiver, configured to receive at least two QoS targets of the QoS flow that are sent by the SMF network element; and a processor, configured to: when the first QoS target of the QoS flow cannot be met, select a fifth QoS target from the at least two QoS targets, where the fifth QoS target is a QoS target that can be met by the access network apparatus.

The transmitter is further configured to send the fifth QoS target to the SMF network element, so that the SMF network element determines the second QoS target based on the fifth QoS target.

A seventeenth aspect of this application provides a policy control function PCF network element, including: a receiver, configured to receive first indication information sent by a session management function SMF network element, where the first indication information is used to indicate that a first QoS target of a service cannot be met, and the first QoS target includes a first guaranteed bit rate GBR; and a processor, configured to: skip processing a QoS policy rule of the service if the receiver receives, in a first preset time, second indication information sent by the SMF network element, where the second indication information is used to indicate that the first QoS target can be met; or delete or modify a QoS policy rule of the service if the receiver does not receive, in the first preset time, the second indication information sent by the SMF network element.

In a possible implementation, the processor is further configured to: delete or modify the QoS policy rule of the service if the receiver receives, in the first preset time, third indication information sent by the SMF network element, where the third indication information is used to indicate that the first QoS target cannot be met.

In a possible implementation, the processor is further configured to: determine, based on the first indication information, an operation to be performed on the service, where the operation is the deleting or modifying a QoS policy rule of the service, and a state of the operation is a to-be-performed state.

In a possible implementation, that the processor modifies a QoS policy rule of the service includes: determining a second QoS target of the service based on QoS policy information, where the second QoS target includes a second GBR, and the QoS policy information includes at least first QoS control information and second QoS control information.

The PCF network element further includes: a transmitter, configured to send the second QoS target to the SMF network element.

In a possible implementation, the QoS policy information further includes priority information of the first QoS control information and priority information of the second QoS control information; and that the processor determines a second QoS target of the service based on QoS policy information includes: determining the second QoS target of the service based on the priority information of the first QoS control information and the priority information of the second QoS control information that are included in the QoS policy information.

In a possible implementation, that the processor determines a second QoS target of the service based on QoS policy information includes: determining the second QoS target of the service based on guaranteed bit flow GBR information of the first QoS control information and GBR information of the second QoS control information that are included in the QoS policy information.

In a possible implementation, that the processor determines a second QoS target of the QoS flow based on QoS policy information includes: determining at least one third QoS target based on the first QoS control information and the second QoS control information that are included in the QoS policy information, where the transmitter is further configured to send the third QoS target to the SMF network element; and the receiver is further configured to receive a fourth QoS target sent by the SMF network element, where the fourth QoS target is determined by the SMF network element based on a QoS target that can be met by an access network apparatus; and determining the second QoS target based on the fourth QoS target.

In a possible implementation, the receiver is further configured to receive a fifth QoS target sent by the SMF network element, where the fifth QoS target is determined by the SMF network element based on a QoS target that can be met by an access network apparatus.

That the processor determines a second QoS target of the service based on QoS policy information includes: determining the second QoS target based on the fifth QoS target.

In a possible implementation, the receiver is further configured to receive at least two QoS requirements sent by an application function AF network element.

The processor is further configured to generate the QoS policy information based on the at least two QoS requirements.

An eighteenth aspect of this application provides an application function AF, including: a receiver, configured to receive first indication information sent by a policy control function PCF network element, where the first indication information is used to indicate that a first QoS target of a service cannot be met, and the first QoS target includes a first guaranteed bit rate GBR; and a processor, configured to: skip processing a QoS requirement of the service if the receiver receives, in a first preset time, second indication information sent by the PCF network element, where the second indication information is used to indicate that the first QoS target can be met; or delete or modify a QoS requirement of the service if the receiver does not receive, in the first preset time, the second indication information sent by the PCF network element.

In a possible implementation, the processor is further configured to: delete or modify the QoS requirement of the service if the receiver receives, in the first preset time, third indication information sent by the PCF network element, where the third indication information is used to indicate that the first QoS target cannot be met.

In a possible implementation, the processor is further configured to: determine, based on the first indication information, an operation to be performed on the service, where the operation is the deleting or modifying a QoS requirement of the service, and a state of the operation is a to-be-performed state.

In a possible implementation, that the processor modifies a QoS requirement of the service includes: determining a second QoS target of the service based on QoS policy information, where the second QoS target includes a second GBR, and the QoS policy information includes at least first QoS requirement information and second QoS requirement information.

The AF network element further includes: a transmitter, configured to send the second QoS target to the PCF network element.

In a possible implementation, the QoS policy information further includes priority information of the first QoS requirement information and priority information of the second QoS requirement information; and that the processor determines a second QoS target of the service based on QoS policy information includes: determining the second QoS target of the service based on the priority information of the first QoS requirement information and the priority information of the second QoS requirement information that are included in the QoS policy information.

In a possible implementation, that the processor determines a second QoS target of the service based on QoS policy information includes: determining the second QoS target of the service based on guaranteed bit rate GBR information of the first QoS requirement information and GBR information of the second QoS requirement information that are included in the QoS policy information.

In a possible implementation, that the processor determines a second QoS target of the QoS flow based on QoS policy information includes: determining at least one third QoS target based on the first QoS requirement information and the second QoS requirement information that are included in the QoS policy information, where the transmitter is further configured to send the third QoS target to the PCF network element; and the receiver is further configured to receive a fourth QoS target sent by the PCF network element, where the fourth QoS target is determined by the PCF network element based on a QoS target that can be met by an access network apparatus; and determining the second QoS target based on the fourth QoS target.

In a possible implementation, the receiver is further configured to receive a fifth QoS target sent by the PCF network element, where the fifth QoS target is determined by the PCF network element based on a QoS target that can be met by an access network apparatus.

That the processor determines a second QoS target of the service based on QoS policy information includes: determining the second QoS target based on the fifth QoS target.

A nineteenth aspect of this application provides an SMF network element, including: a receiver, configured to receive first indication information sent by an access network apparatus, where the first indication information is used to indicate that a first QoS target of a QoS flow cannot be met, the first QoS target includes a first GFBR, and the QoS flow is a flow on which same QoS processing is performed; a processor, configured to determine a second QoS target of the QoS flow based on QoS policy information, where the second QoS target includes a second GFBR, and the QoS policy information includes at least first QoS control information and second QoS control information; and a transmitter, configured to send the second QoS target to the access network apparatus.

In a possible implementation, the QoS policy information further includes at least priority information of the first QoS control information and priority information of the second QoS control information; and the processor is specifically configured to: determine the second QoS target of the QoS flow based on the priority information of the first QoS control information and the priority information of the second QoS control information that are included in the QoS policy information.

In a possible implementation, the processor is specifically configured to: determine the second QoS target of the QoS flow based on guaranteed bit flow GBR information of the first QoS control information and GBR information of the second QoS control information that are included in the QoS policy information.

In a possible implementation, the processor is specifically configured to: determine at least one third QoS target based on the first QoS control information and the second QoS control information that are included in the QoS policy information, where the transmitter is further configured to send the third QoS target to the access network apparatus; and the receiver is further configured to receive a fourth QoS target sent by the access network apparatus, where the fourth QoS target is determined by the access network apparatus based on the third QoS target, and the fourth QoS target is a QoS target that can be met by the access network apparatus; and determine the second QoS target based on the fourth QoS target.

In a possible implementation, the transmitter is further configured to send at least two QoS targets of the QoS flow to the access network apparatus based on the QoS policy information.

The receiver is further configured to receive a fifth QoS target sent by the access network apparatus, where the fifth QoS target is a QoS target that can be met by the access network apparatus, and the fifth QoS target is determined by the access network apparatus based on the at least two QoS targets when the first QoS target of the QoS flow cannot be met.

The processor is specifically configured to: determine the second QoS target based on the fifth QoS target.

In a possible implementation, the receiver is further configured to: receive the QoS policy information sent by a policy control function PCF network element, where the QoS policy information is generated by the PCF network element based on at least two QoS requirements sent by an application function AF network element.

A twentieth aspect of this application provides a policy control function PCF network element, including: a receiver, configured to receive first indication information sent by a session management function SMF network element, where the first indication information is used to indicate that a first QoS target of a service cannot be met, and the first QoS target includes a first guaranteed bit rate GBR; a processor, configured to determine a second QoS target of the service based on QoS policy information, where the second QoS target includes a second GBR, and the QoS policy information includes at least first QoS control information and second QoS control information; and a transmitter, configured to send the second QoS target to the SMF network element.

In a possible implementation, the QoS policy information further includes priority information of the first QoS control information and priority information of the second QoS control information; and the processor is specifically configured to: determine the second QoS target of the service based on the priority information of the first QoS control information and the priority information of the second QoS control information that are included in the QoS policy information.

In a possible implementation, the processor is specifically configured to: determine the second QoS target of the service based on guaranteed bit flow GBR information of the first QoS control information and GBR information of the second QoS control information that are included in the QoS policy information.

In a possible implementation, the processor is specifically configured to: determine at least one third QoS target based on the first QoS control information and the second QoS control information that are included in the QoS policy information, where the transmitter is further configured to send the third QoS target to the SMF network element; and the receiver is further configured to receive a fourth QoS target sent by the SMF network element, where the fourth QoS target is determined by the SMF network element based on a QoS target that can be met by an access network apparatus; and determine the second QoS target based on the fourth QoS target.

In a possible implementation, the receiver is further configured to receive a fifth QoS target sent by the SMF network element, where the fifth QoS target is determined by the SMF network element based on a QoS target that can be met by an access network apparatus.

The processor is specifically configured to: determine the second QoS target based on the fifth QoS target.

In a possible implementation, the receiver is further configured to: receive at least two QoS requirements sent by an application function AF network element.

The processor is further configured to generate the QoS policy information based on the at least two QoS requirements.

A twenty-first aspect of this application provides an application function AF network element, including: a receiver, configured to receive first indication information sent by a policy control function PCF network element, where the first indication information is used to indicate that a first QoS target of a service cannot be met, and the first QoS target includes a first guaranteed bit rate GBR; a processor, configured to determine a second QoS target of the service based on QoS policy information, where the second QoS target includes a second GBR, and the QoS policy information includes at least first QoS requirement information and second QoS requirement information; and a transmitter, configured to send the second QoS target to the PCF network element.

In a possible implementation, the QoS policy information further includes priority information of the first QoS requirement information and priority information of the second QoS requirement information; and the processor is specifically configured to: determine the second QoS target of the service based on the priority information of the first QoS requirement information and the priority information of the second QoS requirement information that are included in the QoS policy information.

In a possible implementation, the processor is specifically configured to: determine the second QoS target of the service based on guaranteed bit rate GBR information of the first QoS requirement information and GBR information of the second QoS requirement information that are included in the QoS policy information.

In a possible implementation, the processor is specifically configured to: determine at least one third QoS target based on the first QoS requirement information and the second QoS requirement information that are included in the QoS policy information, where the transmitter is further configured to send the third QoS target to the PCF network element; and the receiver is further configured to receive a fourth QoS target sent by the PCF network element, where the fourth QoS target is determined by the PCF network element based on a QoS target that can be met by an access network apparatus; and determine the second QoS target based on the fourth QoS target.

In a possible implementation, the receiver is further configured to: receive a fifth QoS target sent by the PCF network element, where the fifth QoS target is determined by the PCF network element based on a QoS target that can be met by an access network apparatus.

The processor is specifically configured to: determine the second QoS target based on the fifth QoS target.

A twenty-second aspect of this application provides a computer readable storage medium. The computer readable storage medium stores an instruction. When the instruction is executed, a computer is enabled to perform the QoS flow control method according to the first aspect of this application.

A twenty-third aspect of this application provides a computer readable storage medium. The computer readable storage medium stores an instruction. When the instruction is executed, a computer is enabled to perform the QoS flow control method according to the second aspect of this application.

A twenty-fourth aspect of this application provides a computer readable storage medium. The computer readable storage medium stores an instruction. When the instruction is executed, a computer is enabled to perform the QoS flow control method according to the third aspect of this application.

A twenty-fifth aspect of this application provides a computer readable storage medium. The computer readable storage medium stores an instruction. When the instruction is executed, a computer is enabled to perform the QoS flow control method according to the fourth aspect of this application.

A twenty-sixth aspect of this application provides a computer readable storage medium. The computer readable storage medium stores an instruction. When the instruction is executed, a computer is enabled to perform the QoS flow control method according to the fifth aspect of this application.

A twenty-seventh aspect of this application provides a computer readable storage medium. The computer readable storage medium stores an instruction. When the instruction is executed, a computer is enabled to perform the QoS flow control method according to the sixth aspect of this application.

A twenty-eighth aspect of this application provides a computer readable storage medium. The computer readable storage medium stores an instruction. When the instruction is executed, a computer is enabled to perform the QoS flow control method according to the seventh aspect of this application.

A twenty-ninth aspect of this application provides a system chip, including a processing unit and a communications unit. The processing unit may execute a computer instruction, so that the system chip performs the method according to any one of the first aspect to the seventh aspect.

According to the QoS flow control method and the apparatus that are provided in this application, the SMF network element receives the first indication information sent by the access network apparatus, where the first indication information is used to indicate that the first QoS target of the QoS flow cannot be met; and then the SMF network element determines whether the SMF network element receives, in the first preset time, the second indication information sent by the access network apparatus, where the second indication information is used to indicate that the first QoS target can be met. If the SMF network element receives the second indication information, the SMF network element does not process the QoS flow. If the SMF network element does not receive the second indication information, the SMF network element deletes or modifies the QoS flow. In the method, when the QoS target of the QoS flow cannot be met, the SMF network element does not immediately delete or modify the QoS flow. Instead, the SMF network element deletes or modifies the QoS flow only when the QoS target of the QoS flow still cannot be met within a delay of the first preset time, to avoid a problem that a QoS flow service cannot be served or quality of service of a service is reduced because the SMF network element immediately deletes or modifies the QoS flow when resources of the access network apparatus are temporarily short.

DETAILED DESCRIPTION OF ILLUSTRATIVE EMBODIMENTS

Figure 1:
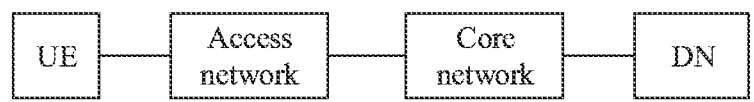
FIG. 1 is a schematic diagram of a network architecture to which this application is applicable.

This application provides a QoS flow (QoS flow) control method. The method in this application may be applied to a 5G system, or may be applied to an evolved packet system (EPS). FIG. 1 is a schematic diagram of a network architecture to which this application is applicable. As shown in FIG. 1, the network architecture includes UE, an access network (AN), a core network, and a data network (DN). The access network apparatus is mainly configured to implement functions such as a wireless physical layer function, resource scheduling, radio resource management, radio access control, and mobility management. The core network device may include a management device and a gateway device. The management device is mainly configured to perform device registration, security authentication, mobility management, location management, and the like on a terminal device. The gateway device is mainly configured to: establish a channel with the terminal device, and forward a data packet between the terminal device and an external data network on the channel. The data network may include a network device (for example, a device such as a server or a router), and the data network is mainly configured to provide a plurality of data service services for the terminal device. It should be noted that FIG. 1 is merely a diagram of an example of the architecture. In addition to the function units shown in FIG. 1, the network architecture may include another function unit. This is not limited in the embodiments of the present invention.

Figure 2:
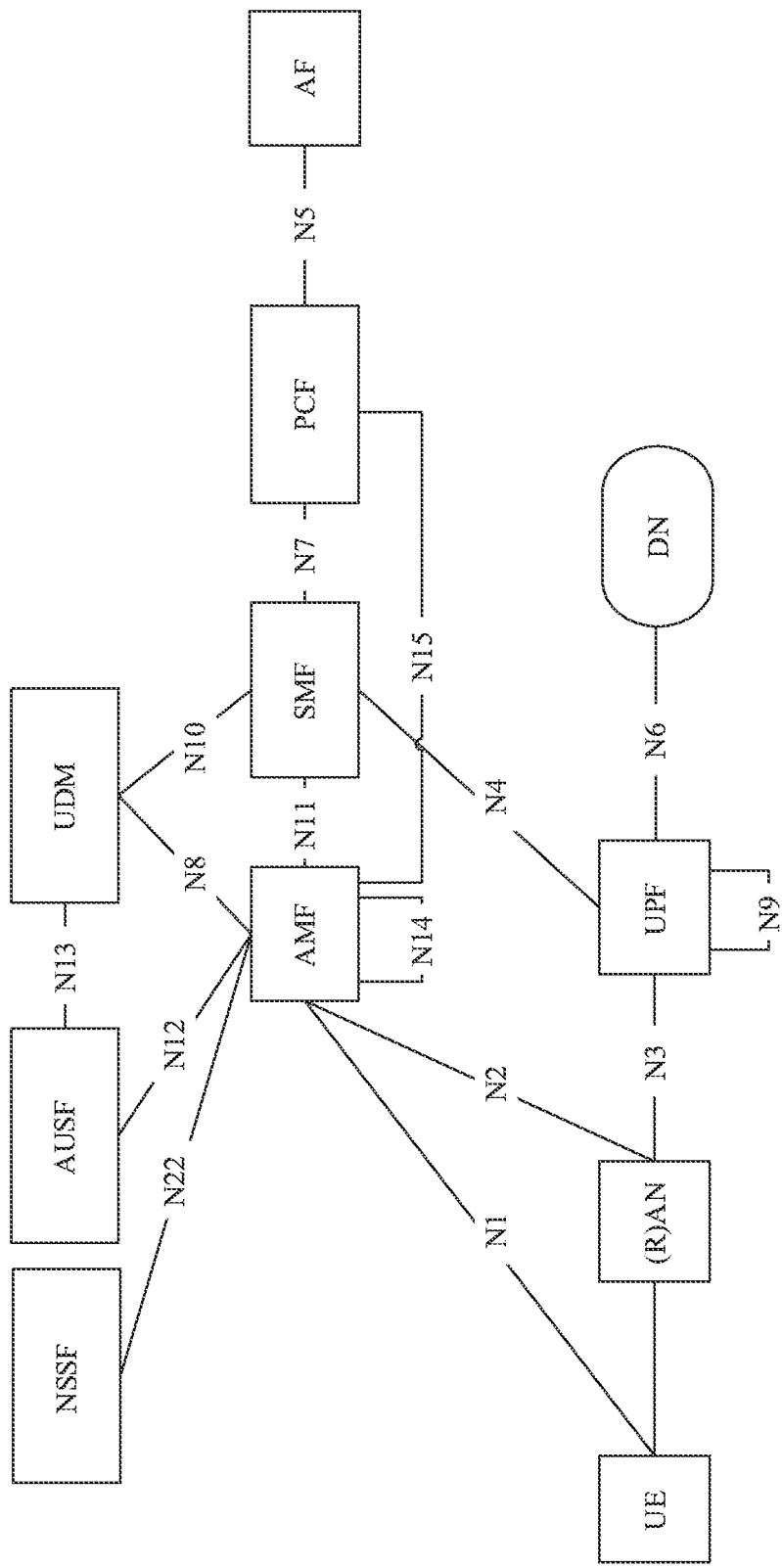
FIG. 2 is a schematic diagram of a 5G network architecture.

The network architecture may be a 5G network architecture. FIG. 2 is a schematic diagram of a 5G network architecture. The 5G system is also referred to as a new radio communications system, a new access technology (NR), or a next generation mobile communications system.

An access network (AN) in the 5G system may be a radio access network ((R)AN), and an (R)AN device in the 5G system may include a plurality of 5G-(R)AN nodes. The 5G-(R)AN nodes may include an access point (AP) in a non-3GPP access network such as a Wi-Fi network, a next generation NodeB (including a new radio NodeB (NR NodeB, gNB), a next generation evolved NodeB (NG-eNB), a gNB in which a central unit (CU) is separated from a distributed unit (DU), and the like, which may be collectively referred to as a next generation radio access network node (NG-RAN node)), a transmission reception point (TRP), a transmission point (TP), or another node.

As shown in FIG. 2, a 5G core network (5G core/new generation core, 5GC/NGC) includes a plurality of function units such as an access and mobility management function (AMF) network element, a session management function (SMF) network element, a user plane function (UPF) network element, an authentication server function (AUSF) network element, a policy control function (PCF) network element, an application function (AF) network element, a unified data management (UDM) function network element, and a network slice selection function (NSSF) network element.

The AMF network element is mainly responsible for services such as mobility management and access management. The SMF network element is mainly responsible for session management, UE address management and assignment, a dynamic host configuration protocol function, selection and control of a user plane function, and the like. The UPF is mainly responsible for functions related to external connection to a data network (DN), user plane data packet routing and forwarding, packet filtering, quality of service (QoS) control, and the like. The AUSF is mainly responsible for an authentication function of the terminal device, and the like. The PCF network element is mainly responsible for providing a unified policy framework for network behavior management, providing a policy rule of a control plane function, obtaining registration information related to a policy decision, and the like. It should be noted that these function units may work independently, or may be combined together to implement some control functions, for example, access control and mobility management functions such as access authentication, security encryption, and location registration of the terminal device, and session management functions such as establishment, release, and change of a user plane transmission path.

The function units in the 5GC may communicate with each other through a next generation (NG) network interface. For example, the UE may transmit a control plane message with the AMF network element through an NG interface 1 (N1 for short). The RAN device may establish a user plane data transmission channel with the UPF through an NG interface 3 (N3 for short). The AN/RAN device may establish a control plane signaling connection to the AMF network element through an NG interface 2 (N2 for short). The UPF may exchange information with the SMF network element through an NG interface 4 (N4 for short). The UPF may exchange user plane data with the data network DN through an NG interface 6 (N6 for short). The AMF network element may exchange information with the SMF network element through an NG interface 11 (N11 for short). The SMF network element may exchange information with the PCF network element through an NG interface 7 (N7 for short). The AMF network element may exchange information with the AUSF through an NG interface 12 (N12 for short). It should be noted that FIG. 2 is merely a diagram of an example of the architecture. In addition to the function units shown in FIG. 2, the network architecture may include another function unit.

The network architecture shown in FIG. 2 is a network architecture based on a reference point, and the network architecture is a network architecture in a non-roaming scenario. Certainly, the method in this application may also be applied to a roaming scenario, and the network architecture is not limited to the network architecture based on the reference point, or may be a network architecture based on a service-based interface.

Figure 3:
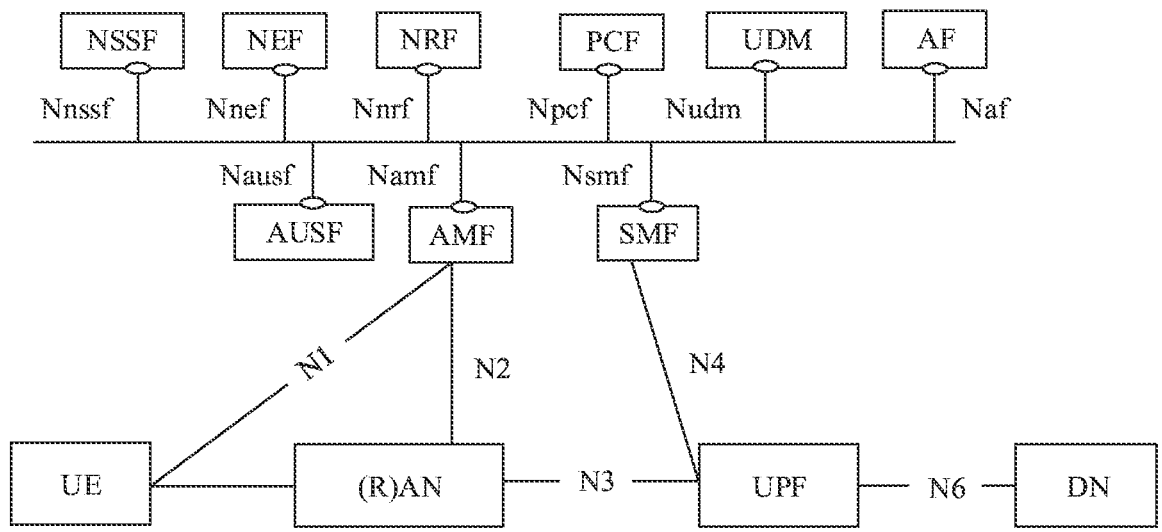
FIG. 3 is a schematic diagram of a 5G network architecture based on a service-based interface in a non-roaming scenario.

FIG. 3 is a schematic diagram of a 5G network architecture based on a service-based interface in a non-roaming scenario. As shown in FIG. 3, in the scenario based on the service-based interface, the core network in the 5G system further includes an NEF network element and an NRF network element. In the scenario based on the service-based interface, some network elements in the 5G core network are connected by using a bus. As shown in FIG. 3, the AUSF network element, the AMF network element, the SMF network element, the AF network element, the UDM, the PCF network element, the network repository function (NRF) network element, the network exposure function (NEF) network element, and the NSSF network element are interconnected by using a bus. When the network elements are interconnected by using the bus, a service-based interface is used. For example, the AUSF network element is connected to the bus through an interface Nausf, the AMF network element is connected to the bus through an interface Namf, the SMF network element is connected to the bus through an interface Nsmf, the AF network element is connected to the bus through an NAF network element interface, the UDM is connected to the bus through an interface Nudm, the PCF network element is connected to the bus through an NPCF network element interface, the NRF is connected to the bus through an interface Nnrf, the NEF is connected to the bus through an interface Nnef, and the NSSF is connected to the bus through an interface Nnssf.

According to a roaming service access policy used by a mobile terminal, there are two roaming modes: home-routed roaming access and local breakout roaming access. The home routed roaming access means that a roaming subscriber accesses a home network through a gateway (or another with a same function as that of the gateway) of the home network to obtain a service provided by the home network. The local breakout roaming access means that a roaming subscriber accesses a visited network through a gateway of the visited network to obtain a corresponding service. A provider of the service may be the home network, or may be the visited network.

Figure 4:
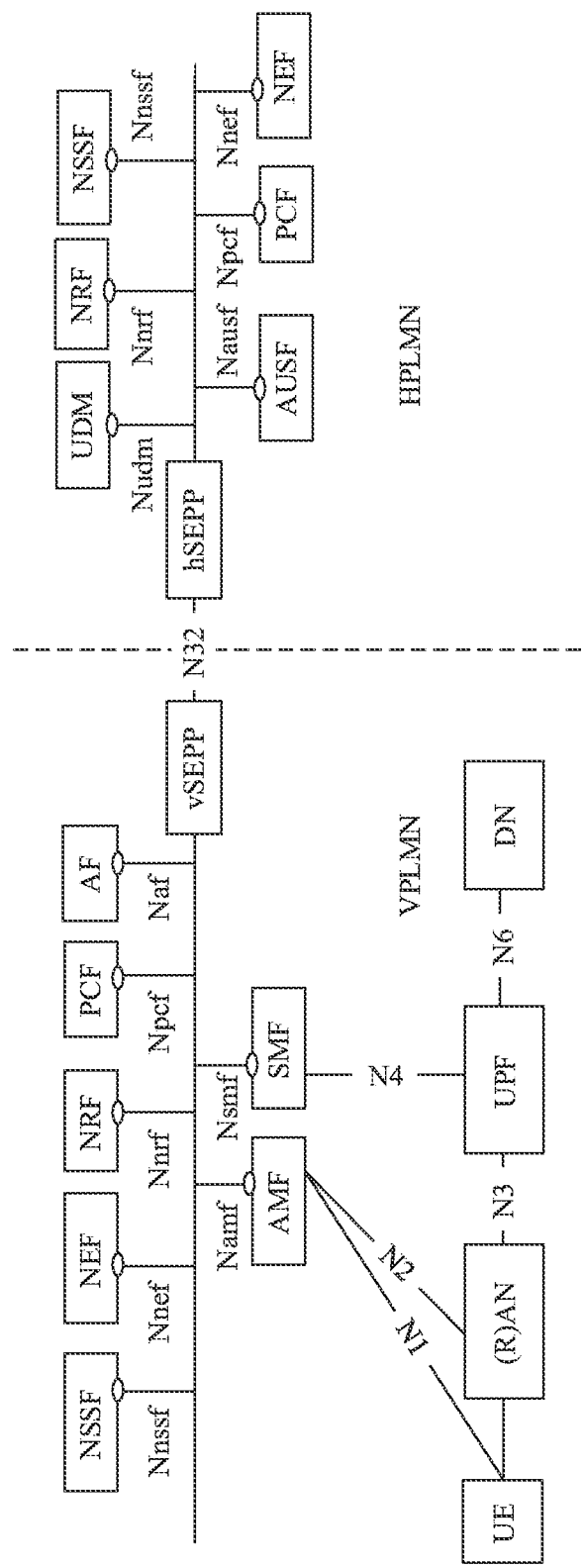
FIG. 4 is a schematic diagram of a 5G network architecture based on a service-based interface in a local breakout roaming scenario.

FIG. 4 is a schematic diagram of a 5G network architecture based on a service-based interface in a local breakout roaming scenario. As shown in FIG. 4, a visited public land mobile network (VPLMN) is connected to an hSEEP in a home public land mobile network (HPLMN) by using a vSEEP, and the vSEEP and hSEEP are connected through an interface N32. Roamed UE accesses a DN in the VPLMN.

Figure 5:
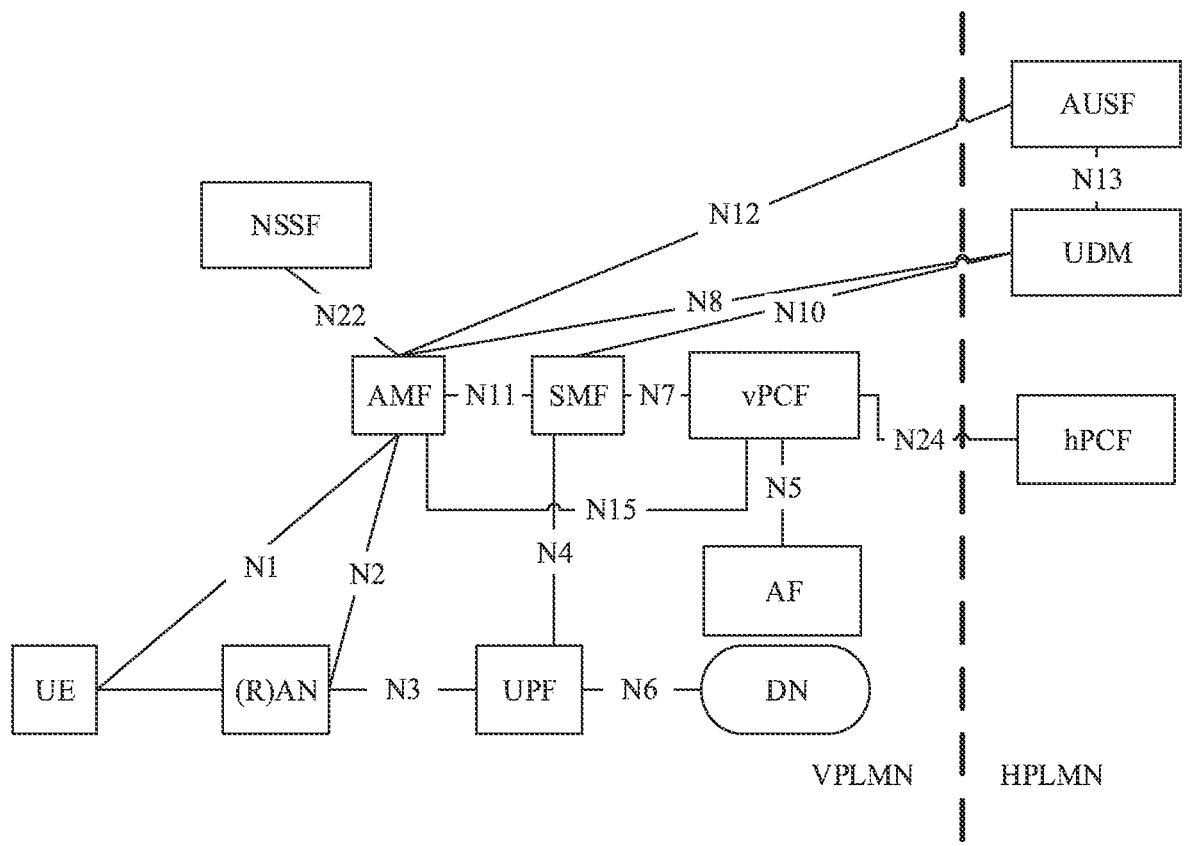
FIG. 5 is a schematic diagram of a 5G network architecture based on a reference point in a local breakout roaming scenario.

FIG. 5 is a schematic diagram of a 5G network architecture based on a reference point in a local breakout roaming scenario. As shown in FIG. 5, a visited PCF (visited PCF, vPCF) network element in a VPLMN is connected to a home PCF (home PCF, hPCF) network element in an HPLMN through an interface N24, an AMF network element in the VPLMN is connected to a UDM network element in the HPLMN through an interface N8, the AMF network element in the VPLMN is connected to an AUSF network element in the HPLMN through an interface N12, and an SMF network element in the VPLMN is connected to the UDM network element in the HPLMN through an interface N10. Roamed UE accesses a DN in the VPLMN.

Figure 6:
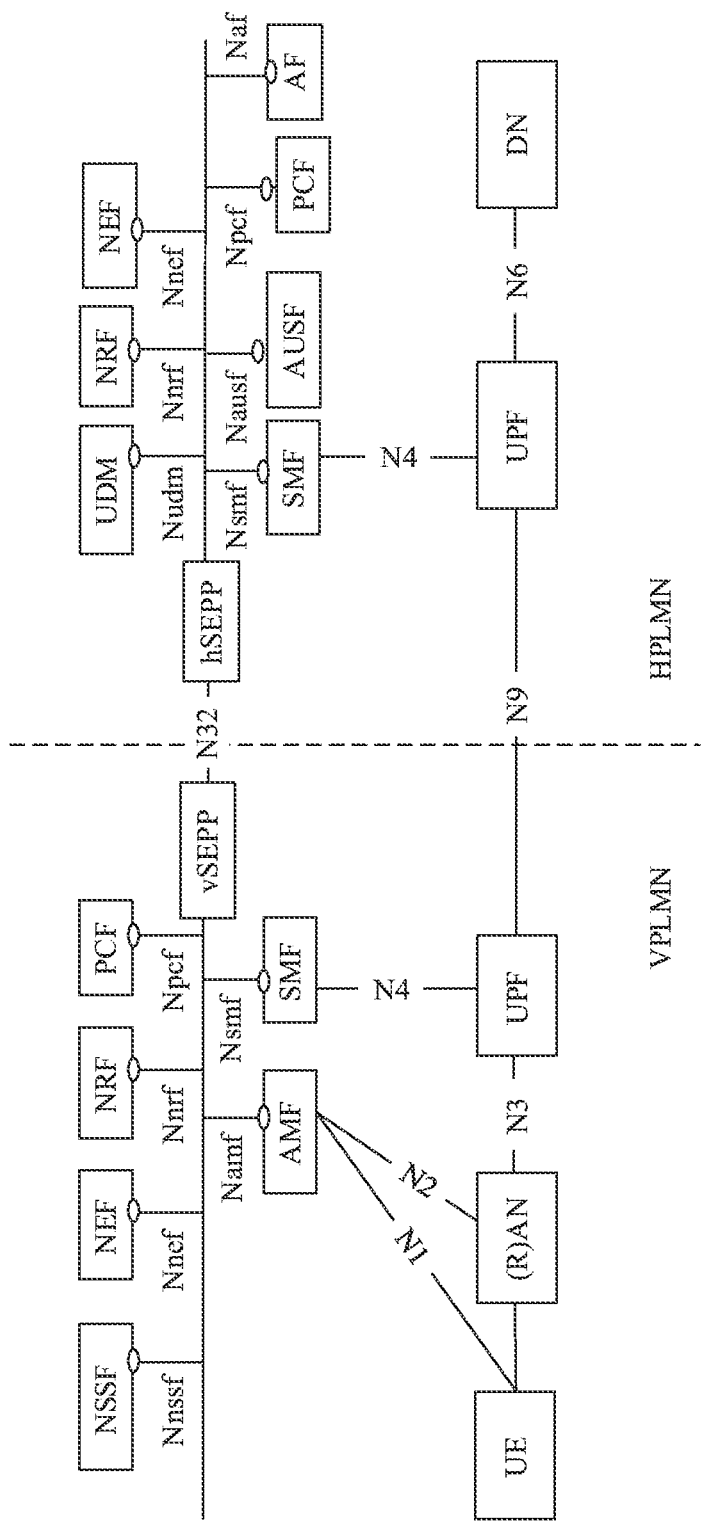
FIG. 6 is a schematic diagram of a 5G network architecture based on a service-based interface in a home routed roaming scenario.

FIG. 6 is a schematic diagram of a 5G network architecture based on a service-based interface in a home routed roaming scenario. Different from the architecture shown in FIG. 4, in the architecture shown in FIG. 6, a VPLMN is connected to an hSEEP in an HPLMN by using a vSEEP, a UPF network element in the VPLMN is connected to a UPF network element in the HPLMN through an interface N9, and the UPF network element in the HPLMN is connected to a DN, so that roamed UE accesses the DN in the HPLMN.

Figure 7:
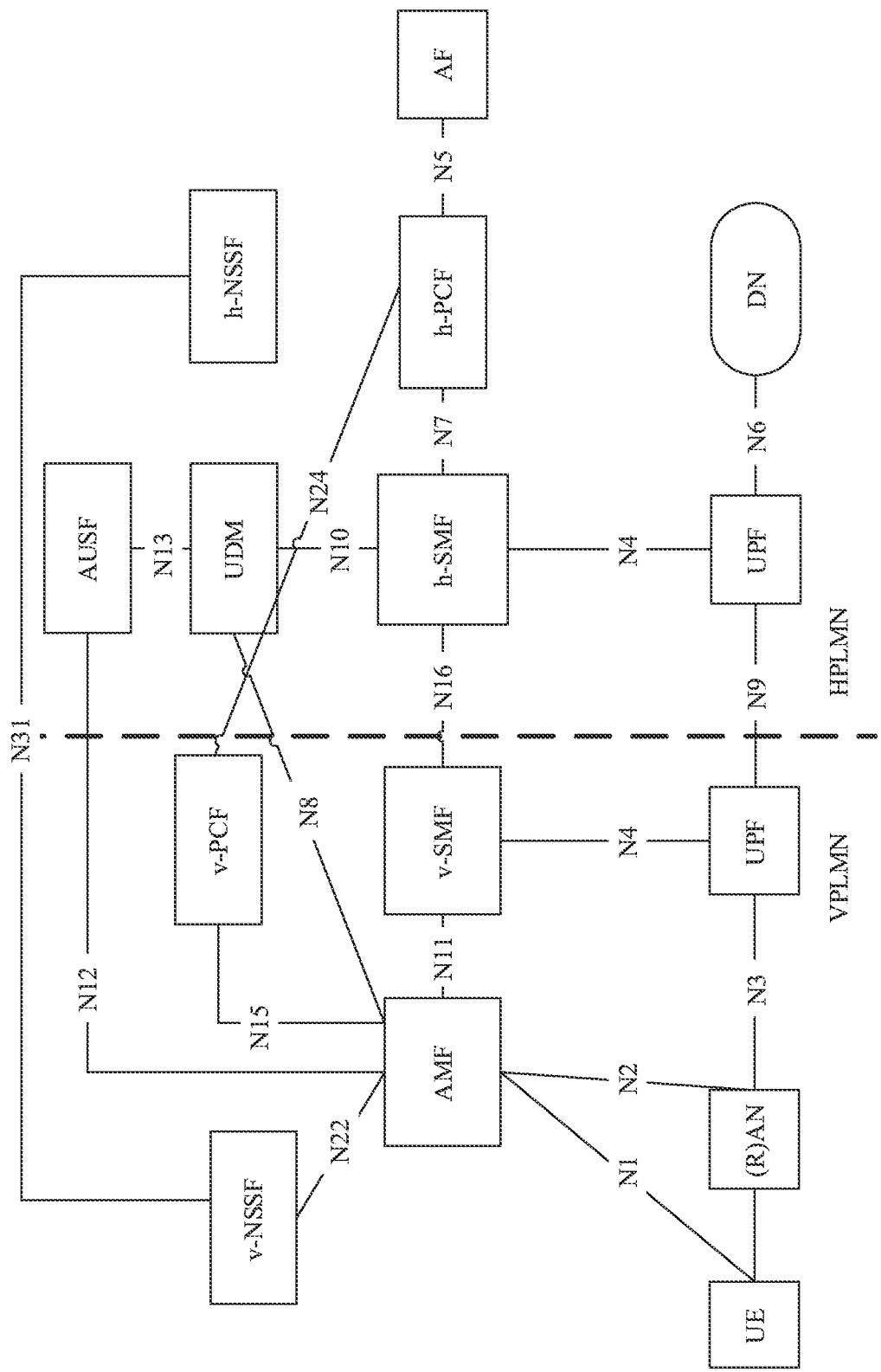
FIG. 7 is a schematic diagram of a 5G network architecture based on a reference point in a home routed roaming scenario.

FIG. 7 is a schematic diagram of a 5G network architecture based on a reference point in a home routed roaming scenario. As shown in FIG. 7, a vPCF network element in a VPLMN is connected to an hPCF network element in an HPLMN through an interface N24, an AMF network element in the VPLMN is connected to a UDM in the HPLMN through an interface N8, the AMF network element in the VPLMN is connected to an AUSF in the HPLMN through an interface N12, a vSMF network element in the VPLMN is connected to an hSMF network element in the HPLMN through an interface N16, a vNSSF in the VPLMN is connected to an hNSSF interface in the HPLMN through an interface N31, a UPF in the VPLMN is connected to a UPF interface in the HPLMN through an interface N9, and the UPF network element in the HPLMN is connected to a DN, so that roamed UE accesses the DN in the HPLMN.

When the method in this application is applied to an LTE system, the core network is an evolved packet core EPC network, and includes a mobility management entity (MME), a packet data network gateway (packet data network gateway, P-GW), a serving gateway (S-GW), a home network server (HSS), and the like. The HSS is configured to store user subscription information, including user service information, authentication information, location management information, and the like. The MME is responsible for functions such as terminal access control, mobility management, session management, and network element selection (for example, S-GW/P-GW selection). The S-GW is a mobility anchor for handover between eNBs, and is responsible for functions such as routing and forwarding of user plane data. The P-GW is responsible for functions such as IP address assignment, packet data filtering, rate control, charging rule execution, and lawful interception.

The UE mentioned in this application may be a mobile phone or a computer, or may be a cellular phone, a cordless phone, a session initiation protocol (SIP) phone, a smartphone, a wireless local loop (WLL) station, a personal digital assistant (PDA), a computer, a laptop computer, a handheld communications device, a handheld computing device, a satellite wireless device, a wireless modem card, a television set-top box (STB), a vehicle-mounted device, a wearable device, a smart home device, another device configured to perform communication in a wireless system, or the like.

Based on the foregoing network architecture, this application provides a QoS flow control method. The method in this application is applied to a guaranteed bit rate QoS flow (GBR QoS flow), and UE or a network device (including an AN device and a core network device) processes, in a same manner, data packets included in a same QoS flow. The QoS flow is identified by using a QoS flow identifier (QFI). Whether a QoS flow is a GBR QoS flow or a non-GBR QoS flow is determined by a corresponding QoS profile.

A QoS profile of the GBR QoS flow needs to include the following QoS parameters: a 5QI, an allocation and retention priority (ARP), a guaranteed flow bit flow (GFBR), and a maximum flow bit rate (MFBR). Optionally, the QoS profile of the GBR QoS flow further includes notification control. The GBR QoS flows include, based on whether the QoS profile includes notification control, a GRB QoS flow that requires notification control and a GBR QoS flow that does not require notification control. For the GBR QoS flow that requires notification control, when an access network apparatus detects that a corresponding QoS flow resource cannot be met, the access network apparatus notifies an SMF network element of the event. Further, the SMF network element may initiate a QoS flow deletion or modification procedure.

5QI: The 5QI is a scalar used to index a 5G QoS characteristic. The 5QIs include a standardized 5QI, a preconfigured 5QI, and a dynamically allocated 5QI. The standardized 5QIs are in a one-to-one correspondence with a group of standardized 5G QoS characteristic values. A 5G QoS characteristic value corresponding to the preconfigured 5QI is preconfigured in the access network apparatus. A 5G QoS characteristic corresponding to the dynamically allocated 5QI is included in the QoS profile and sent to the access network apparatus.

ARP: The ARP includes a priority level, a preemption capability, and a preemption vulnerability.

RQA: The RQA is used to instruct a service transmitted by using a corresponding QoS flow to use reversed QoS.

Notification control: Notification control is used to indicate whether the AN notifies a network in a use time of the QoS flow when the GFBR cannot be met.

GFBR: The GFBR represents a guaranteed bit rate provided for the GBR QoS flow.

MFBR: The MFBR is used to limit a bit rate provided for the GBR QoS flow, namely, a maximum bit rate provided for the GBR QoS flow. If the bit rate is exceeded, a data packet can be discarded.

The GBR QoS flow may be controlled in a signaling-based manner. A control manner is as follows: If an SMF network element determines, according to a local policy or a policy control and charging (PCC) rule sent by a PCF network element, to establish a QoS flow, the SMF network element sends SDF information to a UPF, where the SDF information includes QoS control information; sends a QoS profile of the QoS flow to an AN by using an AMF network element; and sends a QoS rule to UE by using the AMF network element and the AN, where the QoS rule includes the QoS control information.

The QoS flow is established between the UE, the AN, and the UPF. The AN establishes or modifies a data radio bearer (DRB) over an air interface based on the QoS profile, and stores a binding relationship between the QoS flow and the DBR. After the QoS flow is bound to the DBR, subsequent downlink data processing and uplink data processing are as follows.

Downlink data processing: When receiving a downlink data packet, the UPF performs QoS control based on the SDF information sent by the SMF network element, and adds a QFI to a data packet header. When receiving a downlink data packet, the AN places the data packet over a corresponding DRB for transmission based on the QFI in the packet header and a binding relationship between a corresponding QoS flow and the DRB.

Uplink data processing: When determining to send an uplink data packet, the UE determines a QoS flow according to a QoS rule, adds a QFI to a packet header, and places the data packet over a corresponding DRB for transmission based on a binding relationship between the QoS flow and the DBR. When receiving an uplink data packet, the AN adds a QFI to a data packet header between the AN and the UPF based on a QFI in a packet header of the uplink data packet. When receiving a data packet sent by the AN, the UPF verifies whether the data packet is transmitted by using a correct QoS flow.

Based on the foregoing network architecture, this application provides a QoS flow control method, to resolve a prior-art problem that a service cannot be served or quality of service of a service is reduced because when resources of an access network apparatus are temporarily short, an SMF network element immediately deletes or modifies a QoS flow when receiving indication information indicating that a QoS target cannot be met. Same content in the following embodiments of this application may be mutually referenced.

Figure 8:
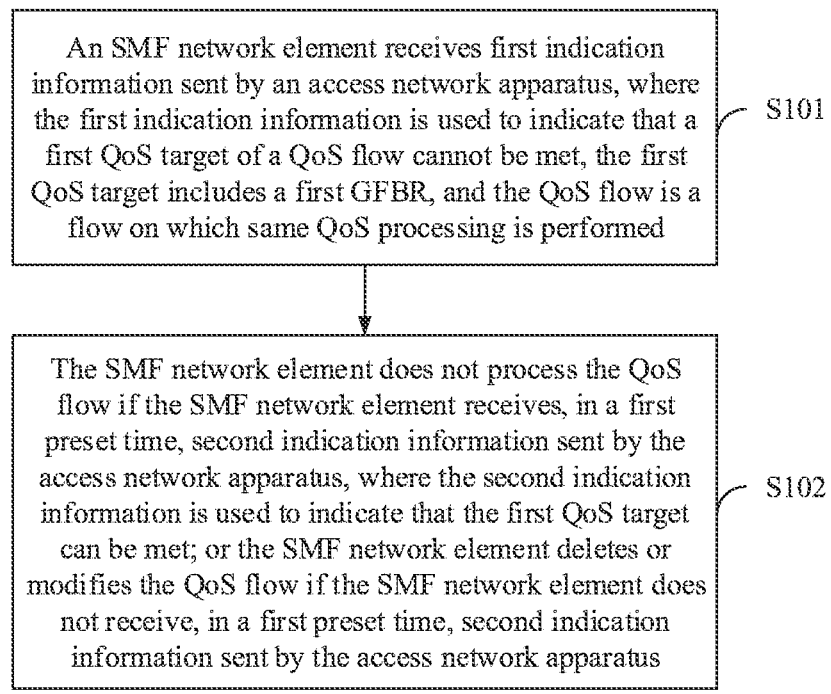
FIG. 8 is a flowchart of a QoS flow control method according to Embodiment 1 of this application.

FIG. 8 is a flowchart of a QoS flow control method according to Embodiment 1 of this application. As shown in FIG. 8, the method provided in this embodiment includes the following steps.

Step S101: An SMF network element receives first indication information sent by an access network apparatus, where the first indication information is used to indicate that a first QoS target of a QoS flow cannot be met, the first QoS target includes a first GFBR, and the QoS flow is a flow on which same QoS processing is performed.

The QoS flow is a flow on which same QoS processing is performed, to be specific, same transmission processing is performed on services using the QoS flow. During running of the QoS flow, the access network apparatus detects whether the first QoS target of the QoS flow can be met. The first QoS target is a QoS target of the QoS flow, and the first QoS target includes a GFBR. Optionally, the first QoS target further includes a data packet processing requirement such as a first MFBR or a 5QI. In a manner, when the access network apparatus detects that the first QoS target cannot be met, and optionally, a profile of the QoS flow includes notification control, the access network apparatus sends the first indication information to the SMF network element. In another manner, when the access network apparatus detects that the first QoS target cannot be met, the access network apparatus sends the first indication information to the SMF network element regardless of whether a profile of the QoS flow includes notification control.

The first QoS target is QoS control information that is of the QoS flow and that is determined by the SMF network element based on QoS policy information provided by a PCF network element or local QoS policy information.

The SMF network element establishes the QoS flow for UE based on the first QoS target. The QoS policy information may include one piece or at least two pieces of QoS control information. When the QoS policy information includes one piece of QoS control information, the SMF network element determines the first QoS target based on the QoS control information. Optionally, when the QoS policy information may include at least two pieces of QoS control information, the SMF network element selects one piece of QoS control information from the at least two pieces of QoS control information, and determines the first QoS target based on the selected QoS control information.

When the QoS policy information includes the at least two pieces of QoS control information, the QoS policy information may include one QoS policy rule or at least two QoS policy rules. When the QoS policy information includes one QoS policy rule, the QoS policy includes at least two pieces of QoS control information. When the QoS policy information includes at least two QoS policy rules, in a manner, each QoS policy rule includes one piece of QoS control information; in another manner, each QoS policy rule includes at least two pieces of QoS control information; and in still another manner, some QoS policy rules include one piece of QoS control information, and some QoS policy rules include two pieces of QoS control information.

Optionally, the QoS policy information further includes priority information of each piece of QoS control information. When determining the first QoS target, the SMF network element may determine the first QoS target based on the priority information of the QoS control information. For example, the SMF network element preferably selects QoS control information with a highest priority to determine the first QoS target. The priority information of the QoS control information may be a priority of a QoS policy rule. The PCF network element defines a priority for each QoS policy rule. A priority of QoS control information corresponding to a QoS policy rule with a higher priority is also higher. If the QoS policy rule includes two pieces of QoS control information, the PCF network element may further determine a priority for each piece of QoS control information included in the QoS policy rule.

The QoS control information includes one or more QoS parameters such as a 5QI, an ARP, a GBR, an MBR, and notification control. The QoS control information may further include one or more QoS attribute values such as a priority, a time window value, and a maximum data burst size.

For example, if the QoS policy information includes at least priority information of first QoS control information and priority information of second QoS control information, the SMF network element determines a second QoS target of the QoS flow based on the priority information of the first QoS control information and the priority information of the second QoS control information that are included in the QoS policy information. For example, the SMF network element selects QoS control information with a higher priority from the first QoS control information and the second QoS control information, and determines the second QoS target based on the QoS control information with the higher priority. The SMF network element determines the second QoS target based on the priority information of the first QoS control information and the priority information of the second QoS control information, so that an optimal QoS target can be selected for the QoS flow, to ensure QoS of the QoS flow.

Optionally, the QoS control information includes GBR information. When the QoS policy information does not include the priority information of the QoS control information, the SMF network element may determine the second QoS target based on the GBR information of the QoS control information. For example, the SMF network element preferably selects QoS control information with a larger GBR requirement to determine the second QoS target.

Step S102: The SMF network element does not process the QoS flow if the SMF network element receives, in a first preset time, second indication information sent by the access network apparatus, where the second indication information is used to indicate that the first QoS target can be met; or the SMF network element deletes or modifies the QoS flow if the SMF network element does not receive, in a first preset time, second indication information sent by the access network apparatus.

Optionally, before step S102, the SMF network element determines whether the second indication information sent by the access network apparatus is received in the first preset time. In this embodiment, the first preset time may be implemented by using a timer, and a timing time of the timer is equal to the first preset time. The SMF network element starts the timer after receiving the first indication information. Before the timer expires, if the SMF network element receives the second indication information sent by the access network apparatus, the SMF network element does not process the QoS flow. Before the timer expires, if the SMF network element does not receive the second indication information sent by the access network apparatus, the SMF network element deletes or modifies the QoS flow.

After sending the first indication information, the access network apparatus detects, in a second preset time, whether the first QoS target can be met. If the first QoS target can be met in the second preset time, the access network apparatus sends the second indication information to the SMF network element. If the first QoS target cannot be met in the second preset time, optionally, the access network apparatus may send third indication information to the SMF network element, where the third indication information is used to indicate that the first QoS target cannot be met; or the access network apparatus does not send any message to the SMF network element.

Optionally, the SMF network element deletes or modifies the QoS flow if the SMF network element receives, in the first preset time, third indication information sent by the access network apparatus, where the third indication information is used to indicate that the first QoS target cannot be met. The SMF network element determines, based on the third indication information, that a network resource of the access network apparatus is still short. To ensure quality of service of a service, the SMF network element determines to delete or modify the QoS flow.

In this embodiment, if the SMF network element receives, in the first preset time, the second indication information sent by the access network apparatus, the SMF network element determines, based on the second indication information, that the first QoS target of the QoS flow can be met. It indicates that a resource shortage of the access network apparatus is merely temporary, and the SMF network element does not process the QoS flow. That the SMF network element does not process the QoS flow herein means that the SMF network element does not delete or modify the QoS flow, but it is not ensured that the SMF network element does not perform a possible processing operation in another normal program.

In this embodiment, if the SMF network element does not receive, in the first preset time, the second indication information sent by the access network apparatus, the SMF network element determines that the first target of the QoS flow cannot be met, and the SMF network element deletes or modifies the QoS flow. Optionally, the SMF network element may determine, based on a policy configured by the PCF network element, to delete or modify the QoS flow. For example, the policy is defined as follows: When receiving the second indication information, the SMF network element reports the second indication information to the PCF network element. In this case, when the PCF network element determines to delete all affected QoS policy rules, the SMF network element deletes the QoS flow. The affected rule is a QoS policy rule in which the first QoS target cannot be met. Alternatively, the policy is defined as follows: When the PCF network element determines to modify some or all QoS policy rules, the SMF network element modifies a corresponding QoS flow according to a modified rule.

In this embodiment, modifying the QoS flow is modifying the first QoS target of the QoS flow to the second QoS target. An existing deletion procedure may be used for a QoS flow deletion procedure, and an existing modification procedure or a modification manner provided in Embodiment 2 of this application may be used for a QoS flow modification procedure. For details, refer to the following embodiments. The details are not described herein.

In the prior art, when the QoS target of the QoS flow cannot be met, the SMF network element immediately deletes or modifies the QoS flow. As a result, a QoS flow service cannot be served or quality of service of a service is reduced. In the method in this embodiment, when the QoS target of the QoS flow cannot be met, the SMF network element does not immediately delete or modify the QoS flow, but delays for the first preset time to detect the QoS target of the QoS flow in the first preset time. If the QoS target still cannot be reached in the first preset time, the SMF network element deletes or modifies the QoS flow, to avoid a problem that a QoS flow service cannot be served or quality of service of a service is reduced because the SMF network element immediately deletes or modifies the QoS flow when resources of the access network apparatus are temporarily short. The first preset time may be determined by the SMF network element according to a local policy, or may be obtained from the PCF network element. Alternatively, the first preset time is provided by another network element having a function of providing a preset time, for example, a big data analysis function.

Optionally, after receiving the first indication information, the SMF network element determines, based on the first indication information, an operation to be performed on the QoS flow. The operation is the deleting or modifying the QoS flow, and a state of the operation is a to-be-performed state. In this embodiment, after determining the operation to be performed on the QoS flow, the SMF network element does not immediately perform the operation, but marks the state of the operation as the to-be-performed state. The SMF network element deletes state information of the operation if the SMF network element receives, in the first preset time, the second indication information sent by the access network apparatus; or the SMF network element deletes or modifies the QoS flow if the SMF network element does not receive, in the first preset time, the second indication information sent by the access network apparatus.

That the SMF network element determines to perform the modification operation on the QoS flow includes: The SMF network element determines the second QoS target of the QoS flow. Because determining the operation to be performed on the QoS flow and detecting whether the second indication information is received may be performed concurrently, the method in this application can shorten a time of a QoS flow modification procedure and reduce impact on a service compared with determining, after the first preset time, to perform the modification operation on the QoS flow.

It should be noted that the indication information (including the first indication information, the second indication information, the third indication information, and the like) in this embodiment and the following embodiments is a capability used to indicate whether the apparatus can meet the QoS target, or the indication information is used to indicate a state that has been met by the apparatus.

In this embodiment, the SMF network element receives the first indication information sent by the access network apparatus, where the first indication information is used to indicate that the first QoS target of the QoS flow cannot be met; and then the SMF network element determines whether the SMF network element receives, in the first preset time, the second indication information sent by the access network apparatus, where the second indication information is used to indicate that the first QoS target can be met. If the SMF network element receives the second indication information, the SMF network element does not process the QoS flow. If the SMF network element does not receive the second indication information, the SMF network element deletes or modifies the QoS flow. In the method, when the QoS target of the QoS flow cannot be met, the SMF network element does not immediately delete or modify the QoS flow. Instead, the SMF network element deletes or modifies the QoS flow only when the QoS target of the QoS flow still cannot be met within a delay of the first preset time, to avoid a problem that a QoS flow service cannot be served or quality of service of a service is reduced because the SMF network element immediately deletes or modifies the QoS flow when resources of the access network apparatus are temporarily short.

Figure 9:
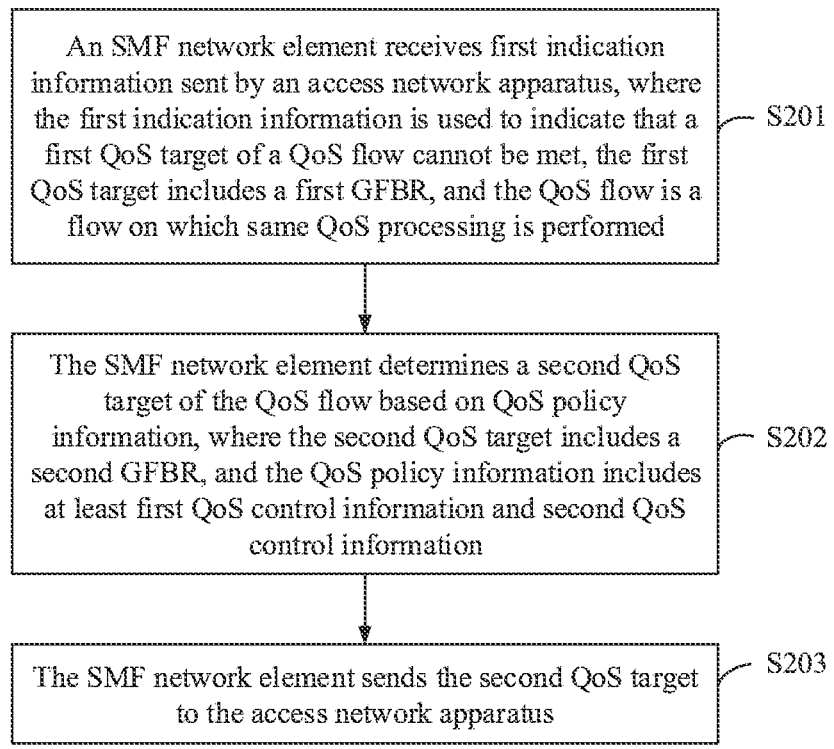
FIG. 9 is a flowchart of a QoS flow control method according to Embodiment 2 of the present invention.

FIG. 9 is a flowchart of a QoS flow control method according to Embodiment 2 of the present invention. It should be noted that the methods in Embodiment 1 and Embodiment 2 may be independently used, or may be used in combination. When the method in Embodiment 1 is independently used, after determining to modify the QoS flow, the SMF network element modifies the QoS flow in an existing modification procedure. When Embodiment 1 and Embodiment 2 are combined, after determining to modify the QoS flow, the SMF network element modifies the QoS flow in the method in Embodiment 2. As shown in FIG. 9, the method provided in this embodiment includes the following steps.

Step S201: An SMF network element receives first indication information sent by an access network apparatus, where the first indication information is used to indicate that a first QoS target of a QoS flow cannot be met, the first QoS target includes a first GFBR, and the QoS flow is a flow on which same QoS processing is performed.

Step S202: The SMF network element determines a second QoS target of the QoS flow based on QoS policy information, where the second QoS target includes a second GFBR, and the QoS policy information includes at least first QoS control information and second QoS control information.

In this embodiment, after receiving the first indication information, the SMF network element determines the second QoS target of the QoS flow based on the QoS policy information. Before determining the second QoS target of the QoS flow, the SMF network element needs to obtain the QoS policy information. In this embodiment, because the at least two pieces of QoS control information included in the QoS policy information can meet a QoS requirement of the QoS flow, the second QoS target determined based on the QoS control information can meet the QoS requirement of the QoS flow. Different from the prior art, in the solution in this embodiment, a QoS target of the QoS flow is modified from the first QoS target to the second QoS target, and QoS quality of the QoS flow is not reduced.

The SMF network element may obtain the QoS policy information in the following manners: In a manner, the QoS policy information is preconfigured on the SMF network element; in another manner, the SMF network element receives QoS policy information sent by the PCF network element; and in still another manner, the QoS policy information includes QoS policy information locally configured by the SMF network element and QoS policy information configured by the PCF network element. Optionally, the QoS policy information sent by the PCF network element is generated by the PCF network element based on one or at least two QoS requirements sent by an AF network element.

In this embodiment, the SMF network element may determine the second QoS target of the QoS flow in the following manners.

In a first manner, if the QoS policy information further includes priority information of each of at least two pieces of QoS control information, the SMF network element determines the second QoS target of the QoS flow based on the priority information that is of each piece of QoS control information and that is included in the QoS policy information.

For example, if the QoS policy information includes QoS control information whose priority is the same as that of QoS control information corresponding to the first QoS target, the SMF network element determines the second QoS target based on the QoS control information whose priority is the same as that of the QoS control information corresponding to the first QoS target. If the QoS policy information does not include QoS control information whose priority is the same as that of QoS control information corresponding to the first QoS target, the SMF network element selects QoS control information with a secondary priority in the QoS control information corresponding to the first QoS target, and determines the second QoS target based on the QoS control information with the secondary priority.

In a second manner, the SMF network element determines the second QoS target of the QoS flow based on GBR information of the first QoS control information and GBR information of the second QoS control information that are included in the QoS policy information.

When the QoS policy information includes GBR information of each piece of QoS control information, an AMF network element determines the second QoS target of the QoS flow based on the GBR information of the QoS control information. For example, the SMF network element selects QoS control information with a maximum GBR from remaining QoS control information, and determines the second QoS target based on the QoS control information with the maximum GBR.

In a third manner, the SMF network element determines at least one third QoS target based on at least two pieces of QoS control information included in the QoS policy information, and then sends the third QoS target to the access network apparatus. The SMF network element receives a fourth QoS target sent by the access network apparatus, where the fourth QoS target is determined by the access network apparatus based on the third QoS target, and the fourth QoS target is a QoS target that can be met by the access network apparatus. Finally, the SMF network element determines the second QoS target based on the fourth QoS target.

In the first two manners, the SMF network element determines the second QoS target of the QoS flow in a manner of the SMF network element. In the third manner, the SMF network element and the access network apparatus determine the second QoS target through negotiation, so that it can be ensured that the second QoS target determined for the QoS flow matches a resource of the access network apparatus, and the resource of the access network apparatus can be used to a maximum extent.

When determining the third QoS target based on the at least two pieces of QoS control information, the SMF network element may alternatively determine the third QoS target based on priority information or a bandwidth requirement of the QoS control information. For details, refer to the foregoing descriptions. Details are not described herein again. A quantity of third QoS targets may be preconfigured. The SMF network element may select some QoS control information from the QoS policy information to determine the third QoS target, or may select all QoS control information to determine the third QoS target. One third QoS target is generated for each piece of QoS control information. For example, the SMF network element selects one piece of QoS control information with a highest priority to determine one third QoS target, or the SMF network element selects two pieces of QoS control information with a higher priority to respectively determine one third QoS target.

After receiving the third QoS target, the access network apparatus determines a fourth QoS target based on the third QoS target, where the fourth QoS target is a QoS target that can be met by the access network apparatus. For example, the access network apparatus determines the fourth QoS target based on an available resource of the access network apparatus and the third QoS target. Optionally, the access network apparatus selects, from the third QoS target, a QoS target that can be met by the access network apparatus as the fourth QoS target. If none of QoS targets in the third QoS target can be met by the access network apparatus, the access network apparatus can return a QoS target that can be met by the access network apparatus other than the third QoS target. Optionally, the fourth QoS target is a maximum QoS target that can be met by the access network apparatus.

When determining the second QoS target based on the fourth QoS target, the SMF network element may directly use the fourth QoS target as the second QoS target, or may process the fourth QoS target to obtain the second QoS target. For example, a GFBR included in the fourth QoS target fluctuates in a specific range and then is used as the second QoS target.

In a fourth manner, the SMF network element sends at least two QoS targets of the QoS flow to the access network apparatus, and the SMF network element may send the at least two QoS targets of the QoS flow to the access network apparatus in a QoS flow establishment or modification process. The SMF network element receives a fifth QoS target sent by the access network apparatus, where the fifth QoS target is a QoS target that can be met by the access network apparatus, and the fifth QoS target is determined by the access network apparatus based on the at least two QoS targets when the first QoS target of the QoS flow cannot be met. Correspondingly, the SMF network element determines the second QoS target based on the fifth QoS target.

In this manner, the SMF network element and the access network apparatus determine the second QoS target through negotiation. A difference from the third manner in which the SMF network element triggers the access network apparatus to send the QoS target that can be met by the access network apparatus lies in that in the fourth manner, when the first QoS target cannot be met, the access network apparatus actively reports the QoS target that can be met by the access network apparatus, so that the SMF network element determines the second QoS target based on the QoS target that can be met by the access network apparatus. Therefore, it can be ensured that the second QoS target determined for the QoS flow matches a resource of the access network apparatus, and the resource of the access network apparatus can be used to a maximum extent.

Optionally, when determining the fifth QoS target, the access network apparatus determines the fifth QoS target based on an available resource and the at least two QoS targets sent by the SMF network element. Optionally, the access network apparatus may select one QoS target from the at least two QoS targets as the fifth QoS target based on the available resource. For example, the access network apparatus selects a QoS target closest to the available resource from the at least two QoS targets as the fifth QoS target.

Step S203: The SMF network element sends the second QoS target to the access network apparatus.

The SMF network element may actively send the second QoS target to the access network apparatus, to trigger modification of the QoS flow. Alternatively, the SMF network element may send the second QoS target to the access network apparatus when receiving a QoS flow modification notification indication sent by the access network apparatus.

Optionally, the SMF network element starts a timer after receiving the first indication information, and deletes the timer after sending the second QoS target to the access network apparatus. Certainly, a deletion time of the timer is not limited to a time after the second QoS target is sent. The SMF network element may delete the timer at any time after the timer is started.

In this embodiment, the SMF network element receives the first indication information sent by the access network apparatus, where the first indication information is used to indicate that the first QoS target of the QoS flow cannot be met. In this case, the SMF network element determines the second QoS target of the QoS flow based on the QoS policy information, where the QoS policy information includes the at least two pieces of QoS control information, and the SMF network element sends the second QoS target to the access network apparatus. Because the at least two pieces of QoS control information included in the QoS policy information can meet a QoS requirement of the QoS flow, the second QoS target determined based on the QoS control information can also meet the QoS requirement of the QoS flow. Different from the prior art, in the solution in this embodiment, a QoS target of the QoS flow is modified from the first QoS target to the second QoS target, and QoS quality of the QoS flow is not reduced.

Figure 10:
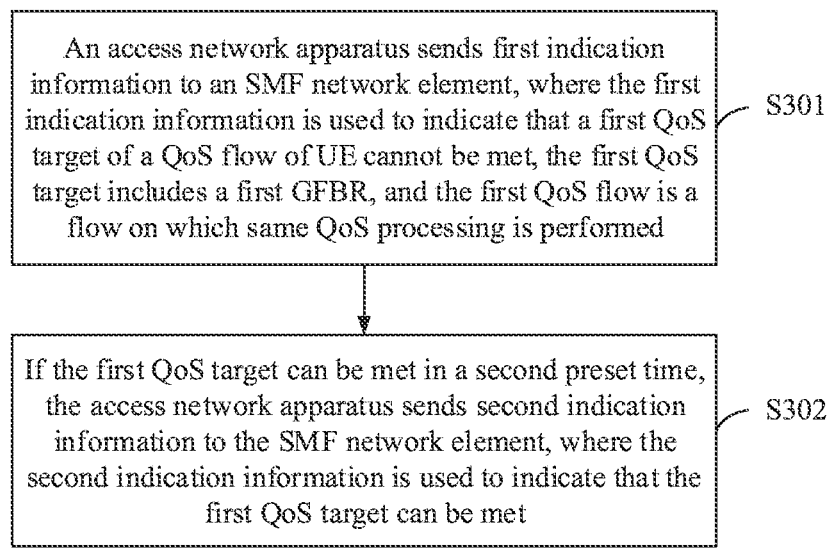
FIG. 10 is a flowchart of a QoS flow control method according to Embodiment 3 of this application.

FIG. 10 is a flowchart of a QoS flow control method according to Embodiment 3 of this application. The QoS flow control method is described in this embodiment from a perspective of an access network apparatus. As shown in FIG. 10, the method in this embodiment may include the following steps.

Step S301: The access network apparatus sends first indication information to an SMF network element, where the first indication information is used to indicate that a first QoS target of a QoS flow of UE cannot be met, the first QoS target includes a first GFBR, and the first QoS flow is a flow on which same QoS processing is performed.

During running of the QoS flow, the access network apparatus detects whether the first QoS target of the QoS flow can be met. In a manner, when the access network apparatus detects that the first QoS target cannot be met, optionally, a profile of the QoS flow includes notification control, and the access network apparatus sends the first indication information to the SMF network element. In another manner, when the access network apparatus detects that the first QoS target cannot be met, the access network apparatus sends the first indication information to the SMF network element regardless of whether a profile of the QoS flow includes notification control.

Step S302: If the first QoS target can be met in a second preset time, the access network apparatus sends second indication information to the SMF network element, where the second indication information is used to indicate that the first QoS target can be met.

Optionally, if the first QoS target cannot be met in the second preset time, the access network apparatus sends third indication information to the SMF network element, where the third indication information is used to indicate that the first QoS target cannot be met.

In this embodiment, when determining whether the first QoS target can be met, the access network apparatus determines, based on a state of the first QoS target in the second preset time, namely, a state of the QoS flow in an entire second preset time, whether the first QoS target is met. In addition, the access network apparatus may determine, when or after the second preset time ends, whether the first QoS target is met.

The second preset time may be implemented by using a timer. The access network apparatus starts the timer after sending the first indication information. A timing time of the timer is equal to the second preset time. Before the timer expires, the access network apparatus detects whether the first QoS target can be met. Before the timer expires, if the first QoS target can be met, the access network apparatus sends the second indication information to the SMF network element. When the timer expires, if the first QoS target cannot be met, the access network apparatus sends the third indication information to the SMF network element.

Optionally, a timer calculates the second preset time; and the access network apparatus deletes the timer if the access network apparatus receives, in the second preset time, a deletion or modification request that is for the QoS flow and that is sent by the SMF network element. After deleting the timer, correspondingly, the access network apparatus deletes information about the QoS flow, initiates an RRC modification procedure to the UE, and deletes a binding relationship between the QoS flow and a DRB, or deletes a corresponding DRB, or modifies a corresponding DRB.

Optionally, if the access network apparatus does not receive a modification procedure or deletion procedure that is for the QoS flow and that is sent by the SMF network element, the access network apparatus sends a deletion request for the QoS flow to the SMF network element. Optionally, after sending the third indication information, if the access network apparatus does not receive, in a third preset time, the modification procedure or deletion procedure that is for the QoS flow and that is sent by the SMF network element, the access network device may send the deletion request for the QoS flow to the SMF network element, to trigger the deletion procedure for the QoS flow. The third preset time may be implemented by using a timer.

The access network apparatus starts the timer after sending the third indication information. Before the timer expires, if the access network apparatus does not receive the modification procedure or deletion procedure that is for the QoS flow and that is sent by the SMF network element, the access network device may send the deletion request for the QoS flow to the SMF network element, where the deletion request for the QoS flow is used to instruct to delete the QoS flow.

Optionally, after sending the third indication message, the access network apparatus receives a deletion request sent by the SMF network element, where the deletion request is used to delete the QoS flow.

In this embodiment, the access network apparatus sends the first indication information to the SMF network element, where the first indication information is used to indicate that the first QoS target of the QoS flow of the UE cannot be met. If the first QoS target can be met in the second preset time, the access network apparatus sends the second indication information to the SMF network element, where the second indication information is used to indicate that the first QoS target can be met. If the first QoS target cannot be met in the second preset time, the access network apparatus sends the third indication information to the SMF network element, where the third indication information is used to indicate that the first QoS target cannot be met. In the method, when the first QoS target cannot be met, after sending the first indication information, the access network apparatus detects, in the second preset time, whether the first QoS target can be met, and notifies the SMF network element, so that when a QoS target of the QoS flow cannot be met, the SMF network element does not immediately delete or modify the QoS flow. Instead, the SMF network element deletes or modifies the QoS flow only when the QoS target of the QoS flow still cannot be met within a delay of the first preset time, to avoid a problem that a QoS flow service cannot be served or quality of service of a service is reduced because the SMF network element immediately deletes or modifies the QoS flow when resources of the access network apparatus are temporarily short.

Figure 11:
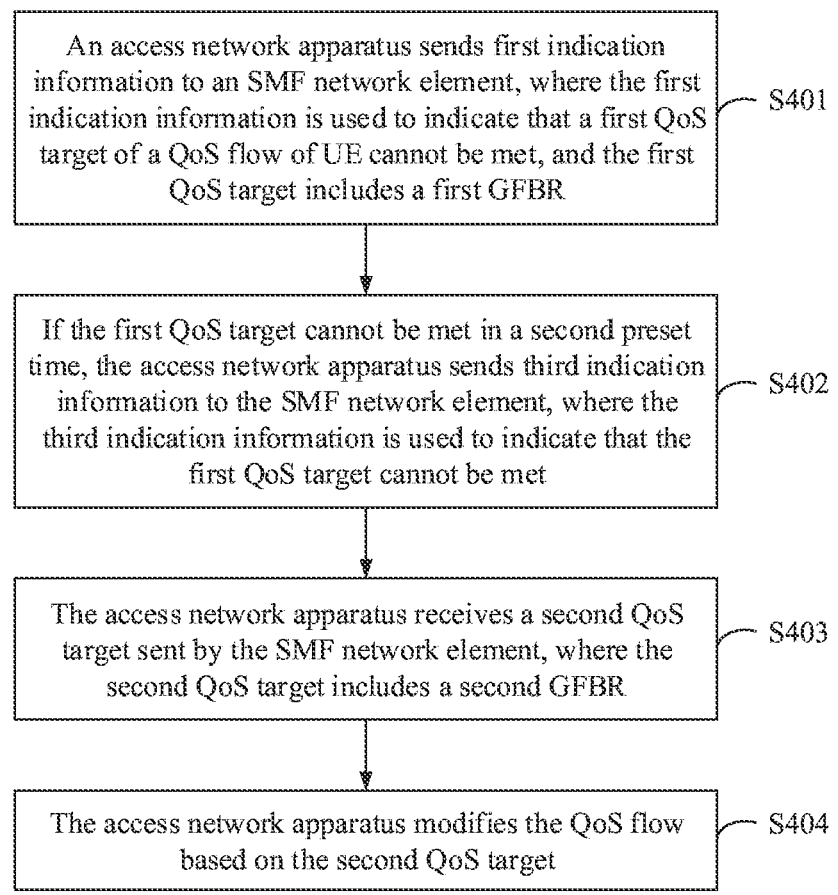
FIG. 11 is a flowchart of a QoS flow control method according to Embodiment 4 of this application.

FIG. 11 is a flowchart of a QoS flow control method according to Embodiment 4 of this application. As shown in FIG. 11, according to Embodiment 3, the method in this embodiment may further include the following steps.

Step S401: An access network apparatus sends first indication information to an SMF network element, where the first indication information is used to indicate that a first QoS target of a QoS flow of UE cannot be met, and the first QoS target includes a first GFBR.

Step S402: If the first QoS target cannot be met in a second preset time, the access network apparatus sends third indication information to the SMF network element, where the third indication information is used to indicate that the first QoS target cannot be met.

Step S403: The access network apparatus receives a second QoS target sent by the SMF network element, where the second QoS target includes a second GFBR.

After the access network apparatus sends the first indication information, if the SMF network element determines, based on the first indication information, to modify the QoS flow, the SMF network element sends the second QoS target to the access network apparatus.

Step S404: The access network apparatus modifies the QoS flow based on the second QoS target.

The access network apparatus modifies a target of the QoS flow from the first QoS target to the second QoS target based on the second QoS target.

Optionally, before receiving the second QoS target sent by the SMF network element, the access network apparatus receives at least one third QoS target sent by the SMF network element, and the access network apparatus determines a fourth QoS target based on the third QoS target. Optionally, the access network apparatus selects one QoS target from the third QoS target as the fourth QoS target, where the fourth QoS target is a QoS target that can be met by the access network apparatus, and the access network apparatus sends the fourth QoS target to the SMF network element. The access network apparatus sends the fourth QoS target to the SMF network element, so that the SMF network element determines the second QoS target based on the fourth QoS target, the determined second QoS target matches a resource of the access network apparatus, and the resource of the access network apparatus is used to a maximum extent.

Optionally, before sending the first indication information to the SMF network element, the access network apparatus receives at least two QoS targets of the QoS flow that are sent by the SMF network element. The at least two QoS targets may be sent by the SMF network element to the access network apparatus when the QoS flow is established. When the first QoS target of the QoS flow cannot be met, the access network apparatus selects a fifth QoS target from the at least two QoS targets, where the fifth QoS target is a QoS target that can be met by the access network apparatus. The access network apparatus sends the fifth QoS target to the SMF network element, so that the SMF network element determines the second QoS target based on the fifth QoS target, the determined second QoS target matches a resource of the access network apparatus, and the resource of the access network apparatus is used to a maximum extent.

In this embodiment, the access network apparatus sends the first indication information to the SMF network element, where the first indication information is used to indicate that the first QoS target of the QoS flow of the UE cannot be met. If the first QoS target cannot be met in the second preset time, the access network apparatus sends the third indication information to the SMF network element, where the third indication information is used to indicate that the first QoS target cannot be met, and the access network apparatus receives the second QoS target sent by the SMF network element, and modifies the QoS flow based on the second QoS target. QoS of a service is ensured because the second QoS target determined by the SMF network element can meet a requirement of the QoS flow.

Figure 12:
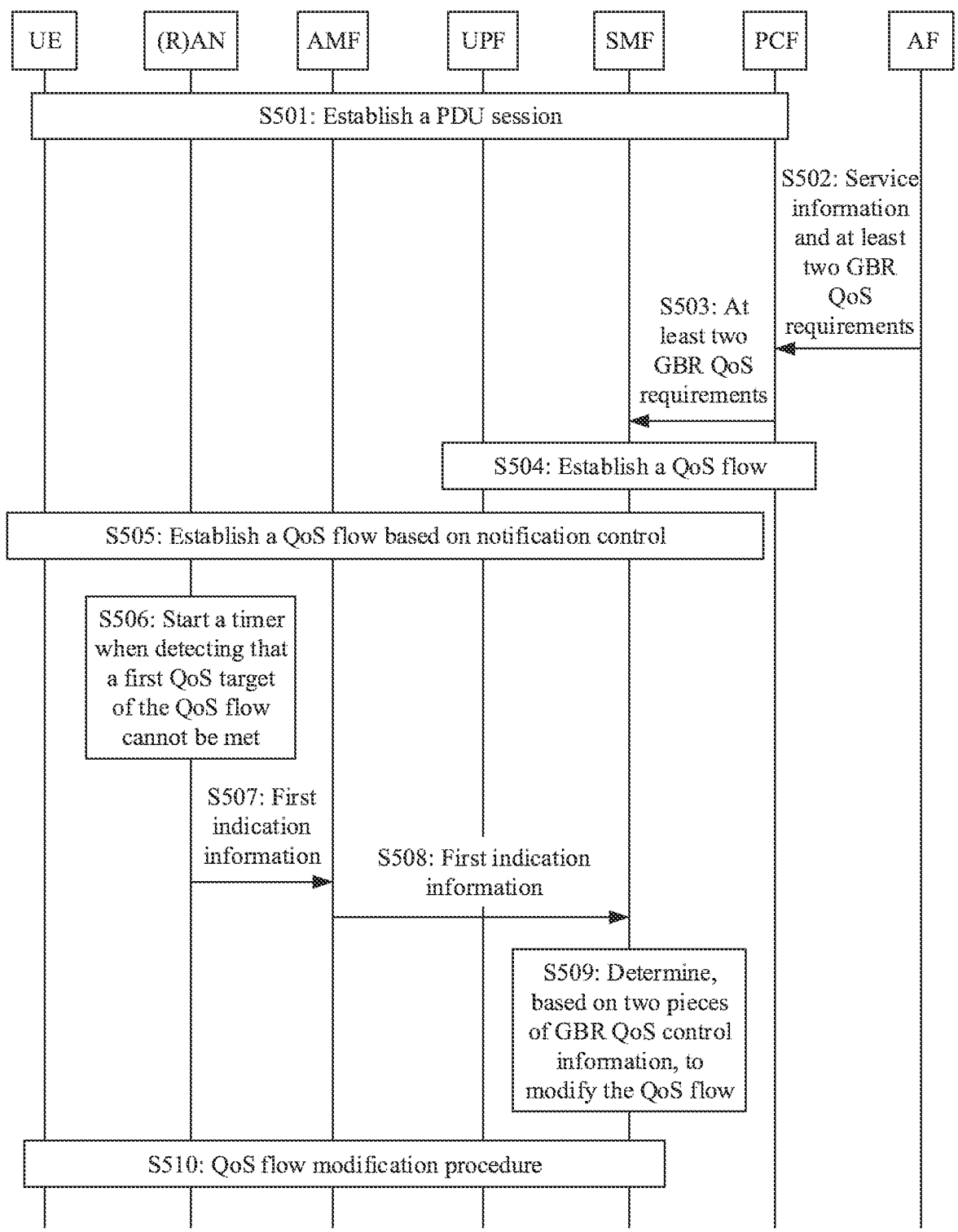
FIG. 12 is a signaling flowchart of a QoS flow control method according to Embodiment 5 of this application.

FIG. 12 is a signaling flowchart of a QoS flow control method according to Embodiment 5 of this application. As shown in FIG. 12, the method provided in this embodiment includes the following steps.

Step S501: UE establishes a PDU session (session) with a network.

For a session establishment process, refer to an existing establishment procedure. Details are not described herein. Optionally, in the session establishment process, an SMF network element sends a value of a timer to an access network apparatus.

Step S502: When an AF network element determines to establish a service for the UE, the AF network element sends service information and at least two GBR QoS requirements to a PCF network element.

The AF network element may add the service information and the at least two GBR QoS requirements to an NPCF network element_PolicyAuthorization_create_service service procedure, and send the service procedure to the PCF network element. The GBR QoS requirement includes a notification control indication. Optionally, the service procedure further includes priority information of two GBR QoS requirements.

Step S503: The PCF network element sends at least two pieces of GBR QoS control information to the SMF network element.

The PCF network element may add the at least two pieces of GBR QoS control information to an Npcf_SMPolicyControl_UpdateNotify service, and send the service to the SMF network element. The service is sent by the PCF network element based on a service request of the AF network element, and the GBR QoS control information is generated by the PCF network element based on the GBR QoS requirement sent by the AF network element. Optionally, the service further includes priority information of the GBR QoS control information.

Step S504: The SMF network element establishes a corresponding QoS flow based on a message sent by the PCF network element.

The SMF network element may establish the corresponding QoS flow based on the service message sent by the PCF network element. In an establishment process, the SMF network element activates or establishes the corresponding QoS flow based on the priority information of the GBR QoS control information. To be specific, the SMF network element first uses GBR QoS control information with a highest priority to establish the QoS flow, where a QoS target corresponding to the GBR QoS control information with the highest priority is a first QoS target. When the SMF network element does not obtain the priority information of the GBR QoS control information, the SMF network element determines, based on a bandwidth requirement priority or guaranteed bit rate GBR information of the GBR QoS control information, to preferably use QoS control information with a higher bandwidth requirement or a higher guaranteed bit rate GBR to establish the QoS flow, where a QoS target corresponding to the QoS control information with the higher bandwidth requirement is a first QoS target.

Step S505: The UE establishes a QoS flow based on notification control with the network.

Step S506: The access network apparatus starts the timer when the access network apparatus detects that the first QoS target of the QoS flow cannot be met.

When detecting that the first QoS target cannot be met, the access network apparatus reads a profile of the QoS flow. When the profile of the QoS flow includes notification control, the access network apparatus starts the timer.

Step S507: The access network apparatus sends first indication information to an AMF network element.

The first indication information is used to indicate that the first QoS target cannot be met. The access network apparatus may add the first indication information to an N2 message, and send the N2 message to the AMF network element. The N2 message includes a PDU session ID and N2 SM information. The N2 SM information includes a QoS flow identifier (QFI) and the first indication information, and the first indication information is used to indicate that the first QoS target of the QoS flow cannot be met.

Step S508: The AMF network element sends the first indication information to the SMF network element.

The AMF network element may add the first indication information to an Nsmf_PDUSessionUpdateSMContext message, and send the message to the SMF network element. The message includes a QFI and the first indication information.

Step S509: The SMF network element determines, based on the at least two pieces of GBR QoS control information sent by the PCF network element, to modify the QoS flow.

In this embodiment, the SMF network element may determine a second QoS target of the QoS flow based on priority information or a bandwidth requirement of the GBR QoS control information.

Step S510: Perform a modification procedure for the QoS flow.

Optionally, the modification procedure for the QoS flow may include the following steps (not shown in the figure).

S510: The SMF network element sends the second QoS target to the AMF network element.

The SMF network element may add the second QoS target to an Namf_Communication_N1N2MessageTransfer message, and send the message to the AMF network element. The message includes N2 SM information and an N1 SM container. The N2 SM information includes a PDU session ID, a QFI, and a QoS profile (including the second QoS target). The N1 SM container includes a PDU session ID, a QoS rule (including the first QoS target) that cannot be met, and an operation (for example, deletion or modification) of the QoS rule.

S5102: The AMF network element sends the second QoS target to the access network apparatus.

The AMF network element may add the second QoS target to an N2 PDU session request, and send the N2 PDU session request to the access network apparatus. The request includes N2 SM information received from the SMF network element and a NAS message. The NAS message includes a PDU session ID and an N1 SM container. The access network apparatus deletes the started timer after receiving the second QoS target.

S5103: The access network apparatus performs a specific signaling procedure with the UE.

The access network apparatus performs the specific signaling procedure with the UE based on information sent by the SMF network element. For example, when the UE accesses a 3GPP RAN, an RRC connection reconfiguration is performed between the UE and the access network apparatus to modify a corresponding RAN resource.

S5104: The access network apparatus interacts with a core network device to modify the QoS flow.

S5105: The access network apparatus sends an N2 session response to the AMF network element.

The N session response message includes N2 SM information.

S5106: The AMF network element uses an Nsmf_PDUSession_UpdateSMContext service operation, where the service includes N2 SM information. The SMF network element sends an Nsmf_PDUSession_UpdateSMContext response to the AMF network element.

S5107: The UE sends a NAS message to respond to a PDU session modification command, where the NAS message includes a PDU session ID and an N1 SM container, and the N1 SM container is determined by the PDU session modification command.

S5108: The access network apparatus forwards the NAS message to the AMF network element.

S5109: The AMF network element forwards the N1 SM container to the SMF network element by using Nsmf_PDUSession_UpdateSMContext. The SMF network element sends the Nsmf_PDUSession_UpdateSMContext response to the AMF network element.

S5110: The SMF network element performs a PDU session modification procedure with a UPF.

S5111: The SMF network element sends Nsmf_EventExposure_Notify to the PCF network element, where Nsmf_EventExposure_Notify includes an affected PCC rule. The PCF network element sends a response message to the SMF network element.

S5112: The PCF network element sends Npcf_EventExposure_Notify to the AF network element, where Npcf_EventExposure_Notify includes a QoS requirement of a performed service. The AF network element sends a response message to the PCF network element.

In this embodiment, a QoS flow control process is described by using an example in which communication is performed in a network architecture through a service-based interface. Certainly, communication may alternatively be not performed through a service-based interface. Correspondingly, messages exchanged between the network elements are different. However, content for QoS control carried in the messages is the same.

Figure 13A:
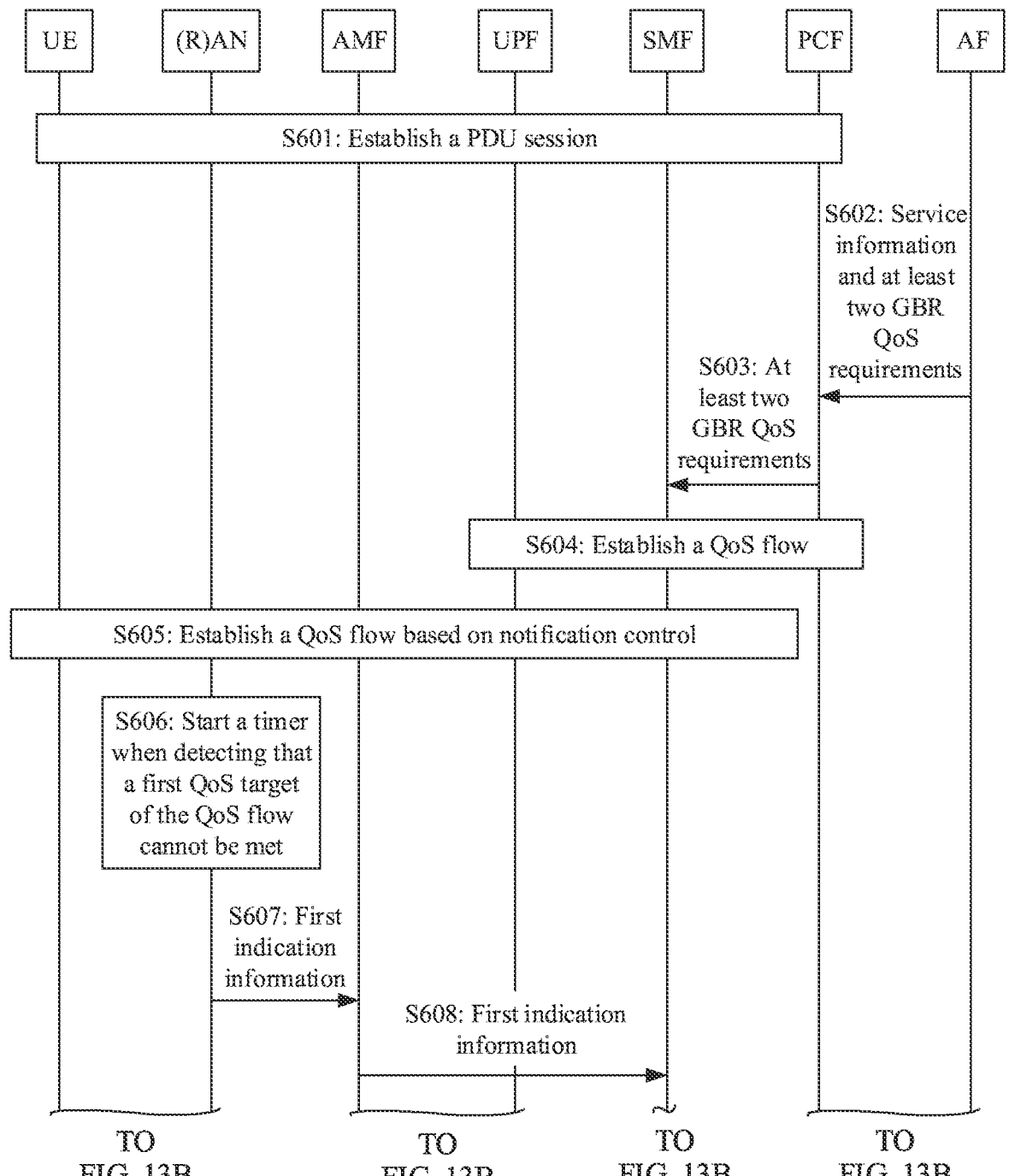
FIG. 13A and FIG. 13B are a signaling flowchart of a QoS flow control method according to Embodiment 6 of this application.
Figure 13B:
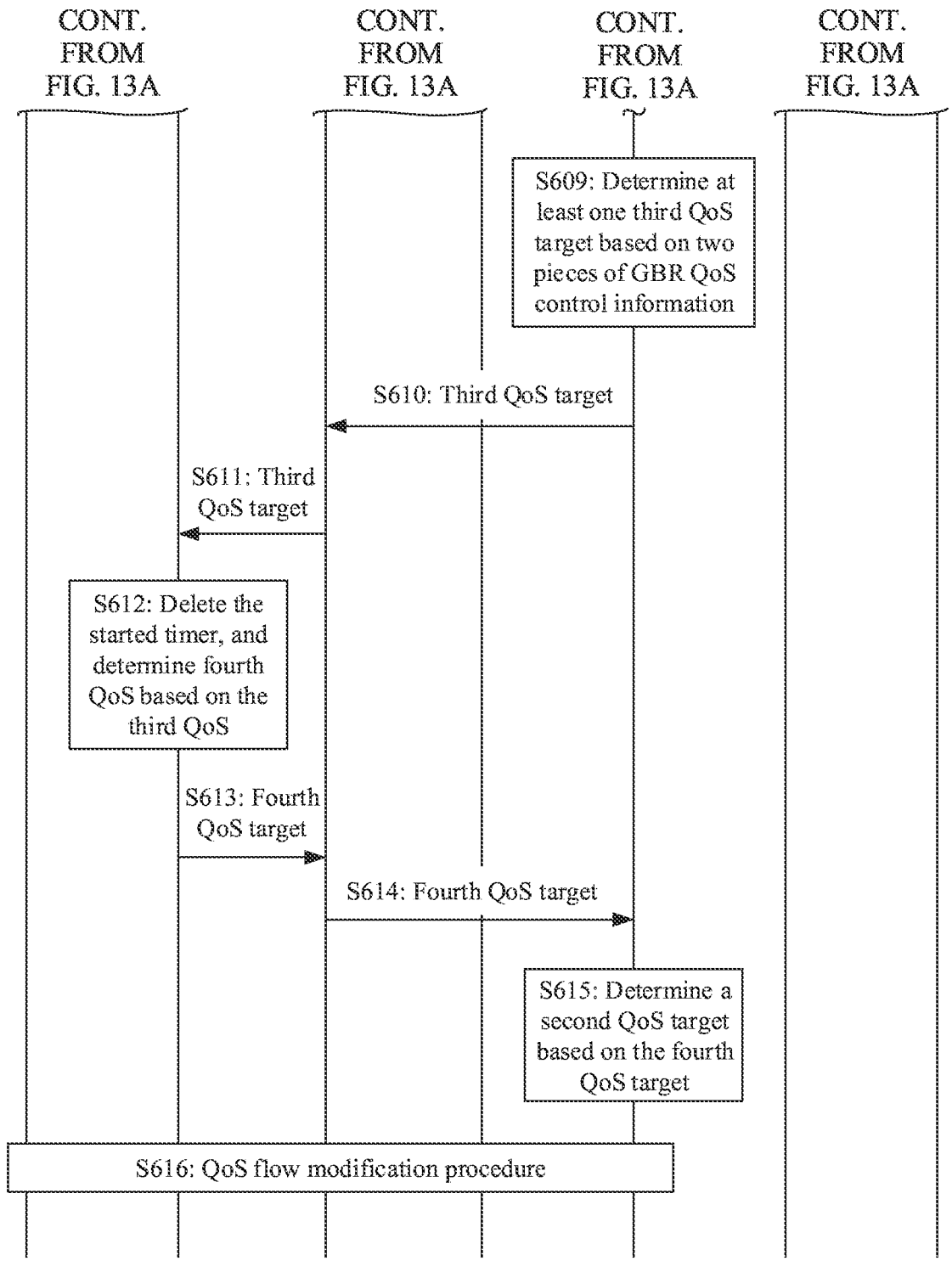

FIG. 13A and FIG. 13B are a signaling flowchart of a QoS flow control method according to Embodiment 6 of this application. As shown in FIG. 13A and FIG. 13B, the method provided in this embodiment includes the following steps.

Step S601: UE establishes a PDU session with a network.

For a session establishment process, refer to an existing establishment procedure. Details are not described herein. Optionally, in the session establishment process, an SMF network element sends a value of a timer to an access network apparatus.

Step S602: When an AF network element determines to establish a service for the UE, the AF network element sends service information and at least two GBR QoS requirements to a PCF network element.

The AF network element may add the service information and the at least two GBR QoS requirements to an Npcf_PolicyAuthorization_create_service service procedure, and send the service procedure to the PCF network element. The GBR QoS requirement includes a notification control indication. Optionally, the service procedure further includes priority information of two GBR QoS requirements.

Step S603: The PCF network element sends at least two pieces of GBR QoS control information to the SMF network element.

The PCF network element may add the at least two pieces of GBR QoS control information to an Npcf_SMPolicyControl_UpdateNotify service, and send the service to the SMF network element. The service is sent by the PCF network element based on a service request of the AF network element, and the GBR QoS control information is generated by the PCF network element based on the GBR QoS requirement sent by the AF network element. Optionally, the service further includes priority information of the GBR QoS control information.

Step S604: The SMF network element establishes a corresponding QoS flow based on a message sent by the PCF network element.

The SMF network element may establish the corresponding QoS flow based on the service message sent by the PCF network element. In an establishment process, the SMF network element activates the corresponding QoS flow based on the priority information of the GBR QoS control information. To be specific, the SMF network element first uses GBR QoS control information with a highest priority to establish the QoS flow, where a QoS target corresponding to the GBR QoS control information with the highest priority is a first QoS target. When the SMF network element does not obtain the priority information of the GBR QoS control information, the SMF network element determines, based on a bandwidth requirement priority or guaranteed bit rate information of the GBR QoS control information, to preferably use QoS control information with a higher bandwidth requirement or a higher guaranteed bit rate to establish the QoS flow, where a QoS target corresponding to the QoS control information with the higher bandwidth requirement is a first QoS target.

Step S605: The UE establishes a QoS flow based on notification control with the network.

Step S606: The access network apparatus starts the timer when the access network apparatus detects that the first QoS target of the QoS flow cannot be met.

When detecting that the first QoS target cannot be met, the access network apparatus reads a profile of the QoS flow. When the profile of the QoS flow includes notification control, the access network apparatus starts the timer.

Step S607: The access network apparatus sends first indication information to an AMF network element.

The access network apparatus may add the first indication information to an N2 message, and send the N2 message to the AMF network element. The N2 message includes a PDU session ID and N2 SM information. The N2 SM information includes a QoS flow identifier (QFI) and the first indication information, and the first indication information is used to indicate that the first QoS target of the QoS flow cannot be met.

Step S608: The AMF network element sends the first indication information to the SMF network element.

The AMF network element may add the first indication information to an Nsmf_PDUSessionUpdateSMContext message, and send the message to the SMF network element. The message includes a QFI and the first indication information.

Step S609: The SMF network element determines at least one third QoS target of the QoS flow based on the at least two pieces of GBR QoS control information sent by the PCF network element.

Specifically, for a specific manner of determining the third QoS target by the SMF network element, refer to the related descriptions in Embodiment 2. Details are not described herein again.

Step S610: The SMF network element sends the third QoS target to the AMF network element.

The SMF network element may add the third QoS target to an Namf_Communication_N1N2MessageTransfer message, and send the message to the AMF network element. The message includes N2 SM information and an N1 SM container. The N2 SM information includes a PDU session ID, a QFI, and a QoS profile (including the third QoS target). The N1 SM container includes a PDU session ID, a QoS rule (including the first QoS target) that cannot be met, and an operation (for example, deletion or modification) of the QoS rule.

Step S611: The AMF network element sends the third QoS target to the access network apparatus.

The AMF network element may add the third QoS target to an N2 PDU session request, and send the N2 PDU session request to the access network apparatus. The session request includes N2 SM information received from the SMF network element and a NAS message. The NAS message includes a PDU session ID and an N1 SM container.

Step S612: The access network apparatus deletes the started timer, and determines fourth QoS based on the third QoS.

After receiving the third QoS target, the access network apparatus deletes the started timer, and determines the fourth QoS target based on the received third QoS target and an available resource, where the fourth QoS target is a QoS target that can be reached by the access network apparatus.

Step S613: The access network apparatus sends the fourth QoS target to the AMF network element.

The access network apparatus may add the fourth QoS target to an N2 session response, and send the N2 session response to the AMF network element. The session response message includes N2 SM information, the N2 SM information includes the fourth QoS target supported by an (R)AN, and the fourth QoS target includes a fourth GFBR. Optionally, the fourth QoS target further includes a fourth MFBR.

Step S614: The AMF network element sends the fourth QoS target to the SMF network element.

The AMF network element may add the fourth QoS target to an Nsmf_PDUSession_UpdateSMContext service operation, and send the service operation to the SMF network element. The service includes N2 SM information. The SMF network element sends an Nsmf_PDUSession_UpdateSMContext response to the AMF network element.

Step S615: The SMF network element determines a second QoS target based on the fourth QoS target.

Step S616: Perform a modification procedure for the QoS flow.

Optionally, the modification procedure for the QoS flow may include the following steps (not shown in the figure).

S6161: The SMF network element sends the second QoS target to the AMF network element.

The SMF network element may add the second QoS target to an Namf_Communication_N1N2MessageTransfer message, and send the message to the AMF network element. The message includes N2 SM information and an N1 SM container. The N2 SM information includes a PDU session ID, a QFI, and a QoS profile (including the second QoS target). The N1 SM container includes a PDU session ID, a QoS rule (including the first QoS target) that cannot be met, and an operation (for example, deletion or modification) of the QoS rule.

S6162: The AMF network element sends the second QoS target to the access network apparatus.

The AMF network element may add the second QoS target to an N2 PDU session request, and send the N2 PDU session request to the access network apparatus. The request includes N2 SM information received from the SMF network element and a NAS message. The NAS message includes a PDU session ID and an N1 SM container. The access network apparatus deletes the started timer after receiving the second QoS target.

S6163: The access network apparatus performs a specific signaling procedure with the UE.

The access network apparatus performs the specific signaling procedure with the UE based on information sent by the SMF network element. For example, when the UE accesses a 3GPP RAN, an RRC connection reconfiguration is performed between the UE and the access network apparatus to modify a corresponding RAN resource.

S6164: The access network apparatus interacts with a core network device to modify the QoS flow.

S6165: The access network apparatus sends an N2 session response to the AMF network element.

The N session response message includes N2 SM information.

S6166: The AMF network element uses an Nsmf_PDUSession_UpdateSMContext service operation, where the service includes N2 SM information. The SMF network element sends an Nsmf_PDUSession_UpdateSMContext response to the AMF network element.

S6167: The UE sends a NAS message to respond to a PDU session modification command, where the NAS message includes a PDU session ID and an N1 SM container, and the N1 SM container is determined by the PDU session modification command.

S6169: The access network apparatus forwards the NAS message to the AMF network element.

S6195: The AMF network element forwards the N1 SM container to the SMF network element by using Nsmf_PDUSession_UpdateSMContext. The SMF network element sends the Nsmf_PDUSession_UpdateSMContext response to the AMF network element.

S6169: The SMF network element performs a PDU session modification procedure with a UPF.

S6170: The SMF network element sends Nsmf_EventExposure_Notify to the PCF network element, where Nsmf_EventExposure_Notify includes an affected PCC rule. The PCF network element sends a response message to the SMF network element.

S6171: The PCF network element sends Npcf_EventExposure_Notify to the AF network element, where Npcf_EventExposure_Notify includes a QoS requirement of a performed service. The AF network element sends a response message to the PCF network element.

In this embodiment, after the access network apparatus sends the first indication information to the SMF network element, the SMF network element determines and performs the modification procedure for the QoS flow. According to Embodiment 2, in another possible implementation of this application, after receiving the first indication information, the SMF network element determines to modify the QoS flow. However, the SMF network element does not immediately perform the modification procedure for the QoS flow, but marks a state of the modification operation as an unperformed state. When receiving second indication information, the SMF network element initiates the modification procedure or a modification negotiation procedure for the QoS flow, where the second indication information is used to indicate that the first QoS is still not met. In this manner, a problem that a QoS flow service cannot be served or quality of service of a service is reduced because the SMF network element immediately deletes or modifies the QoS flow when resources of an access network apparatus are temporarily short can be avoided.

Figure 14:
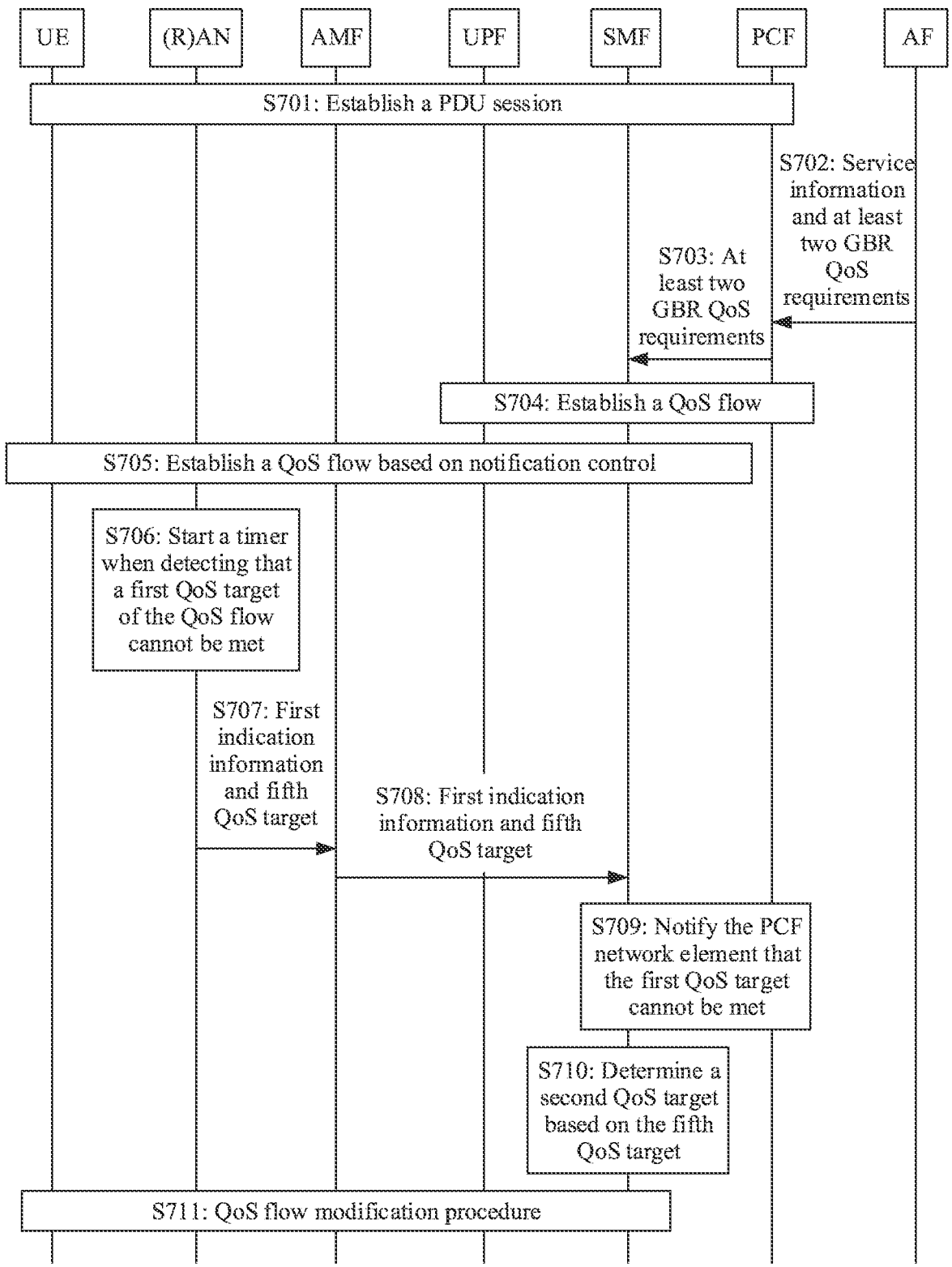
FIG. 14 is a signaling flowchart of a QoS flow control method according to Embodiment 7 of this application.

FIG. 14 is a signaling flowchart of a QoS flow control method according to Embodiment 7 of this application. As shown in FIG. 14, the method provided in this embodiment includes the following steps.

Step S701: UE establishes a PDU session (session) with a network.

For a session establishment process, refer to an existing establishment procedure. Details are not described herein.

Step S702: When an AF network element determines to establish a service for the UE, the AF network element sends service information and at least two GBR QoS requirements to a PCF network element.

The AF network element may add the service information and the at least two GBR QoS requirements to an Npcf_PolicyAuthorization_create_service service procedure, and send the service procedure to the PCF network element. The GBR QoS requirement includes a notification control indication. Optionally, the service procedure further includes priority information of two GBR QoS requirements.

Step S703: The PCF network element sends at least two pieces of GBR QoS control information to an SMF network element.

The PCF network element may add the at least two pieces of GBR QoS control information to an Npcf_SMPolicyControl_UpdateNotify service, and send the service to the SMF network element. The service is sent by the PCF network element based on a service request of the AF network element, and the GBR QoS control information is generated by the PCF network element based on the GBR QoS requirement sent by the AF network element. Optionally, the service further includes priority information of the GBR QoS control information.

Step S704: The SMF network element establishes a corresponding QoS flow based on a message sent by the PCF network element.

The SMF network element may establish the corresponding QoS flow based on the service message sent by the PCF network element. In an establishment process, the SMF network element activates the corresponding QoS flow based on the priority information of the GBR QoS control information. To be specific, the SMF network element first uses GBR QoS control information with a highest priority to establish the QoS flow, where a QoS target corresponding to the GBR QoS control information with the highest priority is a first QoS target. When the SMF network element does not obtain the priority information of the GBR QoS control information, the SMF network element determines, based on a bandwidth requirement priority of the GBR QoS control information, to preferably use QoS control information with a higher bandwidth requirement to establish the QoS flow, where a QoS target corresponding to the QoS control information with the higher bandwidth requirement is a first QoS target.

Step S705: The UE establishes a QoS flow based on notification control with the network.

In this embodiment, in a process in which the UE establishes the QoS flow with the network, the SMF network element sends at least two QoS targets to an access network apparatus.

Step S706: The access network apparatus starts a timer when the access network apparatus detects that the first QoS target of the QoS flow cannot be met.

When detecting that the first QoS target cannot be met, the access network apparatus reads a profile of the QoS flow. When the profile of the QoS flow includes notification control, the access network apparatus starts the timer, and determines a fifth QoS target based on the at least two QoS targets sent by the SMF network element, where the fifth QoS target is a QoS target that can be met by the access network apparatus.

Step S707: The access network apparatus sends first indication information and the fifth QoS target to an AMF network element.

The first indication information is used to indicate that the first QoS target cannot be met. The access network apparatus may add the first indication information and the fifth QoS target to an N2 message, and send the N2 message to the AMF network element. The N2 message includes a PDU session ID and N2 SM information. The N2 SM information includes a QoS flow identifier (QFI) and the first indication information, and the first indication information is used to indicate that the first QoS target of the QoS flow cannot be met.

Step S708: The AMF network element sends the first indication information and the fifth QoS target to the SMF network element.

The AMF network element may add the first indication information and the fifth QoS target to an NSMF network element_PDUSessionUpdateSMContext message, and send the message to the SMF network element. The message includes a QFI and the first indication information.

Step S709: The SMF network element interacts with the PCF network element based on the first indication information, to notify the PCF network element that the first QoS target cannot be met.

Step S710: The SMF network element determines a second QoS target based on the fifth QoS target.

Step S711: Perform a modification procedure for the QoS flow.

Optionally, the modification procedure for the QoS flow may include the following steps (not shown in the figure).

S7110: The SMF network element sends the second QoS target to the AMF network element.

The SMF network element may add the second QoS target to an Namf_Communication_N1N2MessageTransfer message, and send the message to the AMF network element. The message includes N2 SM information and an N1 SM container. The N2 SM information includes a PDU session ID, a QFI, and a QoS profile (including the second QoS target). The N1 SM container includes a PDU session ID, a QoS rule (including the first QoS target) that cannot be met, and an operation (for example, deletion or modification) of the QoS rule.

S7111: The AMF network element sends the second QoS target to the access network apparatus.

The AMF network element may add the second QoS target to an N2 PDU session request, and send the N2 PDU session request to the access network apparatus. The session request includes N2 SM information received from the SMF network element and a NAS message. The NAS message includes a PDU session ID and an N1 SM container.

S7112: The access network apparatus performs a specific procedure with the UE based on the second QoS target.

For example, when the UE accesses a 3GPP RAN, an RRC connection reconfiguration is performed between the UE and the access network apparatus to modify a corresponding RAN resource.

S7113: The access network apparatus interacts with a core network device to modify the QoS flow.

S7114: The access network apparatus sends an N2 session response to the AMF network element.

The N session response message includes N2 SM information.

S7115: The AMF network element uses an Nsmf_PDUSession_UpdateSMContext service operation, where the service includes N2 SM information. The SMF network element sends an Nsmf_PDUSession_UpdateSMContext response to the AMF network element.

S7116: The UE sends a NAS message to respond to a PDU session modification command, where the NAS message includes a PDU session ID and an N1 SM container, and the N1 SM container is determined by the PDU session modification command.

S7117: The access network apparatus forwards the NAS message to the AMF network element.

S7118: The AMF network element forwards the N1 SM container to the SMF network element by using Nsmf_PDUSession_UpdateSMContext. The SMF network element sends the Nsmf_PDUSession_UpdateSMContext response to the AMF network element.

S7119: The SMF network element performs a PDU session modification procedure with a UPF.

S7120: The SMF network element sends Nsmf_EventExposure_Notify to the PCF network element, where Nsmf_E- ventExposure_Notify includes an affected PCC rule. The PCF network element sends a response message to the SMF network element.

S7121: The PCF network element sends Npcf_EventExposure_Notify to the AF network element, where Npcf_EventExposure_Notify includes a QoS requirement of a performed service. The AF network element sends a response message to the PCF network element.

Optionally, after a period of time, when detecting that the first QoS target can be met, the access network apparatus notifies the SMF network element, so that the SMF network element can reuse the first QoS target to transmit a service.

Figure 15:
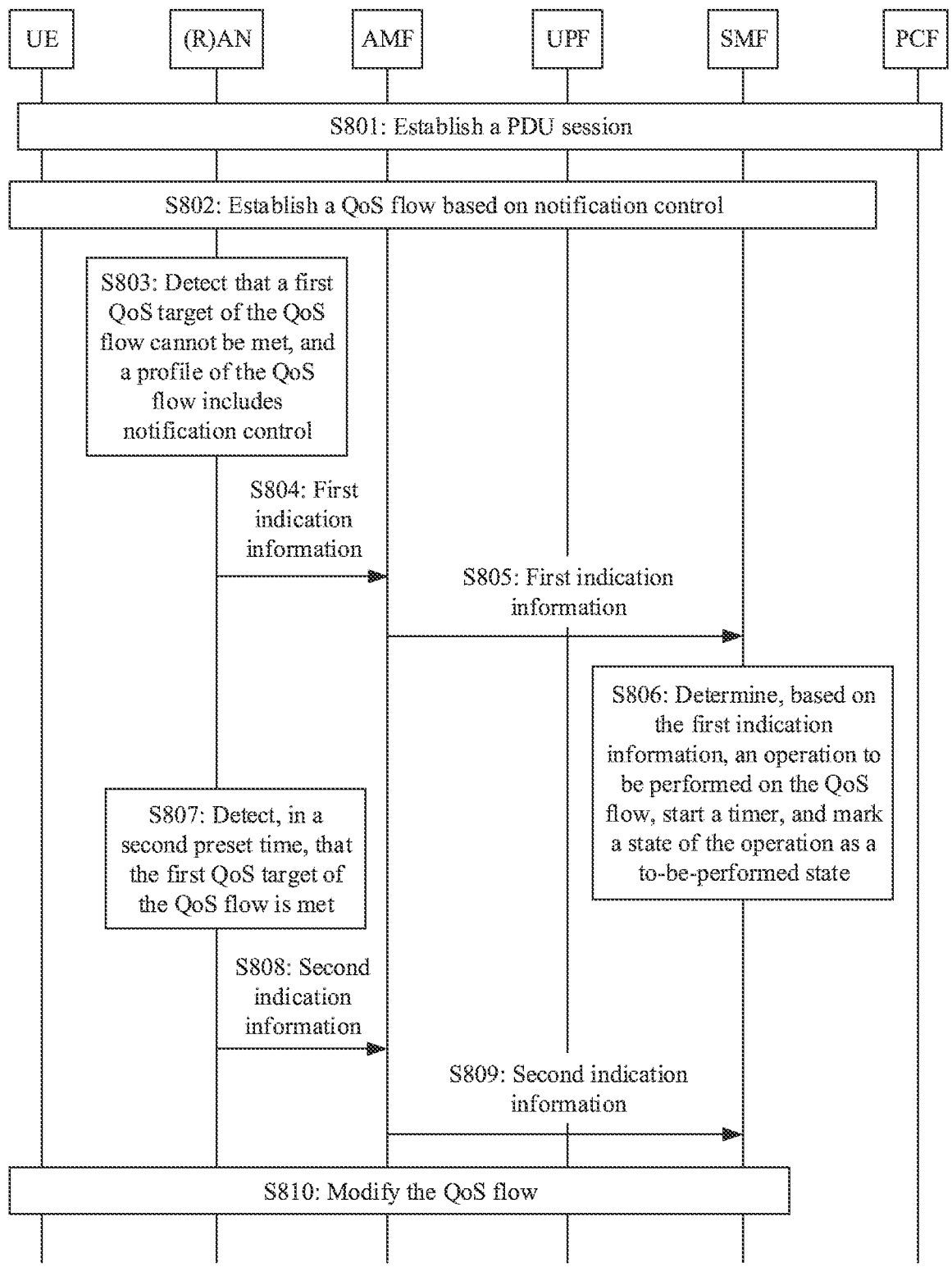
FIG. 15 is a signaling flowchart of a QoS flow control method according to Embodiment 8 of this application.

FIG. 15 is a signaling flowchart of a QoS flow control method according to Embodiment 8 of this application. As shown in FIG. 15, the method provided in this embodiment includes the following steps.

Step S801: UE establishes a PDU session with a network.

For a session establishment process, refer to an existing establishment procedure. Details are not described herein.

Step S802: The UE establishes a QoS flow based on notification control with the network.

In this embodiment, in a process in which the UE establishes the QoS flow with the network, an SMF network element sends at least two QoS targets to an access network apparatus.

Step S803: The access network apparatus detects that a first QoS target of the QoS flow cannot be met, and a profile of the QoS flow includes notification control.

Step S804: The access network apparatus sends first indication information to an AMF network element.

The access network apparatus may add the first indication information to an N2 message, and send the N2 message to the AMF network element. The N2 message includes a PDU session ID and N2 SM information. The N2 SM information includes a QoS flow identifier (QFI) and the first indication information, and the first indication information is used to indicate that the first QoS target of the QoS flow cannot be met.

Step S805: The AMF network element sends the first indication information to the SMF network element.

The AMF network element may add the first indication information to an Nsmf_PDUSessionUpdateSMContext message, and send the message to the SMF network element. The message includes a QFI and the first indication information.

The AMF network element may add the first indication information to an NSMF network element_PDUSessionUpdateSMContext message, and send the message to the SMF network element. The message includes a QFI and the first indication information.

Step S806: The SMF network element determines, based on the first indication information, an operation (including modifying or deleting the QoS flow) to be performed on the QoS flow, starts a timer, and marks a state of the operation as a to-be-performed state.

The SMF network element interacts with a PCF network element based on the first indication information, to determine to modify the corresponding QoS flow or delete the QoS flow. A value of the timer may be obtained in a process in which the SMF network element interacts with the PCF network element, or may be obtained from the PCF network element or a UDM in a PDU session establishment process.

Step S807: The access network apparatus detects, in a second preset time, that the first QoS target of the QoS flow is met.

Step S808: The access network apparatus sends second indication information to the AMF network element.

The second indication information is used to indicate that the first QoS target is met. The access network apparatus may add the second indication information to an N2 message, and send the N2 message to the AMF network element. The message includes a PDU session ID and N2 SM information. The N2 SM information includes a QFI and the second indication information.

Step S809: The AMF network element sends the second indication information to the SMF network element.

The AMF network element may add the second indication information to an Nsmf_PDUSessionUpdateSMContext message, and send the message to the SMF network element. The message further includes a QFI. When receiving the second indication message, the SMF network element deletes the timer, and notifies the PCF network element of the event (that is, the first QoS target is reached). The SMF network element deletes state information of the operation of the QoS flow.

Step S810: The SMF network element performs a modification procedure for the QoS flow if the SMF network element does not receive the second indication information in a first preset time.

Optionally, the modification procedure for the QoS flow includes the following steps (not shown in the figure).

S810: Send a deletion or modification request for the QoS flow to the AMF network element.

For example, the SMF network element sends Namf_Communication_N1N2MessageTransfer to the AMF network element. The message includes N2 SM information and an N1 SM container. The N2 SM information includes a PDU session ID, a QFI, and a QoS profile (including a second QoS target). The N1 SM container includes a PDU session ID, a QoS rule (including the first QoS target) that cannot be met, and an operation (for example, deletion or modification) of the QoS rule.

S8102: The AMF network element sends the deletion or modification request for the QoS flow to the access network apparatus.

The AMF network element may add the deletion or modification request for the QoS flow to an N2 PDU session request, and send the N2 PDU session request to the access network apparatus. The request includes N2 SM information received from the SMF network element and a NAS message. The NAS message includes a PDU session ID and an N1 SM container.

S8103: The access network apparatus performs a specific procedure with the UE based on the second QoS target.

For example, when the UE accesses a 3GPP RAN, an RRC connection reconfiguration is performed between the UE and the access network apparatus to modify a corresponding RAN resource.

S8104: The access network apparatus interacts with a core network device to modify the QoS flow.

An existing procedure may be used for a process in which the access network apparatus interacts with the core network device. In this embodiment, the interaction process is described by using an example in which communication is performed in a network architecture through a service-based interface.

S8105: The access network apparatus sends an N2 session response to the AMF network element.

The N session response message includes N2 SM information.

S8106: The AMF network element uses an Nsmf_PDUSession_UpdateSMContext service operation, where the service includes N2 SM information. The SMF network element sends an Nsmf_PDUSession_UpdateSMContext response to the AMF network element.

S8107: The UE sends a NAS message to respond to a PDU session modification command, where the NAS message includes a PDU session ID and an N1 SM container, and the N1 SM container is determined by the PDU session modification command.

S8108: The access network apparatus forwards the NAS message to the AMF network element.

S8109: The AMF network element forwards the N1 SM container to the SMF network element by using Nsmf_PDUSession_UpdateSMContext. The SMF network element sends the Nsmf_PDUSession_UpdateSMContext response to the AMF network element.

S8110: The SMF network element performs a PDU session modification procedure with a UPF.

S8111: The SMF network element sends Nsmf_EventExposure_Notify to the PCF network element, where Nsmf_EventExposure_Notify includes an affected PCC rule. The PCF network element sends a response message to the SMF network element.

S8112: The PCF network element sends Npcf_EventExposure_Notify to an AF network element, where Npcf_EventExposure_Notify includes a QoS requirement of a performed service. The AF network element sends a response message to the PCF network element.

Optionally, after a period of time, when detecting that the first QoS target can be met, the access network apparatus notifies the SMF network element, so that the SMF network element can reuse the first QoS target to transmit a service.

Figure 16:
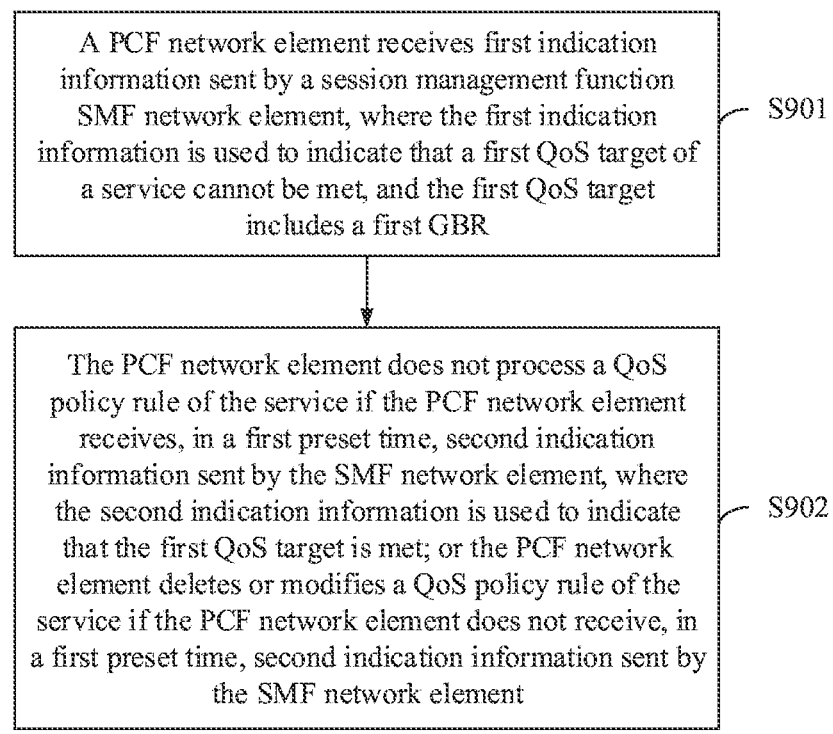
FIG. 16 is a flowchart of a QoS flow control method according to Embodiment 9 of this application.

FIG. 16 is a flowchart of a QoS flow control method according to Embodiment 9 of this application. A difference from the foregoing embodiment lies in that in this embodiment, when a first target of a QoS flow cannot be met, a PCF network element determines to delete or modify a QoS policy rule that is of a service and that corresponds to the QoS flow. As shown in FIG. 16, the method provided in this embodiment includes the following steps.

Step S901: The PCF network element receives first indication information sent by a session management function SMF network element, where the first indication information is used to indicate that a first QoS target of a service cannot be met, and the first QoS target includes a first GBR.

The first QoS target of the service is determined by the SMF network element based on a first QoS target that is of the QoS flow of the service and that is sent by an access network apparatus. The access network apparatus sends the first indication information to the SMF network element when the first target of the QoS flow of the service cannot be met. The first indication information is used to indicate that the first QoS target of the QoS flow cannot be met, and the first QoS target of the QoS flow includes a first GFBR.

After receiving the first indication information sent by the access network apparatus, the SMF network element determines the first GBR of the service based on the first GFBR of the QoS flow, adds the first GBR of the service to the first indication information, and sends the first indication information to the PCF network element, to indicate that the first QoS target of the service cannot be met.

Step S902: The PCF network element does not process a QoS policy rule of the service if the PCF network element receives, in a first preset time, second indication information sent by the SMF network element, where the second indication information is used to indicate that the first QoS target is met; or the PCF network element deletes or modifies a QoS policy rule of the service if the PCF network element does not receive, in a first preset time, second indication information sent by the SMF network element.

In this embodiment, the first preset time may be implemented by using a timer, and a timing time of the timer is equal to the first preset time. The PCF network element starts the timer after receiving the first indication information. Before the timer expires, if the PCF network element receives the second indication information sent by the SMF network element, the PCF network element does not process the QoS policy rule of the service; or if the PCF network element does not receive the second indication information sent by the SMF network element, the PCF network element deletes or modifies the QoS policy rule of the service. In this application, that the PCF network element does not process a QoS policy rule of the service means that the PCF network element does not delete or modify the QoS policy rule of the service, but it is not ensured that the PCF network element does not perform a possible processing operation in another normal program.

After sending the first indication information, the access network apparatus detects, in a second preset time, whether the first QoS target of the QoS flow can be met. If the first QoS target of the QoS flow can be met in the second preset time, the access network apparatus sends the second indication information to the SMF network element. If the first QoS target of the QoS flow cannot be met when the second preset time ends, optionally, the access network apparatus may send third indication information to the SMF network element, where the third indication information is used to indicate that the first QoS target of the QoS flow cannot be met; or the access network apparatus does not send any message to the SMF network element. After receiving the third indication information sent by the access network apparatus, the SMF network element determines the first QoS target of the service based on the first QoS target of the QoS flow, and sends the third indication information to the PCF network element, to indicate that the first QoS target of the service cannot be met.

Optionally, the PCF network element deletes or modifies the QoS policy rule of the service if the PCF network element receives, in the first preset time, third indication information sent by the SMF network element, where the third indication information is used to indicate that the first QoS target of the service cannot be met. In this embodiment, modifying the QoS policy rule of the service is modifying QoS-related content in the QoS policy rule of the service, for example, modifying a GBR and an MBR.

In this embodiment, if the PCF network element does not receive, in the first preset time, the second indication information sent by the access network apparatus, the PCF network element determines that the first target of the service cannot be met, and the PCF network element deletes or modifies the QoS policy rule of the service. Modifying the QoS policy rule is modifying the first QoS target in the QoS policy rule of the service to a second QoS target. An existing deletion procedure may be used for a QoS policy rule deletion procedure of the service, and an existing modification procedure or a modification manner provided in Embodiment 10 of this application may be used for a QoS policy rule modification procedure of the service. For details, refer to the following embodiments. The details are not described herein.

Optionally, after receiving the first indication information, the PCF network element determines, based on the first indication information, an operation to be performed on the QoS policy rule of the service. The operation is the deleting or modifying a QoS policy rule of the service, and a state of the operation is a to-be-performed state. After determining the operation to be performed on the QoS policy rule of the service, the PCF network element does not immediately perform the operation, but marks the state of the operation as the to-be-performed state. The PCF network element deletes state information of the operation if the PCF network element receives, in the first preset time, the second indication information sent by the SMF network element; or the PCF network element deletes or modifies the QoS policy rule of the service if the PCF network element does not receive, in the first preset time, the second indication information sent by the SMF network element.

That the PCF network element determines to perform the modification operation on the QoS policy rule of the service includes: The PCF network element determines a second QoS target in the QoS policy rule. Because determining the operation to be performed on the QoS policy rule and detecting whether the second indication information is received may be performed concurrently, the method in this application can shorten a time for modifying the QoS policy rule and reduce impact on the service compared with determining, after the first preset time, to perform the modification operation on the QoS policy rule.

In this embodiment, the PCF network element receives the first indication information sent by the SMF network element, where the first indication information is used to indicate that the first QoS target of the service cannot be met, and the first QoS target includes the first GBR. The PCF network element does not process the QoS policy rule of the service if the PCF network element receives, in the first preset time, the second indication information sent by the SMF network element, where the second indication information is used to indicate that the first QoS target is met. The PCF network element deletes or modifies the QoS policy rule of the service if the PCF network element does not receive, in the first preset time, the second indication information sent by the SMF network element. The PCF network element deletes or modifies the QoS policy rule of the service to delete the QoS flow of the service. In the method, when a QoS target of the QoS flow cannot be met, the PCF network element does not immediately delete or modify the QoS policy rule that is of the service and that corresponds to the QoS flow. Instead, the PCF network element deletes or modifies the QoS policy rule of the service only when the QoS target of the QoS flow still cannot be met within a delay of the first preset time, to avoid a problem that a QoS flow service cannot be served or quality of service of a service is reduced because the PCF network element immediately deletes or modifies the QoS flow when resources of the access network apparatus are temporarily short.

Figure 17:
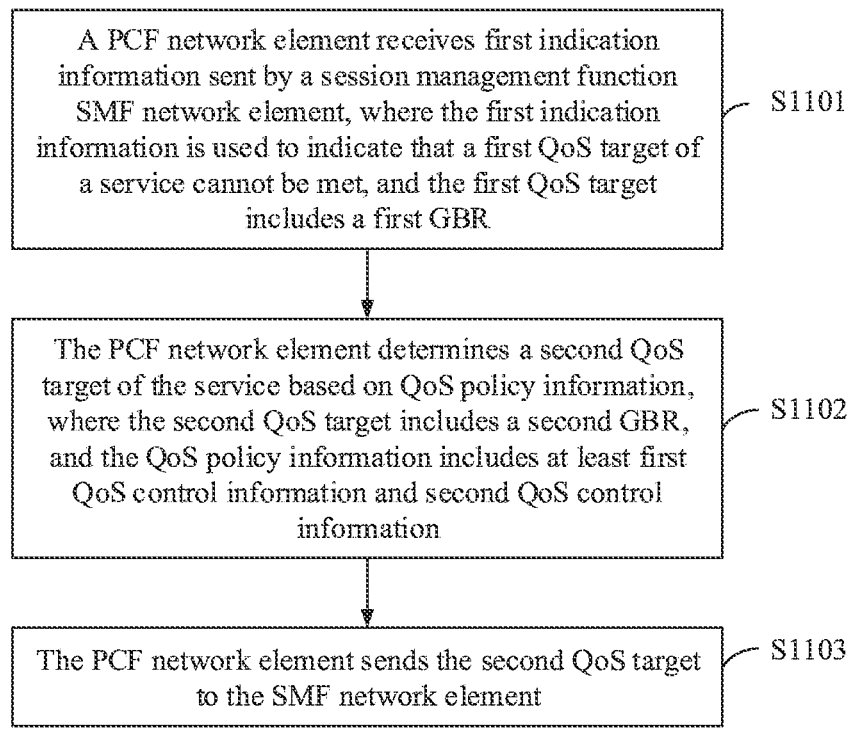
FIG. 17 is a flowchart of a QoS flow control method according to Embodiment 10 of the present invention.

FIG. 17 is a flowchart of a QoS flow control method according to Embodiment 10 of the present invention. It should be noted that the methods in Embodiment 9 and Embodiment 10 may be independently used, or may be used in combination. When the method in Embodiment 9 is independently used, after determining to modify the QoS policy rule, the PCF network element modifies the QoS policy rule in an existing modification procedure. When Embodiment 9 and Embodiment 10 are combined, after determining to modify the QoS policy rule, the PCF network element modifies the QoS policy rule in the method in Embodiment 10. As shown in FIG. 17, the method provided in this embodiment includes the following steps.

Step S1101: A PCF network element receives first indication information sent by a session management function SMF network element, where the first indication information is used to indicate that a first QoS target of a service cannot be met, and the first QoS target includes a first GBR.

Step S1102: The PCF network element determines a second QoS target of the service based on QoS policy information, where the second QoS target includes a second GBR, and the QoS policy information includes at least first QoS control information and second QoS control information.

In this embodiment, because the at least two pieces of QoS control information included in the QoS policy information can meet a QoS requirement of the service, the second QoS target that is of the service and that is determined by the PCF network element based on the QoS control information can meet the QoS requirement of the service. Different from the prior art, in the solution in this embodiment, a QoS target of the service is modified from the first QoS target to the second QoS target, and QoS quality of the service is not reduced.

In this embodiment, the PCF network element may determine the second QoS target of the service in the following manners:

In a first manner, if the QoS policy information further includes at least priority information of the first QoS control information and priority information of the second QoS control information, the PCF network element determines the second QoS target of the service based on the priority information of the first QoS control information and the priority information of the second QoS control information that are included in the QoS policy information.

For example, if the QoS policy information includes QoS control information whose priority is the same as that of QoS control information corresponding to the first QoS target, the PCF network element determines the second QoS target based on the QoS control information whose priority is the same as that of the QoS control information corresponding to the first QoS target. If the QoS policy information does not include QoS control information whose priority is the same as that of QoS control information corresponding to the first QoS target, the PCF network element selects QoS control information with a secondary priority in the QoS control information corresponding to the first QoS target, and determines the second QoS target based on the QoS control information with the secondary priority.

In a second manner, the PCF network element determines the second QoS target of the service based on GBR information of the first QoS control information and GBR information of the second QoS control information that are included in the QoS policy information.

When the QoS policy information includes GBR information of each piece of QoS control information, the PCF network element determines the second QoS target of the service based on the GBR information of the QoS control information. For example, the PCF network element selects QoS control information with a maximum GBR from remaining QoS information, and determines the second QoS target based on the QoS control information with the maximum GBR.

In a third manner, the PCF network element determines at least one third QoS target based on the at least two pieces of QoS control information included in the QoS policy information; the PCF network element sends the third QoS target to the SMF network element; the PCF network element receives a fourth QoS target sent by the SMF network element, where the fourth QoS target is determined by the SMF network element based on a QoS target that can be currently met by an access network apparatus; and the PCF network element determines the second QoS target based on the fourth QoS target.

The QoS target that can be currently met by the access network apparatus is a target of a QoS flow of the service, and the third QoS target determined by the PCF network element is a QoS target of the service. After receiving the third QoS target of the service, the SMF network element determines a third QoS target of the QoS flow based on the third QoS target of the service, and sends the third QoS target of the QoS flow to the access network apparatus. The access network apparatus determines a fourth target of the QoS flow based on the third QoS target of the QoS flow, and sends the fourth target of the QoS flow to the SMF network element. The SMF network element determines the fourth QoS target of the service based on the fourth target of the QoS flow, and sends the fourth QoS target of the service to the PCF network element. The PCF network element determines the second QoS target of the service based on the fourth QoS of the service.

When determining the second QoS target of the service based on the fourth QoS target of the service, the PCF network element may directly use the fourth QoS target of the service as the second QoS target of the service, or may process the fourth QoS target of the service to obtain the second QoS target of the service. For example, a GBR included in the fourth QoS target of the service fluctuates in a specific range and then is used as the second QoS target of the service.

In the first two manners, the PCF network element determines the second QoS target of the service in a manner of the PCF network element. In the third manner, the PCF network element and the access network apparatus determine the second QoS target of the service through negotiation, so that it can be ensured that the second QoS target determined for the service matches a resource of the access network apparatus, and the resource of the access network apparatus can be used to a maximum extent.

In a fourth manner, the PCF network element receives a fifth QoS target sent by the SMF network element, where the fifth QoS target is determined by the SMF network element based on a QoS target that can be currently met by the access network apparatus; and the PCF network element determines the second QoS target based on the fifth QoS target.

The QoS target that can be met by the access network apparatus is a QoS target that can be met by a QoS flow of the service. The SMF network element determines the fifth QoS target of the service based on the QoS target that can be met by the QoS flow of the service, and sends the fifth QoS target of the service to the PCF network element. The PCF network element determines the second QoS target of the service based on the fifth QoS target of the service.

In this manner, the PCF network element and the access network apparatus determine the second QoS target of the service through negotiation. A difference from the third manner in which the PCF network element triggers the access network apparatus to send the QoS target that can be met by the access network apparatus lies in that in the fourth manner, when the first QoS target of the QoS flow cannot be met, the access network apparatus actively reports the QoS target that can be currently met by the access network apparatus, so that the SMF network element determines the fifth QoS target of the service based on the QoS target that can be currently met by the access network apparatus, and sends the fifth QoS target of the service to the PCF network element. Therefore, it can be ensured that the second QoS target determined for the service matches a resource of the access network apparatus, and the resource of the access network apparatus can be used to a maximum extent.

Step S1103: The PCF network element sends the second QoS target to the SMF network element.

The PCF network element sends the second QoS target of the service to the SMF network element. The SMF network element determines a second QoS target of the QoS flow based on the second QoS target of the service, and sends the second QoS target of the QoS flow to the access network apparatus, so that the access network apparatus modifies the QoS flow.

In this embodiment, the PCF network element receives the first indication information sent by the SMF network element, where the first indication information is used to indicate that the first QoS target of the service cannot be met, and the first QoS target includes the first GBR. The PCF network element determines the second QoS target of the service based on the QoS policy information, where the second QoS target includes the second GBR, and the QoS policy information includes the at least first QoS control information and second QoS control information. The PCF network element sends the second QoS target to the SMF network element. Because the at least two pieces of QoS control information included in the QoS policy information can meet a QoS requirement of the service, the second QoS target that is of the service and that is determined based on the QoS control information can also meet the QoS requirement of the service. Different from the prior art, in the solution in this embodiment, a QoS target of the service is modified from the first QoS target to the second QoS target, and QoS quality of the service is not reduced.

Figure 18A:
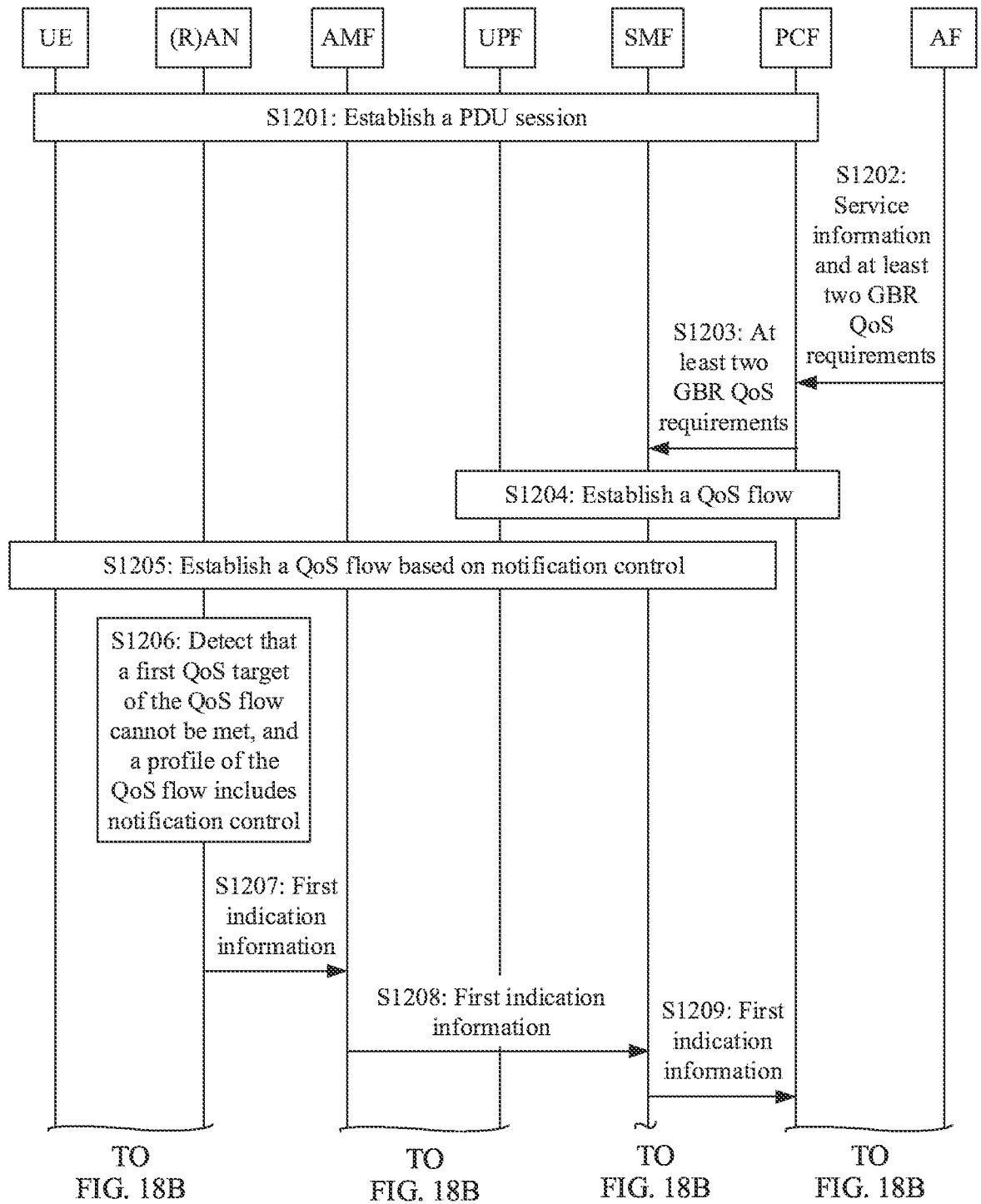
FIG. 18A and FIG. 18B are a signaling flowchart of a QoS flow control method according to Embodiment 11 of this application.
Figure 18B:
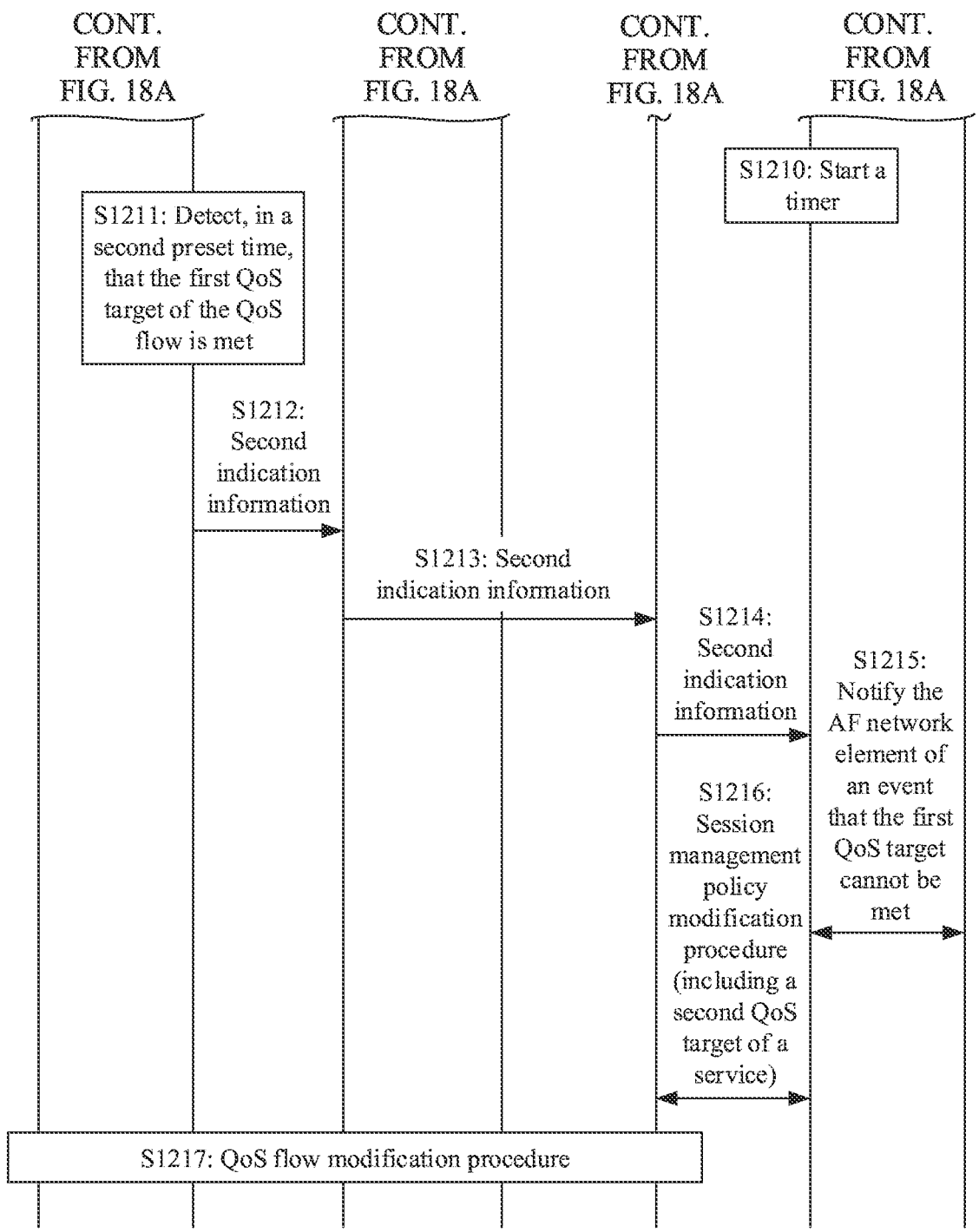

FIG. 18A and FIG. 18B are a signaling flowchart of a QoS flow control method according to Embodiment 11 of this application. As shown in FIG. 18A and FIG. 18B, the method provided in this embodiment includes the following steps.

Step S1201: UE establishes a PDU session with a network.

For a session establishment process, refer to an existing establishment procedure. Details are not described herein.

Step S1202: When an AF network element determines to establish a service for the UE, the AF network element sends service information and at least two GBR QoS requirements to a PCF network element.

The AF network element may add the service information and the at least two GBR QoS requirements to an Npcf_PolicyAuthorization_create_service service procedure, and send the service procedure to the PCF network element. The GBR QoS requirement includes a notification control indication. Optionally, the service procedure further includes priority information of two GBR QoS requirements.

Step S1203: The PCF network element sends at least two pieces of GBR QoS control information to an SMF network element.

The PCF network element may add the at least two pieces of GBR QoS control information to an Npcf_SMPolicyControl_UpdateNotify service, and send the service to the SMF network element. The service is sent by the PCF network element based on a service request of the AF network element, and the GBR QoS control information is generated by the PCF network element based on the GBR QoS requirement sent by the AF network element. Optionally, the service further includes priority information of the GBR QoS control information.

Step S1204: The SMF network element establishes a corresponding QoS flow based on a message sent by the PCF network element.

The SMF network element may establish the corresponding QoS flow based on the service message sent by the PCF network element. In an establishment process, the SMF network element activates the corresponding QoS flow based on the priority information of the GBR QoS control information. To be specific, the SMF network element first uses GBR QoS control information with a highest priority to establish the QoS flow, where a QoS target corresponding to the GBR QoS control information with the highest priority is a first QoS target. When the SMF network element does not obtain the priority information of the GBR QoS control information, the SMF network element determines, based on a bandwidth requirement priority of the GBR QoS control information, to preferably use QoS control information with a higher bandwidth requirement to establish the QoS flow, where a QoS target corresponding to the QoS control information with the higher bandwidth requirement is a first QoS target.

Step S1205: The UE establishes a QoS flow based on notification control with the network.

In this embodiment, in a process in which the UE establishes the QoS flow with the network, the SMF network element sends at least two QoS targets to an access network apparatus.

Step S1206: The access network apparatus detects that the first QoS target of the QoS flow cannot be met, and a profile of the QoS flow includes notification control.

Step S1207: The access network apparatus sends first indication information to an AMF network element.

The access network apparatus may add the first indication information to an N2 message, and send the N2 message to the AMF network element. The N2 message includes a PDU session ID and N2 SM information. The N2 SM information includes a QoS flow identifier (QFI) and the first indication information, and the first indication information is used to indicate that the first QoS target of the QoS flow cannot be met.

Step S1208: The AMF network element sends the first indication information to the SMF network element.

The AMF network element may add the first indication information to an Nsmf_PDUSessionUpdateSMContext message, and send the message to the SMF network element. The message includes a QFI and the first indication information.

Step S1209: The SMF network element sends the first indication information to the PCF network element.

After receiving the first indication information sent by the AMF network element, the SMF network element determines a first QoS target of the service based on the first QoS target of the QoS flow, adds the first QoS target of the service to the first indication information, and sends the first indication information to the PCF network element. The SMF network element may add the first indication information to an Nsmf_EventExposure-Notify message, and send the message to the PCF network element.

Step S1210: The PCF network element starts a timer.

Step S1211: The access network apparatus detects, in a second preset time, that the first QoS target of the QoS flow is met.

Step S1212: The access network apparatus sends second indication information to the AMF network element.

The second indication information is used to indicate that the first QoS target of the QoS flow is met. The access network apparatus may add the second indication information to an N2 message, and send the N2 message to the AMF network element. The message includes a PDU session ID and N2 SM information. The N2 SM information includes a QFI and the second indication information.

Step S1213: The AMF network element sends the second indication information to the SMF network element.

The AMF network element may add the second indication information to an Nsmf_PDUSessionUpdateSMContext message, and send the message to the SMF network element. The message further includes a QFI. When receiving the second indication message, the SMF network element deletes the timer, and notifies the PCF network element of the event (that is, the first QoS target is reached). The SMF network element deletes state information of an operation of the QoS flow.

Step S1214: The SMF network element sends the second indication information to the PCF network element.

The second indication information is used to indicate that the first QoS target of the service is met. The SMF network element may add the second indication information to an Nsmf_EventExposure-Notify message, and send the message to the PCF network element.

Step S1215: The PCF network element notifies the AF network element of an event that the first QoS target of the service is met.

When notifying the AF network element of the event that the first QoS target of the service is met, the PCF network element determines to modify a QoS policy rule of the service. In this case, the PCF network element determines a second QoS target of the service. For a specific manner of determining the second QoS target, refer to the description in Embodiment 10. Details are not described herein again.

Step S1216: The PCF network element initiates a session management policy modification procedure (including the second QoS target of the service) to the SMF network element.

After receiving the second QoS target of the service, the SMF network element determines a second QoS target of the QoS flow based on the second QoS target of the service.

Step S1217: Perform a modification procedure for the QoS flow.

Optionally, the modification procedure for the QoS flow includes the following steps (not shown in the figure).

S12170: The SMF network element sends a deletion or modification request for the QoS flow (including the second QoS target of the QoS flow) to the AMF network element.

After receiving the second QoS that is of the service and that is sent by the PCF network element, the SMF network element determines the second QoS target of the QoS flow based on the second QoS target of the service, and then the SMF network element sends Namf_Communication_N1N2MessageTransfer to the AMF network element. The message includes N2 SM information and an N1 SM container. The N2 SM information includes a PDU session ID, a QFI, and a QoS profile (including the second QoS target). The N1 SM container includes a PDU session ID, a QoS rule (including the first QoS target) that cannot be met, and an operation (for example, deletion or modification) of the QoS rule.

S12171: The AMF network element sends the deletion or modification request for the QoS flow (including the second QoS target of the QoS flow) to the access network apparatus.

The AMF network element may add the deletion or modification request for the QoS flow to an N2 PDU session request, and send the N2 PDU session request to the access network apparatus. The request includes N2 SM information received from the SMF network element and a NAS message. The NAS message includes a PDU session ID and an N1 SM container.

S12172: The access network apparatus performs a specific procedure with the UE based on the second QoS target of the QoS flow.

For example, when the UE accesses a 3GPP RAN, an RRC connection reconfiguration is performed between the UE and the access network apparatus to modify a corresponding RAN resource.

S12173: The access network apparatus interacts with a core network device to modify the QoS flow.

An existing procedure may be used for a process in which the access network apparatus interacts with the core network device. In this embodiment, the interaction process is described by using an example in which communication is performed in a network architecture through a service-based interface.

S12174: The access network apparatus sends an N2 session response to the AMF network element.

The N session response message includes N2 SM information.

S12175: The AMF network element uses an Namf_P-DUSession_UpdateSMContext service operation, where the service includes N2 SM information. The SMF network element sends an Nsmf_PDUSession_UpdateSMContext response to the AMF network element.

S12176: The UE sends a NAS message to respond to a PDU session modification command, where the NAS message includes a PDU session ID and an N1 SM container, and the N1 SM container is determined by the PDU session modification command.

S12177: The access network apparatus forwards the NAS message to the AMF network element.

S12178: The AMF network element forwards the N1 SM container to the SMF network element by using Nsmf_P-DUSession_UpdateSMContext. The SMF network element sends the Nsmf_PDUSession_UpdateSMContext response to the AMF network element.

S12179: The SMF network element performs a PDU session modification procedure with a UPF.

S12180: The SMF network element sends Nsmf_EventExposure_Notify to the PCF network element, where Nsmf_EventExposure_Notify includes an affected PCC rule. The PCF network element sends a response message to the SMF network element.

S12181: The PCF network element sends Nsmf_EventExposure_Notify to the AF network element, where Nsmf_EventExposure_Notify includes a QoS requirement of a performed service. The AF network element sends a response message to the PCF network element.

Optionally, after a period of time, when detecting that the first QoS target can be met, the access network apparatus notifies the SMF network element, so that the SMF network element can reuse the first QoS target to transmit a service.

Figure 19:
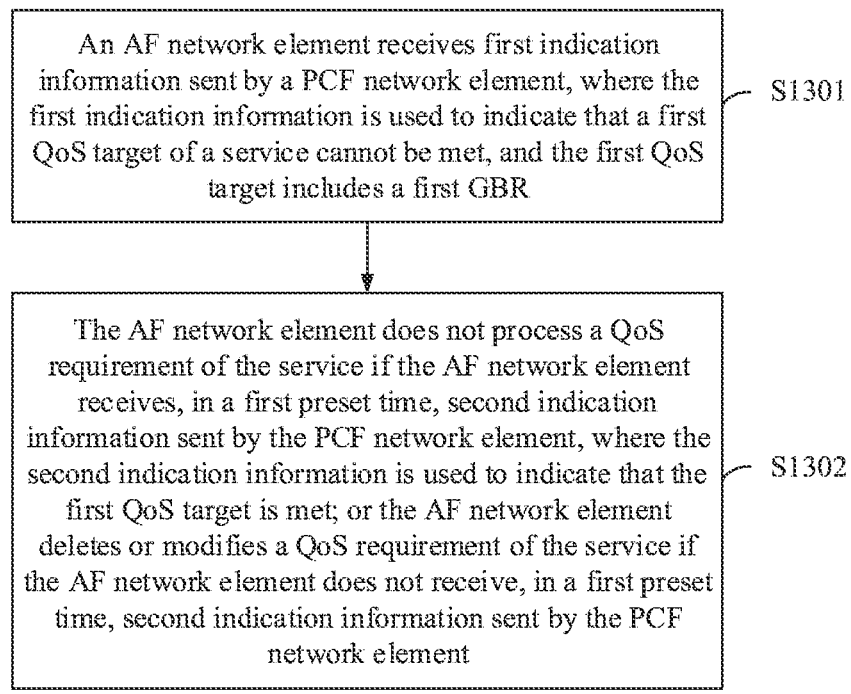
FIG. 19 is a flowchart of a QoS flow control method according to Embodiment 12 of this application.

FIG. 19 is a flowchart of a QoS flow control method according to Embodiment 12 of this application. A difference from the foregoing embodiment lies in that in this embodiment, when a first target of a QoS flow cannot be met, an AF network element determines to delete or modify a QoS requirement that is of a service and that corresponds to the QoS flow, to trigger modification of the QoS flow. As shown in FIG. 19, the method provided in this embodiment includes the following steps.

Step S1301: The AF network element receives first indication information sent by a PCF network element, where the first indication information is used to indicate that a first QoS target of a service cannot be met, and the first QoS target includes a first GBR.

The first QoS target of the service is determined by an SMF network element based on a first QoS target that is of the QoS flow of the service and that is sent by an access network apparatus. The access network apparatus sends the first indication information to the SMF network element when the first target of the QoS flow of the service cannot be met. The first indication information is used to indicate that the first QoS target of the QoS flow cannot be met, and the first QoS target of the QoS flow includes a first GFBR.

After receiving the first indication information sent by the access network apparatus, the SMF network element determines the first GBR of the service based on the first GFBR of the QoS flow, adds the first GBR of the service to the first indication information, and sends the first indication information to the PCF network element, to indicate that the first QoS target of the service cannot be met. The PCF network element sends the first indication information to the AF network element.

Step S1302: The AF network element does not process a QoS requirement of the service if the AF network element receives, in a first preset time, second indication information sent by the PCF network element, where the second indication information is used to indicate that the first QoS target is met; or the AF network element deletes or modifies a QoS requirement of the service if the AF network element does not receive, in a first preset time, second indication information sent by the PCF network element.

In this embodiment, the first preset time may be implemented by using a timer, and a timing time of the timer is equal to the first preset time. The AF network element starts the timer after receiving the first indication information. Before the timer expires, if the AF network element receives the second indication information sent by the PCF network element, the AF network element does not process the QoS requirement of the service; or if the AF network element does not receive the second indication information sent by the PCF network element, the AF network element deletes or modifies the QoS requirement of the service. In this application, that the AF network element does not process a QoS requirement of the service means that the AF network element does not delete or modify the QoS requirement of the service, but it is not ensured that the AF network element does not perform a possible processing operation in another normal program.

After sending the first indication information, the access network apparatus detects, in a second preset time, whether the first QoS target of the QoS flow can be met. If the first QoS target of the QoS flow can be met in the second preset time, the access network apparatus sends the second indication information to the SMF network element. If the first QoS target of the QoS flow cannot be met when the second preset time ends, optionally, the access network apparatus may send third indication information to the SMF network element, where the third indication information is used to indicate that the first QoS target of the QoS flow cannot be met; or the access network apparatus does not send any message to the SMF network element. After receiving the third indication information sent by the access network apparatus, the SMF network element determines the first QoS target of the service based on the first QoS target of the QoS flow, and sends the third indication information to the PCF network element, to indicate that the first QoS target of the service cannot be met. The PCF network element sends the first indication information to the AF network element.

Optionally, the AF network element deletes or modifies the QoS requirement of the service if the AF network element receives, in the first preset time, third indication information sent by the PCF network element, where the third indication information is used to indicate that the first QoS target of the service cannot be met. In this embodiment, modifying the QoS requirement of the service is modifying QoS-related content in the QoS requirement of the service, for example, modifying a GBR and an MBR.

In this embodiment, if the AF network element does not receive, in the first preset time, the second indication information sent by the PCF network element, the AF network element determines that the first target of the service cannot be met, and the AF network element deletes or modifies the QoS requirement of the service. Modifying the QoS requirement is modifying the first QoS target in the QoS requirement of the service to a second QoS target. An existing deletion procedure may be used for a QoS requirement deletion procedure of the service, and an existing modification procedure or a modification manner provided in Embodiment 13 of this application may be used for a QoS requirement modification procedure of the service. For details, refer to the following embodiments. The details are not described herein.

Optionally, after receiving the first indication information, the AF network element determines, based on the first indication information, an operation to be performed on the QoS requirement of the service. The operation is the deleting or modifying a QoS requirement of the service, and a state of the operation is a to-be-performed state. After determining the operation to be performed on the QoS requirement of the service, the AF network element does not immediately perform the operation, but marks the state of the operation as the to-be-performed state. The AF network element deletes state information of the operation if the AF network element receives, in the first preset time, the second indication information sent by the PCF network element; or the AF network element deletes or modifies the QoS requirement of the service if the AF network element does not receive, in the first preset time, the second indication information sent by the PCF network element.

That the AF network element determines to perform the modification operation on the QoS requirement of the service includes: The AF network element determines the second QoS target in the QoS requirement. Because determining the modification operation to be performed on the QoS requirement and detecting whether the second indication information is received may be performed concurrently, the method in this application can shorten a time for modifying the QoS requirement and reduce impact on the service compared with determining, after the first preset time, to perform the modification operation on the QoS requirement.

In this embodiment, the AF network element receives the first indication information sent by the PCF network element, where the first indication information is used to indicate that the first QoS target of the service cannot be met, and the first QoS target includes the first GBR. The AF network element does not process the QoS requirement of the service if the AF network element receives, in the first preset time, the second indication information sent by the PCF network element, where the second indication information is used to indicate that the first QoS target is met. The AF network element deletes or modifies the QoS requirement of the service if the AF network element does not receive, in the first preset time, the second indication information sent by the PCF network element. The AF network element deletes or modifies the QoS requirement of the service to trigger the SMF network element to modify or delete the QoS flow of the service. In the method, when a QoS target of the QoS flow cannot be met, the AF network element does not immediately delete or modify the QoS requirement that is of the service and that corresponds to the QoS flow. Instead, the AF network element deletes or modifies the QoS requirement of the service only when the QoS target of the QoS flow still cannot be met within a delay of the first preset time, to avoid a problem that a QoS flow service cannot be served or quality of service of a service is reduced because the AF network element immediately deletes or modifies the QoS flow when resources of the access network apparatus are temporarily short.

Figure 20:
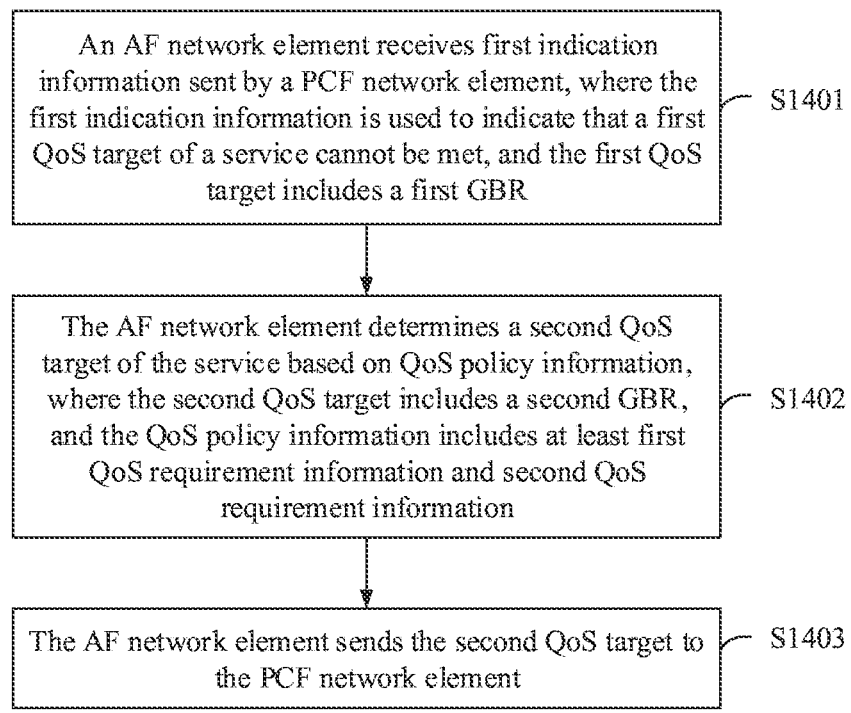
FIG. 20 is a flowchart of a QoS flow control method according to Embodiment 13 of the present invention.

FIG. 20 is a flowchart of a QoS flow control method according to Embodiment 13 of the present invention. It should be noted that the methods in Embodiment 12 and Embodiment 13 may be independently used, or may be used in combination. When the method in Embodiment 12 is independently used, after determining to modify the QoS requirement, the AF network element modifies the QoS requirement in an existing modification procedure. When Embodiment 12 and Embodiment 13 are combined, after determining to modify the QoS requirement, the AF network element modifies the QoS requirement in the method in Embodiment 13. As shown in FIG. 20, the method provided in this embodiment includes the following steps.

Step S1401: An AF network element receives first indication information sent by a PCF network element, where the first indication information is used to indicate that a first QoS target of a service cannot be met, and the first QoS target includes a first GBR.

Step S1402: The AF network element determines a second QoS target of the service based on QoS policy information, where the second QoS target includes a second GBR, and the QoS policy information includes at least first QoS requirement information and second QoS requirement information.

In this embodiment, because the at least two pieces of QoS requirement information included in the QoS policy information can meet a QoS requirement of the service, the second QoS target that is of the service and that is determined by the AF network element based on QoS control information can meet the QoS requirement of the service. Different from the prior art, in the solution in this embodiment, a QoS target of the service is modified from the first QoS target to the second QoS target, and QoS quality of the service is not reduced.

In this embodiment, the AF network element may determine the second QoS target of the service in the following manners:

In a first manner, if the QoS policy information further includes at least priority information of the first QoS requirement information and priority information of the second QoS requirement information, the AF network element determines the second QoS target of the service based on the priority information of the first QoS requirement information and the priority information of the second QoS requirement information that are included in the QoS policy information.

For example, if the QoS policy information includes QoS requirement information whose priority is the same as that of QoS requirement information corresponding to the first QoS target, the AF network element determines the second QoS target based on the QoS requirement information whose priority is the same as that of the QoS requirement information corresponding to the first QoS target. If the QoS policy information does not include QoS requirement information whose priority is the same as that of QoS requirement information corresponding to the first QoS target, the AF network element selects QoS requirement information with a secondary priority in the QoS requirement information corresponding to the first QoS target, and determines the second QoS target based on the QoS requirement information with the secondary priority.

In a second manner, the AF network element determines the second QoS target of the service based on GBR information of first QoS control information and GBR information of second QoS control information that are included in the QoS policy information.

When the QoS policy information includes a GBR requirement of each piece of QoS control information, the AF network element selects QoS requirement information with a maximum GBR from remaining QoS requirement information based on the GBR information of the QoS requirement information, and determines the second QoS target based on the QoS requirement information with the maximum GBR.

In a third manner, the AF network element determines at least one third QoS target based on the at least two pieces of QoS requirement information included in the QoS policy information; the AF network element sends the third QoS target to the PCF network element; the AF network element receives a fourth QoS target sent by the PCF network element, where the fourth QoS target is determined by an SMF network element based on a QoS target that can be currently met by an access network apparatus; and the AF network element determines the second QoS target based on the fourth QoS target.

The QoS target that can be currently met by the access network apparatus is a target of a QoS flow of the service, and the third QoS target determined by the AF network element is a QoS target of the service. After receiving the third QoS target of the service, the SMF network element determines a third QoS target of the QoS flow based on the third QoS target of the service, and sends the third QoS target of the QoS flow to the access network apparatus. The access network apparatus determines a fourth target of the QoS flow based on the third QoS target of the QoS flow, and sends the fourth target of the QoS flow to the SMF network element. The SMF network element determines the fourth QoS target of the service based on the fourth target of the QoS flow, and sends the fourth QoS target of the service to the PCF network element. The PCF network element sends a fourth QoS flow of the service to the AF network element. The AF network element determines the second QoS target of the service based on the fourth QoS of the service.

When determining the second QoS target of the service based on the fourth QoS target of the service, the AF network element may directly use the fourth QoS target of the service as the second QoS target of the service, or may process the fourth QoS target of the service to obtain the second QoS target of the service. For example, a GBR included in the fourth QoS target of the service fluctuates in a specific range and then is used as the second QoS target of the service.

In the first two manners, the AF network element determines the second QoS target of the service in a manner of the AF network element. In the third manner, the AF network element and the access network apparatus determine the second QoS target of the service through negotiation, so that it can be ensured that the second QoS target determined for the service matches a resource of the access network apparatus, and the resource of the access network apparatus can be used to a maximum extent.

In a fourth manner, the AF network element receives a fifth QoS target sent by the PCF network element, where the fifth QoS target is determined by the SMF network element based on a QoS target that can be currently met by the access network apparatus; and the AF network element determines the second QoS target based on the fifth QoS target.

The QoS target that can be met by the access network apparatus is a QoS target that can be met by a QoS flow of the service. The SMF network element determines the fifth QoS target of the service based on the QoS target that can be met by the QoS flow, and sends the fifth QoS target to the AF network element.

In this manner, the AF network element and the access network apparatus determine the second QoS target of the service through negotiation. A difference from the third manner in which the AF network element triggers the access network apparatus to send the QoS target that can be met by the access network apparatus lies in that in the fourth manner, when the first QoS target of the QoS flow cannot be met, the access network apparatus actively reports the QoS target that can be currently met by the access network apparatus, so that the SMF network element determines the fifth QoS target of the service based on the QoS target that can be currently met by the access network apparatus, and sends the fifth QoS target of the service to the PCF network element. Therefore, it can be ensured that the second QoS target determined for the service matches a resource of the access network apparatus, and the resource of the access network apparatus can be used to a maximum extent.

Step S1403: The AF network element sends the second QoS target to the PCF network element.

The AF network element sends the second QoS target of the service to the PCF network element. The PCF network element sends the second QoS target of the service to the SMF network element. The SMF network element determines a second QoS target of the QoS flow based on the second QoS target of the service, and sends the second QoS target of the QoS flow to the access network apparatus, so that the access network apparatus modifies the QoS flow.

In this embodiment, the AF network element receives the first indication information sent by the PCF network element, where the first indication information is used to indicate that the first QoS target of the service cannot be met, and the first QoS target includes the first GBR. The AF network element determines the second QoS target of the service based on the QoS policy information, where the second QoS target includes the second GBR, and the QoS policy information includes the at least first QoS requirement information and second QoS requirement information. The AF network element sends the second QoS target to the PCF network element. Because the at least two pieces of QoS requirement information included in the QoS policy information can meet a QoS requirement of the service, the second QoS target that is of the service and that is determined based on the QoS requirement information can also meet the QoS requirement of the service. Different from the prior art, in the solution in this embodiment, a QoS target of the service is modified from the first QoS target to the second QoS target, and QoS quality of the service is not reduced.

Figure 21A:
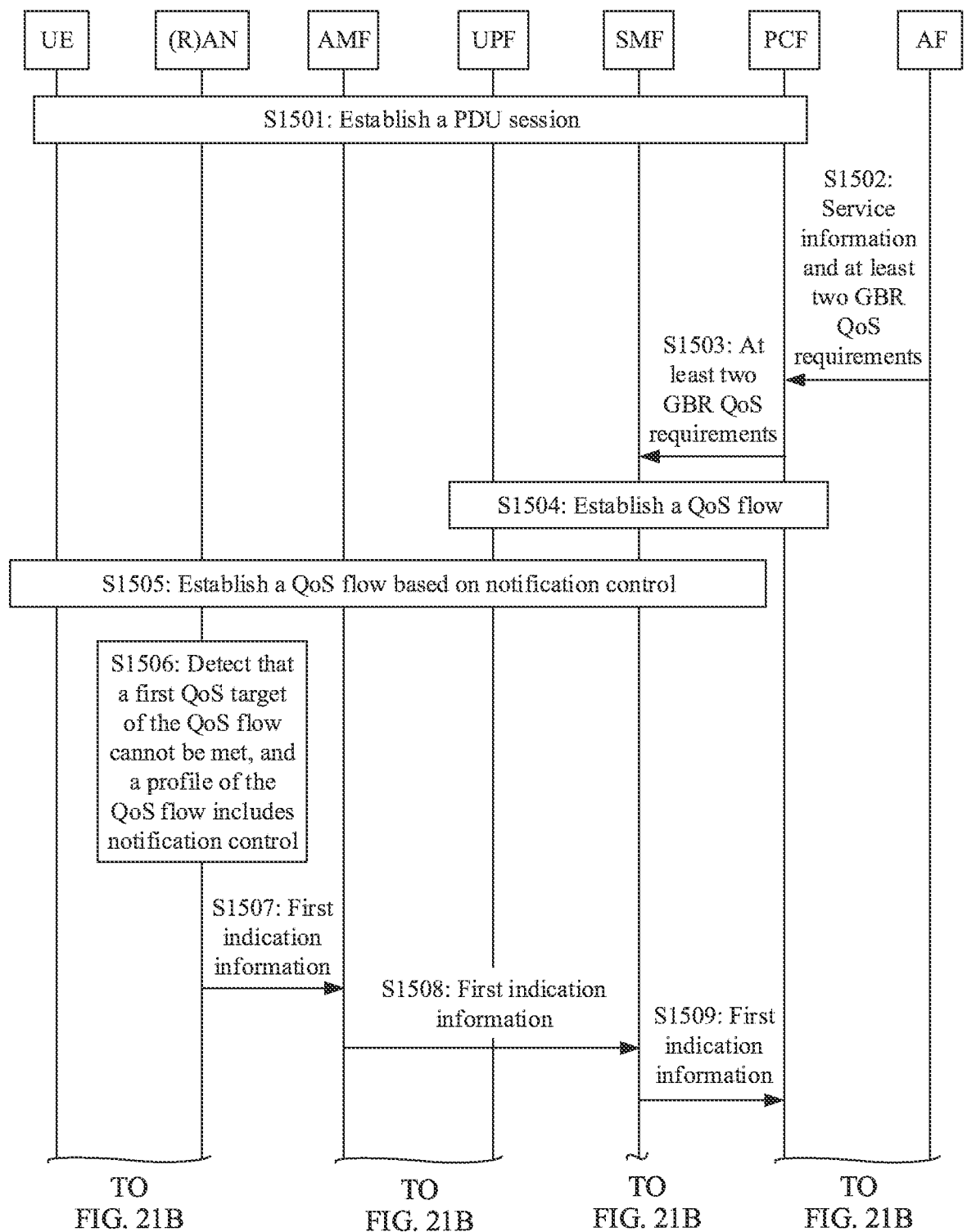
FIG. 21A and FIG. 21B are a signaling flowchart of a QoS flow control method according to Embodiment 14 of this application.
Figure 21B:
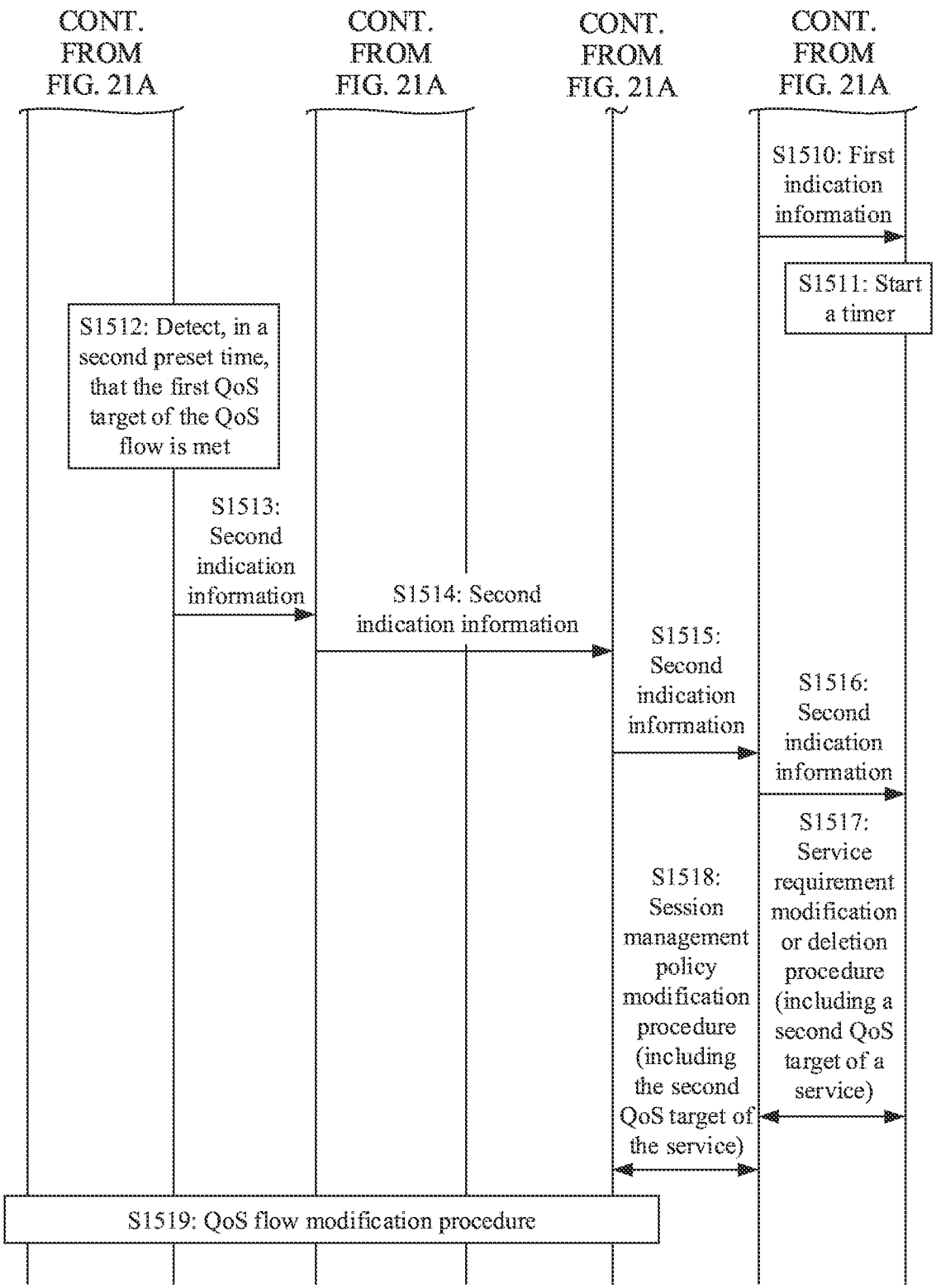

FIG. 21A and FIG. 21B are a signaling flowchart of a QoS flow control method according to Embodiment 14 of this application. As shown in FIG. 18A and FIG. 18B, the method provided in this embodiment includes the following steps.

Step S1501: UE establishes a PDU session (session) with a network.

For a session establishment process, refer to an existing establishment procedure. Details are not described herein.

Step S1502: When an AF network element determines to establish a service for the UE, the AF network element sends service information and at least two GBR QoS requirements to a PCF network element.

The AF network element may add the service information and the at least two GBR QoS requirements to an Npcf_PolicyAuthorization_create_service service procedure, and send the service procedure to the PCF network element. The GBR QoS requirement includes a notification control indication. Optionally, the service procedure further includes priority information of two GBR QoS requirements.

Step S1503: The PCF network element sends at least two pieces of GBR QoS control information to an SMF network element.

The PCF network element may add the at least two pieces of GBR QoS control information to an Npcf_SMPolicyControl_UpdateNotify service, and send the service to the SMF network element. The service is sent by the PCF network element based on a service request of the AF network element, and the GBR QoS control information is generated by the PCF network element based on the GBR QoS requirement sent by the AF network element. Optionally, the service further includes priority information of the GBR QoS control information.

Step S1504: The SMF network element establishes a corresponding QoS flow based on a message sent by the PCF network element.

The SMF network element may establish the corresponding QoS flow based on the service message sent by the PCF network element. In an establishment process, the SMF network element activates the corresponding QoS flow based on the priority information of the GBR QoS control information. To be specific, the SMF network element first uses GBR QoS control information with a highest priority to establish the QoS flow, where a QoS target corresponding to the GBR QoS control information with the highest priority is a first QoS target. When the SMF network element does not obtain the priority information of the GBR QoS control information, the SMF network element determines, based on a bandwidth requirement priority of the GBR QoS control information, to preferably use QoS control information with a higher bandwidth requirement to establish the QoS flow, where a QoS target corresponding to the QoS control information with the higher bandwidth requirement is a first QoS target.

Step S1505: The UE establishes a QoS flow based on notification control with the network.

In this embodiment, in a process in which the UE establishes the QoS flow with the network, the SMF network element sends at least two QoS targets to an access network apparatus.

Step S1506: The access network apparatus detects that the first QoS target of the QoS flow cannot be met, and a profile of the QoS flow includes notification control.

Step S1507: The access network apparatus sends first indication information to an AMF network element.

The access network apparatus may add the first indication information to an N2 message, and send the N2 message to the AMF network element. The N2 message includes a PDU session ID and N2 SM information. The N2 SM information includes a QoS flow identifier (QFI) and the first indication information, and the first indication information is used to indicate that the first QoS target of the QoS flow cannot be met.

Step S1508: The AMF network element sends the first indication information to the SMF network element.

The AMF network element may add the first indication information to an Nsmf_PDUSessionUpdateSMContext message, and send the message to the SMF network element. The message includes a QFI and the first indication information.

Step S1509: The SMF network element sends the first indication information to the PCF network element.

The first indication information is used to indicate that a first QoS target of the service cannot be met. After receiving the first indication information sent by the AMF network element, the SMF network element determines the first QoS target of the service based on the first QoS target of the QoS flow, adds the first QoS target of the service to the first indication information, and sends the first indication information to the PCF network element. The SMF network element may add the first indication information to an Nsmf_EventExposure-Notify message, and send the message to the PCF network element.

Step S1510: The PCF network element sends the first indication information to the AF network element.

The first indication information is used to indicate that the first QoS target of the service cannot be met. The PCF network element may add the second indication information to an Nsmf_EventExposure-Notify message, and send the message to the AF network element.

Step S1511: The AF network element starts a timer.

Step S1512: The access network apparatus detects, in a second preset time, that the first QoS target of the QoS flow is met.

Step S1513: The access network apparatus sends second indication information to the AMF network element.

The second indication information is used to indicate that the first QoS target of the QoS flow is met. The access network apparatus may add the second indication information to an N2 message, and send the N2 message to the AMF network element. The message includes a PDU session ID and N2 SM information. The N2 SM information includes a QFI and the second indication information.

Step S1514: The AMF network element sends the second indication information to the SMF network element.

The AMF network element may add the second indication information to an Nsmf_PDUSessionUpdateSMContext message, and send the message to the SMF network element. The message further includes a QFI. When receiving the second indication message, the SMF network element deletes the timer, and notifies the PCF network element of the event (that is, the first QoS target is reached). The SMF network element deletes state information of an operation of the QoS flow.

Step S1515: The SMF network element sends the second indication information to the PCF network element.

The second indication information is used to indicate that the first QoS target of the service is met. The SMF network element may add the second indication information to an Nsmf_EventExposure-Notify message, and send the message to the PCF network element.

Step S1516: The PCF network element sends the second indication information to the AF network element.

The PCF network element may add the second indication information to an Nsmf_EventExposure-Notify message, and send the message to the AF network element. The AF network element determines, based on the second indication information, to modify or delete a QoS requirement of the service. When the AF network element determines to modify the QoS requirement of the service, the AF network element determines a second QoS target of the service based on the at least two QoS requirements. For a specific determining manner, refer to the description in Embodiment 14. Details are not described herein again.

Step S1517: The AF network element initiates a service requirement deletion or modification procedure (including the second QoS target of the service) to the PCF network element.

The AF network element may add the second QoS target of the service to an Npcf-PolicyQuthorization-create-service message, and send the message to the PCF network element.

Step S1518: The PCF network element initiates a session management policy modification procedure (including the second QoS target of the service) to the SMF network element.

The PCF network element may add the second QoS target of the service to an Nsmf_EventExposure-Notify message, and send the message to the SMF network element. The SMF network element determines a second QoS target of the QoS flow based on the second QoS target of the service.

Step S1519: Perform a modification procedure for the QoS flow.

Optionally, the modification procedure for the QoS flow includes the following steps (not shown in the figure).

S15190: The SMF network element sends a deletion or modification request for the QoS flow (including the second QoS target of the QoS flow) to the AMF network element.

For example, after receiving the second QoS that is of the service and that is sent by the PCF network element, the SMF network element determines the second QoS target of the QoS flow based on the second QoS target of the service, and then the SMF network element sends Namf_Communication_N1N2MessageTransfer to the AMF network element. The message includes N2 SM information and an N1 SM container. The N2 SM information includes a PDU session ID, a QFI, and a QoS profile (including the second QoS target). The N1 SM container includes a PDU session ID, a QoS rule (including the first QoS target) that cannot be met, and an operation (for example, deletion or modification) of the QoS rule.

S15191: The AMF network element sends the deletion or modification request for the QoS flow (including the second QoS target of the QoS flow) to the access network apparatus.

The AMF network element may add the deletion or modification request for the QoS flow to an N2 PDU session request, and send the N2 PDU session request to the access network apparatus. The request includes N2 SM information received from the SMF network element and a NAS message. The NAS message includes a PDU session ID and an N1 SM container.

S15192: The access network apparatus performs a specific procedure with the UE based on the second QoS target of the QoS flow.

For example, when the UE accesses a 3GPP RAN, an RRC connection reconfiguration is performed between the UE and the access network apparatus to modify a corresponding RAN resource.

S15193: The access network apparatus interacts with a core network device to modify the QoS flow.

An existing procedure may be used for a process in which the access network apparatus interacts with the core network device. In this embodiment, the interaction process is described by using an example in which communication is performed in a network architecture through a service-based interface.

S15194: The access network apparatus sends an N2 session response to the AMF network element.

The N session response message includes N2 SM information.

S15195: The AMF network element uses an Nsmf_PDUSession_UpdateSMContext service operation, where the service includes N2 SM information. The SMF network element sends an Nsmf_PDUSession_UpdateSMContext response to the AMF network element.

S15196: The UE sends a NAS message to respond to a PDU session modification command, where the NAS message includes a PDU session ID and an N1 SM container, and the N1 SM container is determined by the PDU session modification command.

S15197: The access network apparatus forwards the NAS message to the AMF network element.

S15198: The AMF network element forwards the N1 SM container to the SMF network element by using Nsmf_PDUSession_UpdateSMContext. The SMF network element sends the Nsmf_PDUSession_UpdateSMContext response to the AMF network element.

S15199: The SMF network element performs a PDU session modification procedure with a UPF.

S15200: The SMF network element sends Nsmf_EventExposure_Notify to the PCF network element, where Nsmf_EventExposure_Notify includes an affected PCC rule. The PCF network element sends a response message to the SMF network element.

S15201: The PCF network element sends Npcf_EventExposure_Notify to the AF network element, where Npcf_EventExposure_Notify includes a QoS requirement of a performed service. The AF network element sends a response message to the PCF network element.

Optionally, after a period of time, when detecting that the first QoS target can be met, the access network apparatus notifies the SMF network element, so that the SMF network element can reuse the first QoS target to transmit a service.

It should be noted that when the method in this application is applied to a roaming scenario, the PCF network element may be a visited PCF (v-PCF) network element or a home PCF (h-PCF) network element, and the SMF network element may be a visited SMF (v-SMF) network element or a home SMF(h-SMF) network element. In addition, in the embodiments of this application, a message exchanged between network elements is described by using an architecture based on a service-based interface. The foregoing embodiments are merely examples for description. A name of the message exchanged in this application may be implemented by using another message name. For an interface architecture, a corresponding function is implemented by using a message name related to a corresponding interface architecture.

Embodiment 15 of this application provides an SMF network element. The SMF network element includes modules configured to implement the method performed by the SMF network element in Embodiment 1 to Embodiment 14.

Embodiment 16 of this application provides an access network apparatus. The access network apparatus includes modules configured to implement the method performed by the access network apparatus in Embodiment 1 to Embodiment 14.

Embodiment 17 of this application provides a PCF network element. The PCF network element includes modules configured to implement the method performed by the PCF network element in Embodiment 1 to Embodiment 14.

Embodiment 18 of this application provides an AF network element. The AF network element includes modules configured to implement the method performed by the AF network element in Embodiment 1 to Embodiment 14.

Figure 22:
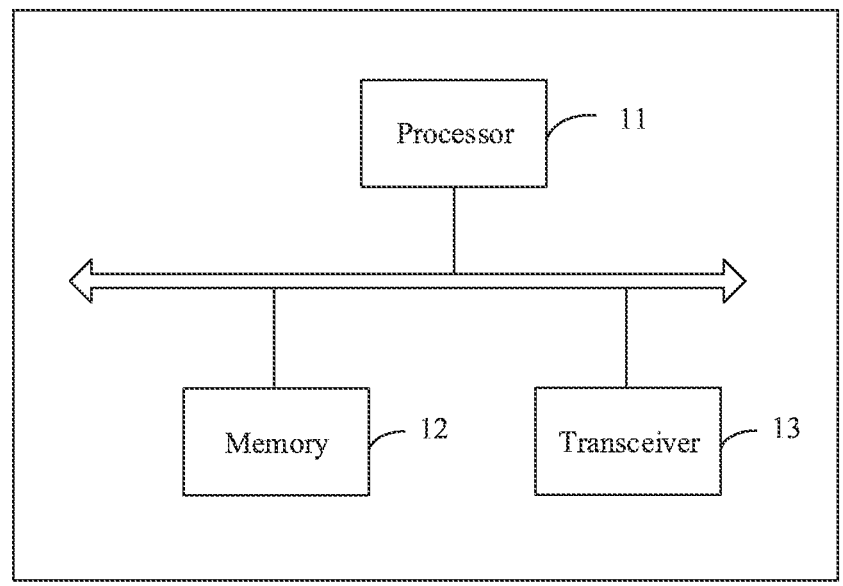
FIG. 22 is a schematic structural diagram of an SMF network element according to Embodiment 19 of this application.

FIG. 22 is a schematic structural diagram of an SMF network element according to Embodiment 19 of this application. As shown in FIG. 22, the SMF network element includes a processor 11, a memory 12, and a transceiver 13. The memory 12 is configured to store an instruction, the transceiver 13 is configured to communicate with another device, and the processor 11 is configured to execute the instruction stored in the memory 12, so that the SMF network element performs the method steps performed by the SMF network element in Embodiment 1 to Embodiment 14. A specific implementation and a technical effect are similar to those of the SMF network element in Embodiment 1 to Embodiment 14. Details are not described herein again.

Figure 23:
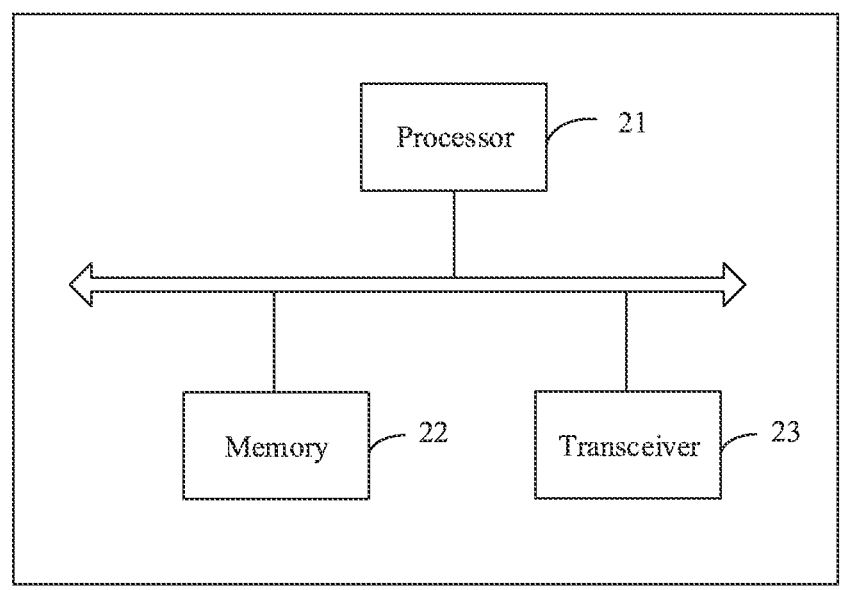
FIG. 23 is a schematic structural diagram of an access network apparatus according to Embodiment 20 of this application.

FIG. 23 is a schematic structural diagram of an access network apparatus according to Embodiment 20 of this application. As shown in FIG. 23, the access network apparatus includes a processor 21, a memory 22, and a transceiver 23. The memory 22 is configured to store an instruction, the transceiver 23 is configured to communicate with another device, and the processor 21 is configured to execute the instruction stored in the memory 22, so that the access network apparatus performs the method steps performed by the access network apparatus in Embodiment 1 to Embodiment 14. A specific implementation and a technical effect are similar to those of the access network apparatus in Embodiment 1 to Embodiment 14. Details are not described herein again.

Figure 24:
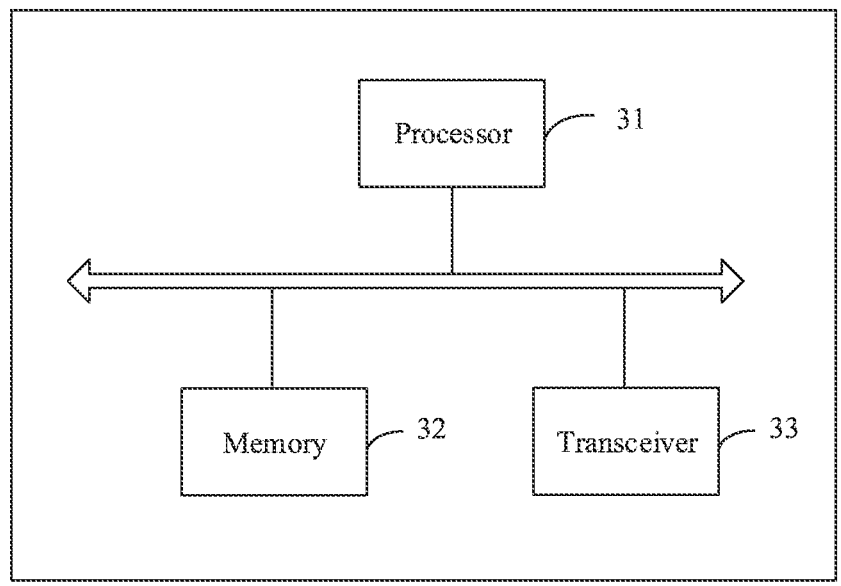
FIG. 24 is a schematic structural diagram of a PCF network element according to Embodiment 21 of this application.

FIG. 24 is a schematic structural diagram of a PCF network element according to Embodiment 21 of this application. As shown in FIG. 24, the PCF network element includes a processor 31, a memory 32, and a transceiver 33. The memory 32 is configured to store an instruction, the transceiver 32 is configured to communicate with another device, and the processor 31 is configured to execute the instruction stored in the memory 32, so that the PCF network element performs the method steps performed by the PCF network element in Embodiment 1 to Embodiment 14. A specific implementation and a technical effect are similar to those of the PCF network element in Embodiment 1 to Embodiment 14. Details are not described herein again.

Figure 25:
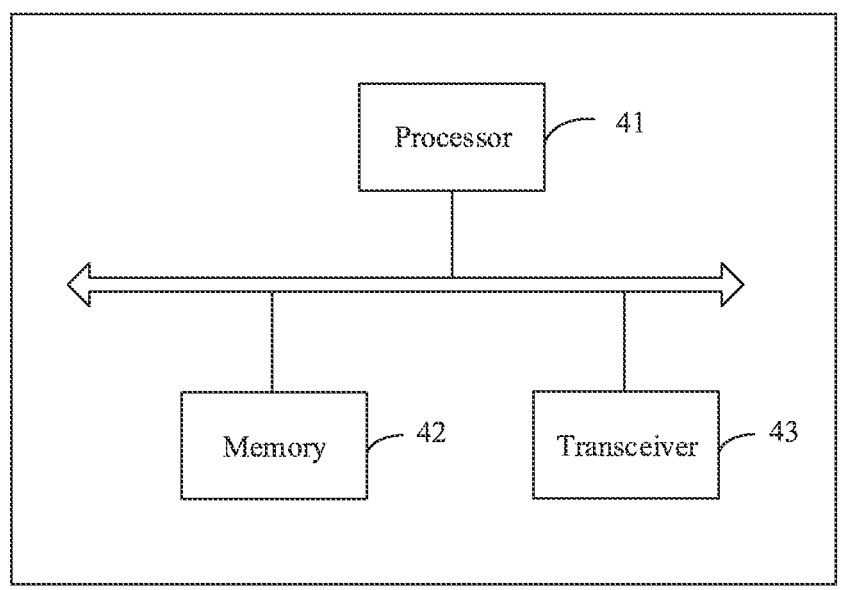
FIG. 25 is a schematic structural diagram of an AF network element according to Embodiment 22 of this application.

FIG. 25 is a schematic structural diagram of an AF network element according to Embodiment 22 of this application. As shown in FIG. 25, the AF network element includes a processor 41, a memory 42, and a transceiver 43. The memory 42 is configured to store an instruction, the transceiver 42 is configured to communicate with another device, and the processor 41 is configured to execute the instruction stored in the memory 42, so that the AF network element performs the method steps performed by the AF network element in Embodiment 1 to Embodiment 14. A specific implementation and a technical effect are similar to those of the AF network element in Embodiment 1 to Embodiment 14. Details are not described herein again.

Embodiment 23 of this application provides a computer readable storage medium, applied to an SMF network element. The computer readable storage medium stores an instruction. When the instruction is executed by a computing apparatus, the SMF network element is enabled to perform the method steps performed by the SMF network element in Embodiment 1 to Embodiment 14. A specific implementation and a technical effect are similar to those of the SMF network element in Embodiment 1 to Embodiment 14. Details are not described herein again.

Embodiment 24 of this application provides a computer readable storage medium, applied to an access network apparatus. The computer readable storage medium stores an instruction. When the instruction is executed by a computing apparatus, the access network apparatus is enabled to perform the method steps performed by the access network apparatus in Embodiment 1 to Embodiment 14. A specific implementation and a technical effect are similar to those of the access network apparatus in Embodiment 1 to Embodiment 14. Details are not described herein again.

Embodiment 25 of this application provides a computer readable storage medium, applied to a PCF network element. The computer readable storage medium stores an instruction. When the instruction is executed by a computing apparatus, the PCF network element is enabled to perform the method steps performed by the PCF network element in Embodiment 1 to Embodiment 14. A specific implementation and a technical effect are similar to those of the PCF network element in Embodiment 1 to Embodiment 14. Details are not described herein again.

Embodiment 26 of this application provides a computer readable storage medium, applied to an AF network element. The computer readable storage medium stores an instruction. When the instruction is executed by a computing apparatus, the AF network element is enabled to perform the method steps performed by the AF network element in Embodiment 1 to Embodiment 14. A specific implementation and a technical effect are similar to those of the AF network element in Embodiment 1 to Embodiment 14. Details are not described herein again.

The processor in the embodiments may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps in the methods disclosed with reference to the embodiments of the present invention may be directly executed and completed by using a hardware decoding processor, or may be executed and completed by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, or a register. The storage medium is located in the memory 1002, and the processor 1001 reads an instruction from the memory 1002 and completes the steps in the foregoing methods in combination with hardware of the processor.

The bus in this application may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

In the several embodiments provided in this application, it should be understood that the disclosed apparatus and method may be implemented in another manner. For example, the foregoing described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of hardware and a software function unit.

What is claimed is:

1. A method, comprising:
sending, by a session management function network element, at least two quality of service (QOS) targets for a QoS flow to an access network apparatus;
receiving, by the access network apparatus, the at least two QoS targets for the QoS flow from the session management function network element;
for the QoS flow, in response to the access network apparatus determining that a first QoS target comprising a first guaranteed flow bit rate (GFBR) is not able to be met by the access network apparatus, determining, by the access network apparatus and based on an available resource, a second QoS target comprising a second GFBR and being able to be met by the access network apparatus, wherein the second QoS target comprising the second GFBR is determined from the at least two QoS targets received from the session management function network element; and
for the QoS flow, reporting, by the access network apparatus to the session management function network element, that the first QoS target comprising the first GFBR is not able to be met by the access network apparatus, and the second QoS target that comprises the second GFBR and that is able to be met by the access network apparatus.

2. The method according to claim 1, wherein the QoS flow is a guaranteed bit rate QoS flow.

3. The method according to claim 1, wherein after the session management function network element receives the reporting from the access network apparatus, the method further comprises:
indicating by the session management function network element to a policy control function network element, information about the second QoS target that is able to be met by the access network apparatus.

4. The method according to claim 1, wherein the QoS flow is for transmitting data packets of a service.

5. The method according to claim 1, further comprising:
receiving, by the session management function network element, QoS policy information from a policy control function network element; and
wherein sending the at least two QoS targets to the access network apparatus comprises:
sending, by the session management function network element based on the QoS policy information, the at least two QoS targets to the access network apparatus.

6. The method according to claim 5, wherein the QoS policy information comprises at least two pieces of QoS control information.

7. The method according to claim 6, wherein each piece of the at least two pieces of QoS control information comprises one or more of:
a 5QI, an allocation and retention priority (ARP), a guaranteed bit rate (GBR), a maximum bit rate (MBR), or notification control.

8. The method according to claim 5, further comprising:
receiving, by the policy control function network element, at least two QoS requirements from an application function (AF) network element; and
sending, by the policy control function network element to the session management function network element, the QoS policy information based on the at least two QoS requirements.

9. The method according to claim 8, further comprising:
sending, by the AF network element, the at least two QoS requirements to the policy control function network element.

10. A system, comprising:
a session management function network element; and
an access network apparatus;
wherein the session management function network element is configured to:
send at least two quality of service (QOS) targets for a QoS flow to the access network apparatus; and
wherein the access network apparatus is configured to:
receive the at least two QoS targets for the QoS flow from the session management function network element;
for the QoS flow, in response to the access network apparatus determining that a first QoS target comprising a first guaranteed flow bit rate (GFBR) is not able to be met by the access network apparatus, determine, from the at least two QoS targets received from the session management function network element and based on an available resource, a second QoS target comprising a second GFBR and being able to be met by the access network apparatus; and
for the QoS flow, report, to the session management function network element, that the first QoS target comprising the first GFBR is not able to be met by the access network apparatus, and the second QoS target that comprises the second GFBR and that is able to be met by the access network apparatus.

11. The system according to claim 10, wherein the QoS flow is a guaranteed bit rate QoS flow.

12. The system according to claim 10, wherein the session management function network element is further configured to:
after receiving the reporting, indicating, to a policy control function network element, information about the second QoS target that is able to be met by the access network apparatus.

13. The system according to claim 10, wherein the session management function network element is further configured to:
receive QoS policy information from a policy control function network element; and
wherein sending the at least two QoS targets to the access network apparatus comprises:
sending, based on the QoS policy information, the at least two QoS targets to the access network apparatus.

14. The system according to claim 13, wherein the QoS policy information comprises at least two pieces of QoS control information.

15. The system according to claim 14, wherein each piece of the at least two pieces of QoS control information comprises one or more of:
a 5QI, an allocation and retention priority (ARP), a guaranteed bit rate (GBR), a maximum bit rate (MBR), or notification control.

16. The system according to claim 13, further comprising: the policy control function network element configured to:
receive at least two QoS requirements from an application function (AF) network element; and
send, to the session management function network element, the QoS policy information based on the at least two QoS requirements.

17. The system according to claim 16, further comprising:
the AF network element, configured to send the at least two QoS requirements to the policy control function network element.

18. A non-transitory storage medium comprising instructions which, when executed by a computer of a session management function network element, cause the computer to:
send at least two quality of service (QOS) targets for a QoS flow to an access network apparatus; and
receive, from the access network apparatus, indication information indicating that a first QoS target for the QoS flow comprising a first guaranteed flow bit rate (GFBR) is not able to be met by the access network apparatus, and a report of a second QoS target for the QoS flow comprising a second GFBR and being able to be met by the access network apparatus, wherein the second QoS target is determined by the access network apparatus in response to the access network apparatus determining that the first QoS target comprising the first GFBR is not able to be met by the access network apparatus, based on an available resource, and from the at least two QoS targets sent to the access network apparatus.

19. The non-transitory storage medium according to claim 18, wherein when the instructions are executed by the computer, the instructions further cause the computer to:
after receiving the report, indicate, to a policy control function network element, information about the second QoS target that is able to be met by the access network apparatus.

20. The non-transitory storage medium according to claim 18, wherein the indication information and the report are received in a same message.

21. A non-transitory storage medium comprising instructions which, when executed by a computer of an access network apparatus, cause the computer to:
receive at least two quality of service (QOS) targets for a QoS flow from a session management function network element;
for the QoS flow, in response to determining that a first QoS target comprising a first guaranteed flow bit rate (GFBR) is not able to be met by a access network apparatus, determine, based on an available resource, a second QoS target comprising a second GFBR and being able to be met by the access network apparatus, wherein the second QoS target comprising the second GFBR is determined in the at least two QoS targets from the session management function network element; and
for the QoS flow, report, to the session management function network element, that the first QoS target comprising the first GFBR is not able to be met by the access network apparatus, and the second QoS target that comprises the second GFBR and that is able to be met by the access network apparatus.

* * * * *